United States Patent
Kotani et al.

(10) Patent No.: US 9,066,095 B2
(45) Date of Patent: Jun. 23, 2015

(54) DISPLAY CONTROL DEVICE, DISPLAY CONTROL METHOD, DISPLAY CONTROL PROGRAM, COMPUTER-READABLE RECORDING MEDIUM, RECORDING/PLAYBACK DEVICE EQUIPPED WITH ABOVEMENTIONED DISPLAY CONTROL DEVICE, SPEECH OUTPUT DEVICE, AND RECORDING/PLAYBACK DEVICE EQUIPPED WITH SPEECH OUTPUT DEVICE

(75) Inventors: Teruhisa Kotani, Osaka (JP); Hideharu Tajima, Osaka (JP); Shigemi Maeda, Osaka (JP); Yasuhiro Harada, Osaka (JP); Atsushi Etoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 608 days.

(21) Appl. No.: 13/498,530

(22) PCT Filed: Nov. 1, 2010

(86) PCT No.: PCT/JP2010/069446
§ 371 (c)(1),
(2), (4) Date: Mar. 27, 2012

(87) PCT Pub. No.: WO2011/065191
PCT Pub. Date: Jun. 3, 2011

(65) Prior Publication Data
US 2012/0182408 A1    Jul. 19, 2012

(30) Foreign Application Priority Data

Nov. 30, 2009 (JP) ................................ 2009-272743
Feb. 25, 2010 (JP) ................................ 2010-040889

(51) Int. Cl.
*H04N 7/18* (2006.01)
*H04N 13/04* (2006.01)
*H04N 13/00* (2006.01)

(52) U.S. Cl.
CPC ....... *H04N 13/0497* (2013.01); *H04N 13/0033* (2013.01); *H04N 13/0438* (2013.01)

(58) Field of Classification Search
None
See application file for complete search history.

(56) References Cited

U.S. PATENT DOCUMENTS

2009/0058839 A1* 3/2009 Naito ............................ 345/204
2009/0142041 A1  6/2009 Nagasawa et al.
(Continued)

FOREIGN PATENT DOCUMENTS

JP        62-065580  A    3/1987
JP        62-166669  A    7/1987
(Continued)

OTHER PUBLICATIONS

English Version of the International Search Report for PCT/JP2010/069446 dated Dec. 14, 2010.

*Primary Examiner* — William C Vaughn, Jr.
*Assistant Examiner* — Eileen Adams
(74) *Attorney, Agent, or Firm* — Keating & Bennett, LLP

(57) ABSTRACT

A display control device (2) disclosed includes (i) a display/non-display video image determining section (70) that determines, on the basis of (i) video image information about a video image displayed by a display device (400) and (ii) viewing mode information indicative of a viewer's desired mode of viewing a video image, whether the video image displayed by the display device (400) is a display video image or a non-display video image and (ii) a shutter operation control section (80) that closes a right-eye shutter and a left-eye shutter of a liquid crystal shutter (500) when a video image determined as a non-display video image, which is unnecessary for the viewing mode and which is thus not to be displayed to the viewer, is displayed by the display device (400). The display control device (2) thus closes the right-eye shutter and the left-eye shutter of the liquid crystal shutter (500) when a non-display video image is displayed by the display device (400). This arrangement allows each viewer to view a video image in a mode suitable for the viewer.

12 Claims, 17 Drawing Sheets

(56) References Cited

U.S. PATENT DOCUMENTS

| | | |
|---|---|---|
| 2011/0141248 A1 | 6/2011 | Watabu et al. |
| 2012/0182408 A1 | 7/2012 | Kotani et al. |
| 2012/0275765 A1* | 11/2012 | Ikeda et al. .................. 386/241 |
| 2012/0299802 A1* | 11/2012 | Yamazaki et al. .............. 345/32 |

FOREIGN PATENT DOCUMENTS

| | | |
|---|---|---|
| JP | 06-133255 A | 5/1994 |
| JP | 7-222087 A | 8/1995 |
| JP | 06-250116 A | 9/1997 |
| JP | 10-240212 A | 9/1998 |
| JP | 10-243420 A | 9/1998 |
| JP | 2002-010300 A | 1/2002 |
| JP | 2003-078843 A | 3/2003 |
| JP | 2006-186768 A | 7/2006 |
| JP | 2007-288509 A | 11/2007 |
| JP | 2008-294530 A | 12/2008 |
| JP | 2009-135686 A | 6/2009 |
| JP | 2011-142606 A | 7/2011 |
| JP | 4723682 B2 | 7/2011 |

* cited by examiner

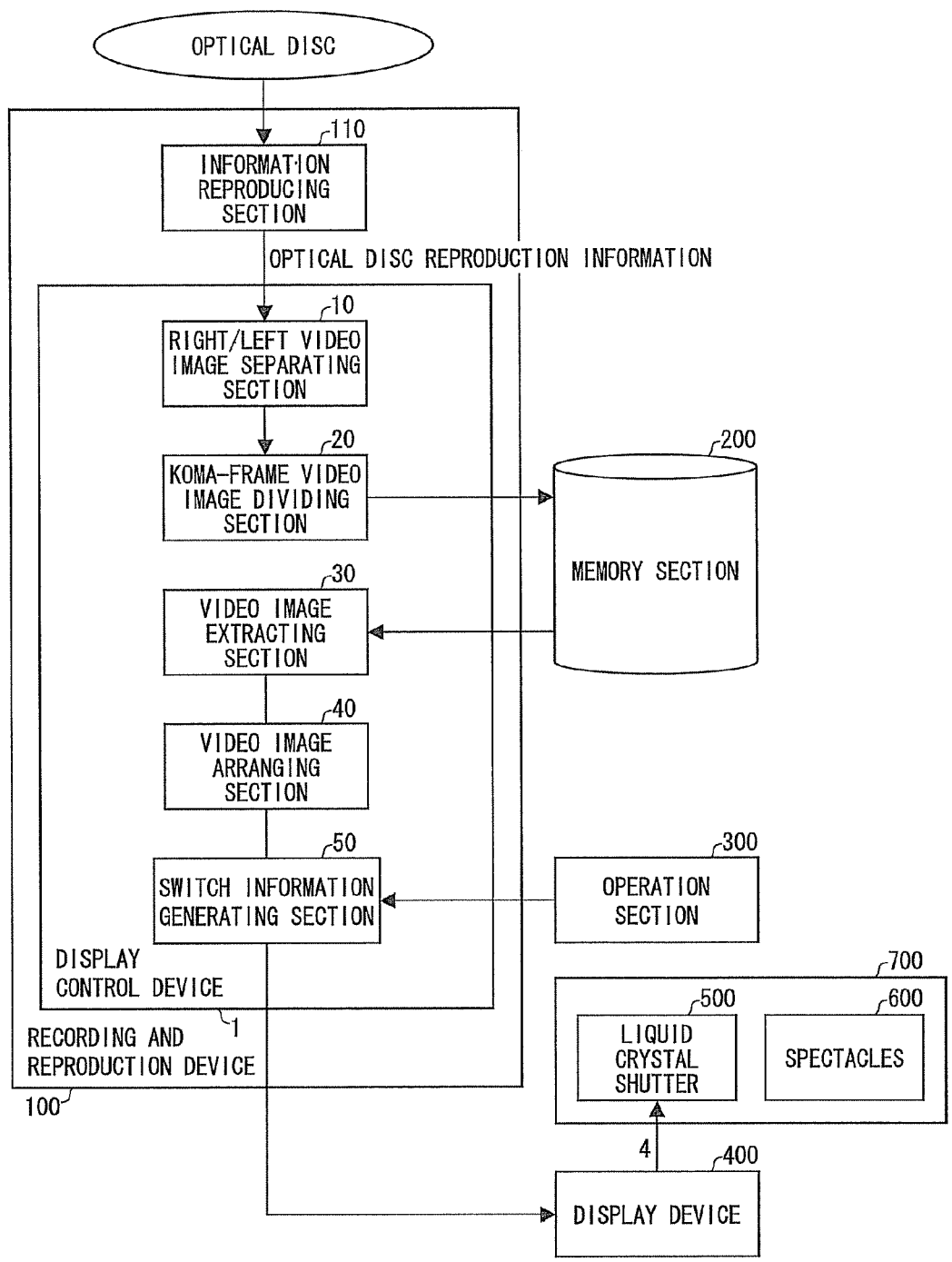
F I G. 1

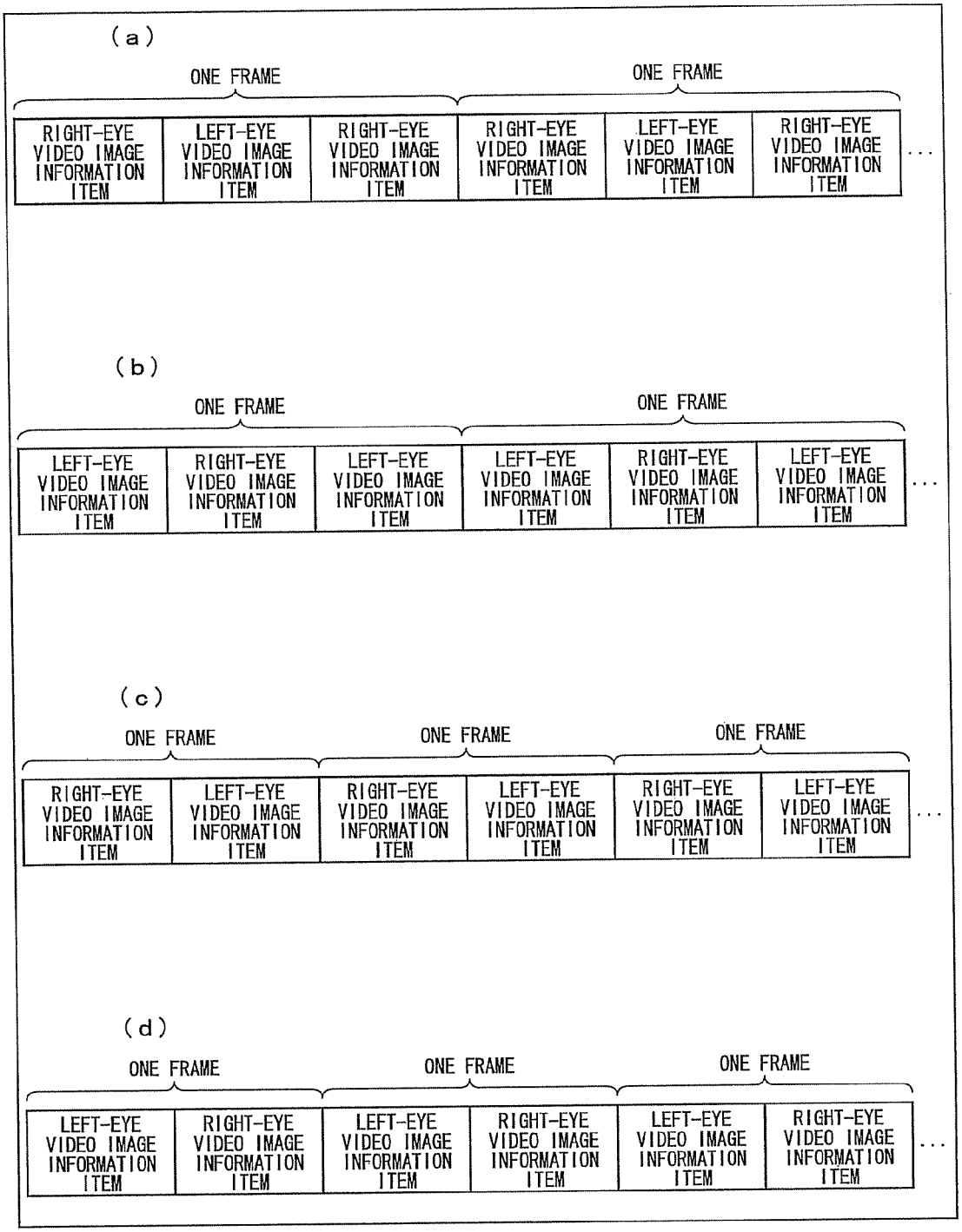

F I G. 3

(a)

| RIGHT-EYE VIDEO IMAGE INFORMATION ITEM | LEFT-EYE VIDEO IMAGE INFORMATION ITEM | RIGHT-EYE VIDEO IMAGE INFORMATION ITEM | RIGHT-EYE VIDEO IMAGE INFORMATION ITEM | LEFT-EYE VIDEO IMAGE INFORMATION ITEM | RIGHT-EYE VIDEO IMAGE INFORMATION ITEM |
|---|---|---|---|---|---|

(b)

| RIGHT-EYE SHUTTER OPEN LEFT-EYE SHUTTER CLOSED | RIGHT-EYE SHUTTER CLOSED LEFT-EYE SHUTTER OPEN | RIGHT-EYE AND LEFT-EYE SHUTTERS CLOSED | RIGHT-EYE SHUTTER OPEN LEFT-EYE SHUTTER CLOSED | RIGHT-EYE SHUTTER CLOSED LEFT-EYE SHUTTER OPEN | RIGHT-EYE AND LEFT-EYE SHUTTERS CLOSED |
|---|---|---|---|---|---|

(c)

| RIGHT-EYE AND LEFT-EYE SHUTTERS CLOSED | RIGHT-EYE SHUTTER CLOSED LEFT-EYE SHUTTER OPEN | RIGHT-EYE SHUTTER OPEN LEFT-EYE SHUTTER CLOSED | RIGHT-EYE AND LEFT-EYE SHUTTERS CLOSED | RIGHT-EYE SHUTTER CLOSED LEFT-EYE SHUTTER OPEN | RIGHT-EYE SHUTTER OPEN LEFT-EYE SHUTTER CLOSED |
|---|---|---|---|---|---|

F I G. 4

(a)

| LEFT-EYE VIDEO IMAGE INFORMATION ITEM | RIGHT-EYE VIDEO IMAGE INFORMATION ITEM | LEFT-EYE VIDEO IMAGE INFORMATION ITEM | LEFT-EYE VIDEO IMAGE INFORMATION ITEM | RIGHT-EYE VIDEO IMAGE INFORMATION ITEM | LEFT-EYE VIDEO IMAGE INFORMATION ITEM |
|---|---|---|---|---|---|

(b)

| RIGHT-EYE AND LEFT-EYE SHUTTERS CLOSED | RIGHT-EYE SHUTTER OPEN  LEFT-EYE SHUTTER CLOSED | RIGHT-EYE SHUTTER CLOSED  LEFT-EYE SHUTTER OPEN | RIGHT-EYE AND LEFT-EYE SHUTTERS CLOSED | RIGHT-EYE SHUTTER OPEN  LEFT-EYE SHUTTER CLOSED | RIGHT-EYE SHUTTER CLOSED  LEFT-EYE SHUTTER OPEN |
|---|---|---|---|---|---|

(c)

| RIGHT-EYE SHUTTER CLOSED  LEFT-EYE SHUTTER OPEN | RIGHT-EYE SHUTTER OPEN  LEFT-EYE SHUTTER CLOSED | RIGHT-EYE AND LEFT-EYE SHUTTERS CLOSED | RIGHT-EYE SHUTTER CLOSED  LEFT-EYE SHUTTER OPEN | RIGHT-EYE SHUTTER OPEN  LEFT-EYE SHUTTER CLOSED | RIGHT-EYE AND LEFT-EYE SHUTTERS CLOSED |
|---|---|---|---|---|---|

| RIGHT-EYE VIDEO IMAGE INFORMATION ITEM | LEFT-EYE VIDEO IMAGE INFORMATION ITEM | RIGHT-EYE VIDEO IMAGE INFORMATION ITEM | LEFT-EYE VIDEO IMAGE INFORMATION ITEM | RIGHT-EYE VIDEO IMAGE INFORMATION ITEM | LEFT-EYE VIDEO IMAGE INFORMATION ITEM |
|---|---|---|---|---|---|

(b)

| RIGHT-EYE SHUTTER OPEN LEFT-EYE SHUTTER CLOSED | RIGHT-EYE SHUTTER CLOSED LEFT-EYE SHUTTER OPEN | RIGHT-EYE SHUTTER OPEN LEFT-EYE SHUTTER CLOSED | RIGHT-EYE SHUTTER CLOSED LEFT-EYE SHUTTER OPEN | RIGHT-EYE SHUTTER OPEN LEFT-EYE SHUTTER CLOSED | RIGHT-EYE SHUTTER CLOSED LEFT-EYE SHUTTER OPEN |
|---|---|---|---|---|---|

(c)

| RIGHT-EYE AND LEFT-EYE SHUTTERS CLOSED | RIGHT-EYE SHUTTER CLOSED LEFT-EYE SHUTTER OPEN | RIGHT-EYE SHUTTER OPEN LEFT-EYE SHUTTER CLOSED | RIGHT-EYE SHUTTER CLOSED LEFT-EYE SHUTTER OPEN | RIGHT-EYE SHUTTER OPEN LEFT-EYE SHUTTER CLOSED | RIGHT-EYE SHUTTER CLOSED LEFT-EYE SHUTTER OPEN |
|---|---|---|---|---|---|

F I G. 6

(a)

| LEFT-EYE VIDEO IMAGE INFORMATION ITEM | RIGHT-EYE VIDEO IMAGE INFORMATION ITEM | LEFT-EYE VIDEO IMAGE INFORMATION ITEM | RIGHT-EYE VIDEO IMAGE INFORMATION ITEM | LEFT-EYE VIDEO IMAGE INFORMATION ITEM | RIGHT-EYE VIDEO IMAGE INFORMATION ITEM |
|---|---|---|---|---|---|

(b)

| RIGHT-EYE AND LEFT-EYE SHUTTERS CLOSED | RIGHT-EYE SHUTTER OPEN<br><br>LEFT-EYE SHUTTER CLOSED | RIGHT-EYE SHUTTER CLOSED<br><br>LEFT-EYE SHUTTER OPEN | RIGHT-EYE SHUTTER OPEN<br><br>LEFT-EYE SHUTTER CLOSED | RIGHT-EYE SHUTTER CLOSED<br><br>LEFT-EYE SHUTTER OPEN | RIGHT-EYE SHUTTER OPEN<br><br>LEFT-EYE SHUTTER CLOSED |
|---|---|---|---|---|---|

(c)

| RIGHT-EYE SHUTTER CLOSED<br><br>LEFT-EYE SHUTTER OPEN | RIGHT-EYE SHUTTER OPEN<br><br>LEFT-EYE SHUTTER CLOSED | RIGHT-EYE SHUTTER CLOSED<br><br>LEFT-EYE SHUTTER OPEN | RIGHT-EYE SHUTTER OPEN<br><br>LEFT-EYE SHUTTER CLOSED | RIGHT-EYE SHUTTER CLOSED<br><br>LEFT-EYE SHUTTER OPEN | RIGHT-EYE SHUTTER OPEN<br><br>LEFT-EYE SHUTTER CLOSED |
|---|---|---|---|---|---|

| VIDEO IMAGE A | × | ○ | × | ○ | × | ○ | × | ○ |
|---|---|---|---|---|---|---|---|---|
| VIDEO IMAGE B | ○ | × | ○ | × | ○ | × | ○ | × |

(b)

| SPECTACLES P, RIGHT | × | ○ | × | ○ | × | ○ | × | ○ |
|---|---|---|---|---|---|---|---|---|
| SPECTACLES P, LEFT | ○ | × | ○ | × | ○ | × | ○ | × |

(c)

| SPECTACLES Q, RIGHT | ○ | × | ○ | × | ○ | × | ○ | × |
|---|---|---|---|---|---|---|---|---|
| SPECTACLES Q, LEFT | ○ | × | ○ | × | ○ | × | ○ | × |

| VIDEO IMAGE A | × | ○ | × | ○ | × | ○ | × | ○ |
|---|---|---|---|---|---|---|---|---|
| VIDEO IMAGE B | ○ | × | ○ | × | ○ | × | ○ | × |

(b)

| SPECTACLES P, RIGHT | × | ○ | × | ○ | × | ○ | × | ○ |
|---|---|---|---|---|---|---|---|---|
| SPECTACLES P, LEFT | × | ○ | × | ○ | × | ○ | × | ○ |

(c)

| SPECTACLES Q, RIGHT | ○ | × | ○ | × | ○ | × | ○ | × |
|---|---|---|---|---|---|---|---|---|
| SPECTACLES Q, LEFT | ○ | × | ○ | × | ○ | × | ○ | × |

| VIDEO IMAGE A | ○ | × | × | ○ | × | × | ○ | × |
|---|---|---|---|---|---|---|---|---|
| VIDEO IMAGE B | × | ○ | × | × | ○ | × | × | ○ |
| VIDEO IMAGE C | × | × | ○ | × | × | ○ | × | × |

(b)

| SPECTACLES P, RIGHT | ○ | × | × | ○ | × | × | ○ | × |
|---|---|---|---|---|---|---|---|---|
| SPECTACLES P, LEFT | × | ○ | × | × | ○ | × | × | ○ |

(c)

| SPECTACLES Q, RIGHT | × | × | ○ | × | × | ○ | × | × |
|---|---|---|---|---|---|---|---|---|
| SPECTACLES Q, LEFT | × | × | ○ | × | × | ○ | × | × |

F I G. 1 5

| SPECTACLES P, RIGHT | VIDEO IMAGE A | ○ | × | × | × | × | × | ○ | × | × | × | × |
|---|---|---|---|---|---|---|---|---|---|---|---|---|
| SPECTACLES P, LEFT | VIDEO IMAGE B | × | ○ | × | × | × | × | × | ○ | × | × | × |
| SPECTACLES Q, RIGHT | VIDEO IMAGE C | × | × | ○ | × | × | × | × | × | ○ | × | × |
| SPECTACLES Q, LEFT | VIDEO IMAGE D | × | × | × | ○ | × | × | × | × | × | ○ | × |
| SPECTACLES R, RIGHT | VIDEO IMAGE E | × | × | × | × | ○ | × | × | × | × | × | ○ | × |
| SPECTACLES R, LEFT | VIDEO IMAGE F | × | × | × | × | × | ○ | × | × | × | × | × | ○ |

DISPLAY CONTROL DEVICE, DISPLAY CONTROL METHOD, DISPLAY CONTROL PROGRAM, COMPUTER-READABLE RECORDING MEDIUM, RECORDING/PLAYBACK DEVICE EQUIPPED WITH ABOVEMENTIONED DISPLAY CONTROL DEVICE, SPEECH OUTPUT DEVICE, AND RECORDING/PLAYBACK DEVICE EQUIPPED WITH SPEECH OUTPUT DEVICE

TECHNICAL FIELD

The present invention relates to a display control device, a display control method, a display control program, a computer-readable recording medium, a recording and reproduction device including the display control device, an audio output device, and a recording and reproduction device including an audio output device, each of which serves to allow each individual viewer to view a video image in a mode suitable for the viewer.

BACKGROUND ART

Recent years have witnessed an increasingly active research on, for example, a method for viewing a 3D video image rather than a 2D video image.

To, for example, view a 3D video image requires, for example, (i) separately displaying a video image for the right eye and a video image for the left eye both of which video images are for a 3D video image and (ii) viewing, through a pair of polarized light glasses or the like, a video image with use of only the right eye and another video image with use of only the left eye.

Such a conventional technique to, for example, view a 3D video image is exemplified by a three-dimensional video image recording method and the like disclosed in Patent Literature 1.

The three-dimensional video image recording method and the like disclosed in Patent Literature 1 arrange and record, on an optical disc, left-eye video images and right-eye video images for a 3D video image in a sequence that allows a three-dimensional video image to be outputted. The three-dimensional video image recording method thus makes it possible to, for example, view a 3D video image.

Another example of a conventional technique to, for example, view a 3D video image is a videotape recorder disclosed in Patent Literature 2.

The videotape recorder disclosed in Patent Literature 2 selectively reproduces an image of an odd-numbered field and an image of an even-numbered field both for a 3D video image. The videotape recorder thus makes it possible to, for example, view a 3D video image.

Further, Patent Literature 3 discloses a technique to create a multi-visual-point image (3D image) in association with information on the dominant eye of a photographer.

Patent Literature 3 discloses an image sensing device in which information on the dominant eye of a photographer is registered in advance. The image sensing device calculates an optical angle from (i) the distance between the eyes of the photographer and (ii) the distance measured to an object, and is thus driven as controlled to achieve the optical angle. This allows a 3D image to be photographed. The image sensing device then records, in a recording section, (i) the 3D image and (ii) the information on the dominant eye in association with each other. Next, the image sensing device creates, (i) on the basis of the dominant-eye information associated with the 3D image and (ii) with reference to, among 3D images, an image corresponding to the dominant eye, a 3D image to be supplied to display means. The image sensing device then causes the display means to display the 3D image.

Patent Literatures 4 through 9 further disclose other conventional techniques related to the present invention.

CITATION LIST

Patent Literature 1
Japanese Patent Application Publication, Tokukai, No. 2009-135686 A (Publication Date: Jun. 18, 2009)
Patent Literature 2
Japanese Patent Application Publication, Tokukaishou, No. 62-166669 A (Publication Date: Jul. 23, 1987)
Patent Literature 3
Japanese Patent Application Publication, Tokukai, No. 2008-294530 A (Publication Date: Dec. 4, 2008)
Patent Literature 4
Japanese Patent Application Publication, Tokukaishou, No. 62-65580 A (Publication Date: Mar. 24, 1987)
Patent Literature 5
Japanese Patent Application Publication, Tokukaihei, No. 6-133255 A (Publication Date: May 13, 1994)
Patent Literature 6
Japanese Patent Application Publication, Tokukaihei, No. 6-250116 A (Publication Date: Sep. 9, 1994)
Patent Literature 7
Japanese Patent Application Publication, Tokukaihei, No. 7-222087 A (Publication Date: Aug. 18, 1995)
Patent Literature 8
Japanese Patent Application Publication, Tokukaihei, No. 10-240212 A (Publication Date: Sep. 11, 1998)
Patent Literature 9
Japanese Patent Application Publication, Tokukai, No. 2006-186768 A (Publication Date: Jul. 13, 2006)

SUMMARY OF INVENTION

Technical Problem

Viewing a 3D video image can lead to so-called 3D sickness. Such 3D sickness is believed to be caused by a gap between (i) motion of a scene currently being viewed and (ii) actual motion of the osseous semicircular canals. The brain senses such a gap as a sickness, and is confused as a result. Such confusion induces a headache, nausea, or dizziness.

One believed cause of such a gap between "motion of a scene currently being viewed" and "actual motion of the osseous semicircular canals" is that the brain recognizes an auxiliary video image before recognizing a main video image.

Specifically, assuming that the right eye is the dominant eye, in the case where the brain first recognizes a video image (main video image) with the right eye and then recognizes a video image (auxiliary video image) with the left eye, which is the eye other than the dominant eye, the brain can recognize a 3D video image without causing 3D sickness, that is, without sensing a gap between "motion of a scene currently being viewed" and "actual motion of the osseous semicircular canals".

On the other hand, in the case where the brain first recognizes an auxiliary video image with the eye (left eye) other than the dominant eye and then recognizes a main video image with the dominant eye (right eye), the brain may sense a gap between "motion of a scene currently being viewed"

and "actual motion of the osseous semicircular canals" as a sickness, and thus be confused.

This is because displaying a 3D image normally involves displaying a right-eye video image and a left-eye video image that are slightly shifted in time from each other. In viewing a 3D video image, the brain preferably first recognizes a main video image with the dominant eye and then recognizes an auxiliary video image with the eye other than the dominant eye. This prevents 3D sickness.

Patent Literatures 1 and 2 both fail to describe, in relation to the dominant eye, an order in which right-eye video images and left-eye video images for a 3D video image are displayed by a display device. Both the three-dimensional video image recording method and the like of Patent Literature 1 and the videotape recorder of Patent Literature 2 may thus cause a viewer to suffer from 3D sickness in the case where the brain of the viewer recognizes an auxiliary video image before recognizing a main video image.

Further, both the three-dimensional video image recording method and the like of Patent Literature 1 and the videotape recorder of Patent Literature 2 fail to, in a case where a plurality of viewers with different dominant eyes view an identical 3D video image simultaneously, display right-eye video images and left-eye video images in an order that takes into consideration the dominant eye of each viewer. This leaves the possibility of causing some viewers to suffer from 3D sickness by the above cause.

Patent Literature 3 discloses a method of (i) adjusting a display video image to be suitable for the dominant eye and then (ii) displaying a 3D image including the image suitable for the dominant eye.

This method, however, requires adjusting (correcting) obtained data to create a display video image suitable for the dominant eye, and thus problematically requires a complicated system.

There is another problem: Preventing 3D sickness with use of the technique of any of Patent Literatures 1 through 3 requires, in correspondence with (i) the case in which the dominant eye is the right eye and (ii) the case in which the dominant eye is the left eye, preparing two images for which the respective orders of right-eye video images and left-eye video images to be displayed by a display device are opposite to each other. This leads to an increase in a necessary recording capacity of a recording device and thus in an increase in cost, thus problematically decreasing convenience for viewers.

Such problems can be essentially interpreted as a problem of the inability to allow a viewer to view a video image in a mode suitable for the viewer. This problem is caused not only in viewing a 3D video image, but also in, for example, (i) selecting a desired one of a 3D video image and a 2D video image or (ii) viewing a desired 2D video image among a plurality of 2D video images.

Specifically, none of known techniques can provide a viewer with (i) a viewing mode that, in the case where a 3D video image is being displayed by a display device, allows the viewer to select either a 3D video image or a 2D video image or (ii) a viewing mode that, in the case where respective programs on Channel A, Channel B, and Channel C are being displayed by a display device, allows the viewer to view a preferred one among them.

Patent Literatures 4 through 8 each merely disclose a technique for simultaneously switching left and right shutters for a pair of shutter glasses. None of Patent Literatures 4 through 8 thus discloses a mode that allows a viewer to view a 3D video image.

Patent Literature 9 discloses a technique related to shutter control for a case in which a viewer views a 3D video image. Patent Literature 9, however, fails to disclose, in connection with a form in which a plurality of viewers view a plurality of different video images, a technique related to (i) a detailed video image placement or (ii) control of a pair of shutter glasses. The technique of Patent Literature 9 thus fails to allow a plurality of viewers to each view a video image in a mode suitable for the viewer.

The present invention has been accomplished in view of the above problem with conventional art. It is an object of the present invention to provide a display control device, a display control method, a display control program, a computer-readable recording medium, a recording and reproduction device including the display control device, an audio output device, and a recording and reproduction device including an audio output device, each of which allows each individual viewer to view a video image in a mode suitable for the viewer.

Solution to Problem

In order to solve the above problem, a display control device of the present invention is a display control device for controlling an operation of display state switching means including a right-eye shutter and a left-eye shutter each capable of being switched between (i) a displaying state in which a video image displayed by a display device is displayed to a viewer and (ii) a non-displaying state in which the video image displayed by the display device is not displayed to the viewer, the display control device including: display-or-non-display video image determining means for determining, on a basis of (i) video image information about the video image displayed by the display device and (ii) viewing mode information indicative of a viewing mode desired by the viewer for viewing the video image displayed by the display device, whether the video image displayed by the display device is (i) a display video image, which is necessary for the viewing mode and which is displayed to the viewer or (ii) a non-display video image, which is unnecessary for the viewing mode and which is not displayed to the viewer; and shutter operation control means for closing the right-eye shutter and the left-eye shutter when a video image determined by the display-or-non-display video image determining means as the non-display video image is displayed by the display device.

A display control method of the present invention is a display control method for controlling an operation of display state switching means including a right-eye shutter and a left-eye shutter each capable of being switched between (i) a displaying state in which a video image displayed by a display device is displayed to a viewer and (ii) a non-displaying state in which the video image displayed by the display device is not displayed to the viewer, the display control method including the steps of: a display-or-non-display video image determining step for determining, on a basis of (i) video image information about the video image displayed by the display device and (ii) viewing mode information indicative of a viewing mode desired by the viewer for viewing the video image displayed by the display device, whether the video image displayed by the display device is (i) a display video image, which is necessary for the viewing mode and which is displayed to the viewer or (ii) a non-display video image, which is unnecessary for the viewing mode and which is not displayed to the viewer; and a shutter operation control step for closing the right-eye shutter and the left-eye shutter when a video image determined in the display-or-non-display video image determining step as the non-display video image is displayed by the display device.

The display control device (display control method) of the present invention is arranged as follows: The display-or-non-display video image determining means (display/non-display video image determining step) determines whether the video image displayed by the display device is a display video image or a non-display video image. This determination of either a display video image or a non-display video image is made on the basis of (i) video image information about the video image displayed by the display device and (ii) viewing mode information indicative of a viewing mode desired by the viewer for viewing the video image displayed by the display device. The shutter operation control means (shutter operation control step) closes the right-eye shutter and the left-eye shutter of the display state switching means when a video image determined as the non-display video image, which is unnecessary for the viewing mode and which is thus not to be displayed to the viewer, is displayed by the display device.

The above arrangement causes the display control device (display control method) of the present invention to close the right-eye shutter and the left-eye shutter of the display state switching means when a non-display video image is displayed by the display device. The display control device (display control method) thus prevents a non-display video image, unnecessary for the viewing mode, from being viewed by the viewer.

The display control device (display control method) of the present invention therefore allows each viewer to view a video image in a mode suitable for the viewer.

Advantageous Effects of Invention

As described above, a display control device of the present invention includes: display-or-non-display video image determining means for determining, on a basis of (i) video image information about the video image displayed by the display device and (ii) viewing mode information indicative of a viewing mode desired by the viewer for viewing the video image displayed by the display device, whether the video image displayed by the display device is (i) a display video image, which is necessary for the viewing mode and which is displayed to the viewer or (ii) a non-display video image, which is unnecessary for the viewing mode and which is not displayed to the viewer; and shutter operation control means for closing the right-eye shutter and the left-eye shutter when a video image determined by the display-or-non-display video image determining means as the non-display video image is displayed by the display device.

As described above, a display control method of the present invention includes the steps of: a display-or-non-display video image determining step for determining, on a basis of (i) video image information about the video image displayed by the display device and (ii) viewing mode information indicative of a viewing mode desired by the viewer for viewing the video image displayed by the display device, whether the video image displayed by the display device is (i) a display video image, which is necessary for the viewing mode and which is displayed to the viewer or (ii) a non-display video image, which is unnecessary for the viewing mode and which is not displayed to the viewer; and a shutter operation control step for closing the right-eye shutter and the left-eye shutter when a video image determined in the display-or-non-display video image determining step as the non-display video image is displayed by the display device.

The above arrangements make it possible to provide a display control device, a display control method, a display control program, a computer-readable recording medium, a recording and reproduction device including the display control device, and a recording and reproduction device including the audio output device, each of which allows each individual viewer to view a video image in a mode suitable for the viewer.

BRIEF DESCRIPTION OF DRAWINGS

FIG. 1 is a block diagram schematically illustrating a configuration of a recording and reproduction device including a display control device of the present invention.

FIG. 2 shows diagrams each illustrating an arrangement order for a pair of a right-eye video image information item and a left-eye video image information item regularly arranged by a video image arranging section, where (a) is a diagram illustrating an arrangement order of a right-eye video image information item, a left-eye video image information item, and a right-eye video image information item, (b) is a diagram illustrating an arrangement order of a left-eye video image information item, a right-eye video image information item, and a left-eye video image information item, (c) is a diagram illustrating an arrangement order of a right-eye video image information item and a left-eye video image information item, and (d) is a diagram illustrating an arrangement order of a left-eye video image information item and a right-eye video image information item.

FIG. 3 shows diagrams each illustrating an example of switch information generated by a switch information generating section, (a) illustrates a case in which a right-eye video image information item and a left-eye video image information item are arranged as follows: a right-eye video image information item, a left-eye video image information item, and a right-eye video image information item, which make up a single frame, (b) is a diagram illustrating information for instructing an opening/closing operation of a liquid crystal shutter for a case in which the dominant eye of a viewer is the right eye, and (c) is a diagram illustrating information for instructing the opening/closing operation of the liquid crystal shutter for a case in which the dominant eye of a viewer is the left eye.

FIG. 4 shows diagrams each illustrating an example of switch information generated by a switch information generating section, (a) illustrates a case in which a right-eye video image information item and a left-eye video image information item are arranged as follows: a left-eye video image information item, a right-eye video image information item, and a left-eye video image information item, which make up a single frame, (b) is a diagram illustrating information for instructing an opening/closing operation of a liquid crystal shutter for a case in which the dominant eye of a viewer is the right eye, and (c) is a diagram illustrating information for instructing the opening/closing operation of the liquid crystal shutter for a case in which the dominant eye of a viewer is the left eye.

FIG. 5 shows diagrams each illustrating an example of switch information generated by a switch information generating section, (a) illustrates a case in which a right-eye video image information item and a left-eye video image information item are arranged as follows: a right-eye video image information item and a left-eye video image information item, which make up a single frame, (b) is a diagram illustrating information for instructing an opening/closing operation of a liquid crystal shutter for a case in which the dominant eye of a viewer is the right eye, and (c) is a diagram illustrating information for instructing the opening/closing operation of the liquid crystal shutter for a case in which the dominant eye of a viewer is the left eye.

FIG. 6 shows diagrams each illustrating an example of switch information generated by a switch information generating section, (a) illustrates a case in which a right-eye video image information item and a left-eye video image information item are arranged as follows: a left-eye video image information item and a right-eye video image information item, which make up a single frame, (b) is a diagram illustrating information for instructing an opening/closing operation of a liquid crystal shutter for a case in which the dominant eye of a viewer is the right eye, and (c) is a diagram illustrating information for instructing the opening/closing operation of the liquid crystal shutter for a case in which the dominant eye of a viewer is the left eye.

FIG. 12 shows diagrams each illustrating respective operations of display/non-display video image determining section and a shutter operation control section, where (a) is a diagram illustrating timings at which video images A and B are displayed by a display device, (b) is a diagram illustrating a shutter control for spectacles P, and (c) is a diagram illustrating a shutter control for spectacles Q.

FIG. 13 shows diagrams each illustrating respective operations of display/non-display video image determining section and a shutter operation control section, where (a) is a diagram illustrating timings at which video images A and B are displayed by a display device, (b) is a diagram illustrating a shutter control for spectacles P, and (c) is a diagram illustrating a shutter control for spectacles Q.

FIG. 14 shows diagrams each illustrating respective operations of display/non-display video image determining section and a shutter operation control section, where (a) is a diagram illustrating timings at which video images A through C are displayed by a display device, (b) is a diagram illustrating a shutter control for spectacles P, and (c) is a diagram illustrating a shutter control for spectacles Q.

FIG. 15 is a diagram illustrating timings at which video images A through F are displayed by a display device and respective shutter controls for spectacles P through spectacles R at the timings.

DESCRIPTION OF EMBODIMENTS

Embodiment 1

Figure 7:
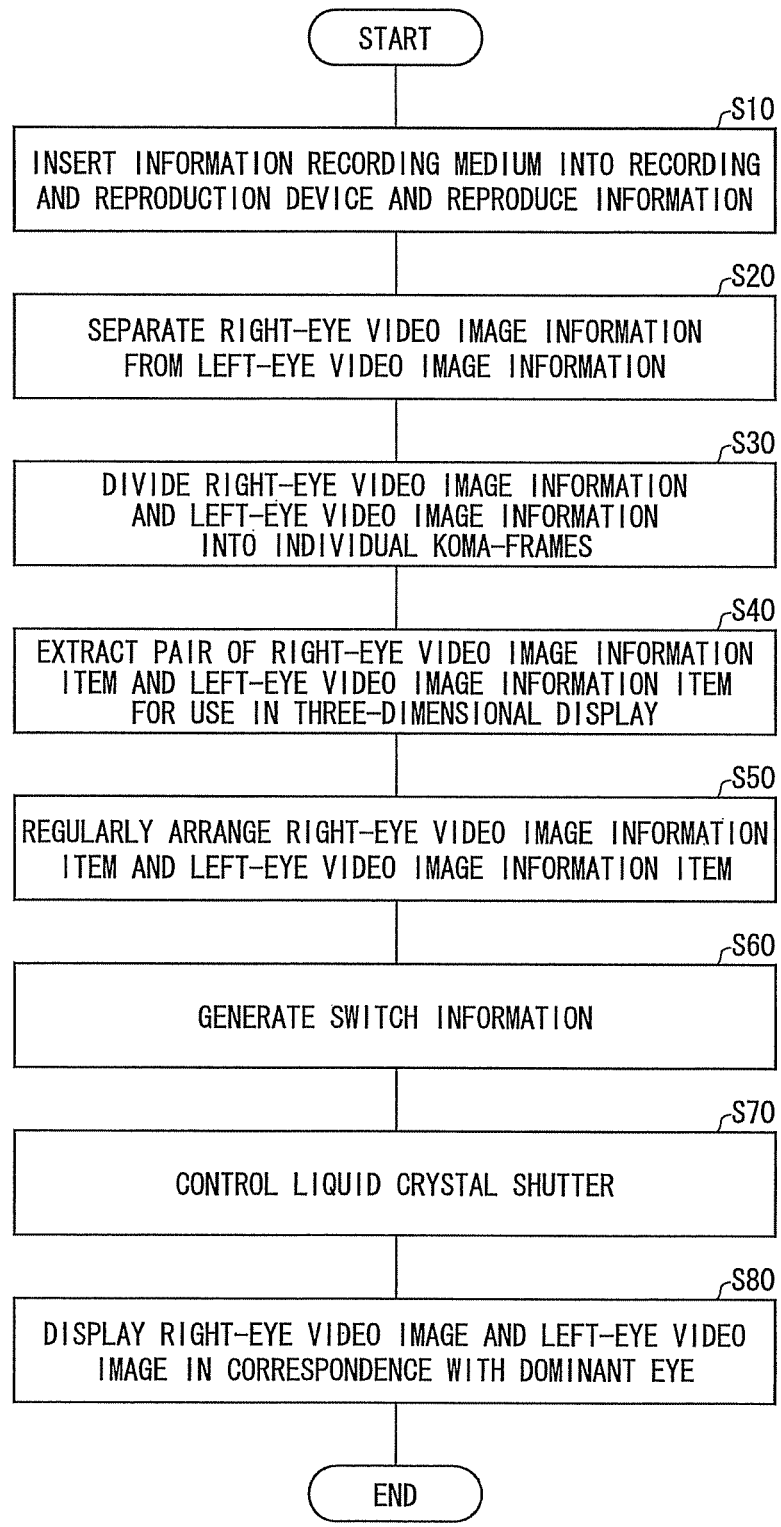
FIG. 7 is a flowchart illustrating an operation of a display control device and a recording and reproduction device.

The following describes a display control device and a three-dimensional video image display method of the present invention with reference to drawings. The description below uses a single reference numeral for identical components or constituents, which also share an identical name and function. The description below thus does not repeatedly deal with such identical components or constituents in detail.

The display control device 1 of the present invention is outlined as follows: The display control device 1 includes: a video image extracting section (extracting means) 30 that extracts, from among a plurality of right-eye video image information items and left-eye video image information items, a pair of a right-eye video image information item and a left-eye video image information item for use in a three-dimensional display; a video image arranging section (arranging means) 40 that regularly arranges the right-eye video image information item and the left-eye video image information item both extracted by the video image extracting section 30; and a switch information generating section (switch information generating means) 50 that, on the basis of (i) an arrangement order of the right-eye video image information item and the left-eye video image information item arranged by the video image arranging section 40 and (ii) dominant-eye information indicative of whether the dominant eye of a viewer is the right eye or the left eye, generates switch information for use by a liquid crystal shutter (display state switching means) 500 in switching between a displaying state and a non-displaying state of a right-eye video image and a left-eye video image.

With this arrangement, the display control device 1 advantageously eliminates a cause of 3D sickness.

The following outlines the display control device 1.

[Schematic Configuration of Display Control Device 1]

FIG. 1 is a block diagram schematically illustrating a configuration of a recording and reproduction device 100 including the display control device 1. The recording and reproduction device 100, as illustrated in FIG. 1, includes at least the display control device 1 and an information reproducing section 110.

The recording and reproduction device 100 records and reproduces information onto and from an information recording medium such as an optical disc. The recording medium may be, for example, (i) a tape such as a magnetic tape and a cassette tape, (ii) a disc such as a magnetic disc (for example, a Floppy[®] disc or a hard disc) and an optical disc (for example, a CD-ROM, an MO, an MD, a DVD, a CD-R, or BR), (iii) a card such as an IC card (memory card) and an optical card, or (iv) a semiconductor memory such as a mask ROM, an EPROM, an EEPROM, and a flash ROM.

The information recording medium of the present embodiment stores (i) right-eye video image information, which is information on a plurality of right-eye video images and (ii) left-eye video image information, which is information on a plurality of left-eye video images.

The right-eye video images and the left-eye video images are displayed toward the left eye and the right eye, respectively, so that a three-dimensional display is carried out with use of parallax between the left and right eyes.

The right-eye video image information and the left-eye video image information include, for example, (i) video image data of right-eye video images and of left-eye video images or (ii) attribute information indicative of the respective attributes of right-eye video images and left-eye video images (for example, information indicative of whether the image is a right-eye image or a left-eye video image, and parallax angle information indicative of a parallax angle between a right-eye video image and a left-eye video image).

The right-eye video image information and the left-eye video image information may alternatively include complementary information for converting a two-dimensional video image into a three-dimensional video image (hereinafter also referred to simply as "3D conversion"). Specifically, the complementary information for the 3D conversion is not necessarily actual video image data, but may be information on a difference with respect to two-dimensional video image content (that is, a right-eye video image or a right-eye video image). The complementary information does not even need to be related to video image data: it can thus be any complementary information for use in converting a two-dimensional video image into a three-dimensional video image.

The information reproducing section 110 reproduces information stored on an information recording medium inserted in the recording and reproduction device 100. The information reproducing section 110 reproduces a plurality of right-eye video image information items and left-eye video image information items stored on the above information recording medium. The information reproducing section 110 can use an information reproducing method used in a conventional recording and reproduction device, and is thus not described in detail here.

The display control device 1 is capable of preventing so-called 3D sickness. The display control device 1, as illustrated in FIG. 1, includes: a right/left video image separating section 10; a koma-frame video image dividing section 20; a video image extracting section 30; a video image arranging section 40; and a switch information generating section 50.

The right/left video image separating section 10 obtains a plurality of right-eye video image information items and left-eye video image information items reproduced by the information reproducing section 110, and thus separates right-eye video image information from left-eye video image information.

Such separation can be carried out by, for example, the following method: The right/left video image separating section 10 can separate right-eye video image information from left-eye video image information on the basis of (i) attribute information indicative of the respective attributes of a right-eye video image and a left-eye video image both reproduced by the information reproducing section 110 or (ii) parallax angle information of a right-eye video image and a left-eye video image. Alternatively, in the case where the right-eye video image information and the left-eye video image information are video image data itself of a right-eye video image and of a left-eye video image respectively, the right/left video image separating section 10 can separate right-eye video image information from left-eye video image information by a known image processing technique on the basis of, for example, the parallax angle between a right-eye video image and a left-eye video image.

In a case where the right-eye video image information and the left-eye video image information include complementary information for the 3D conversion of a two-dimensional video image, a video image information generating section (not shown in FIG. 1) provided between the information reproducing section 110 and the right/left video image separating section 10 may generate right-eye video image information and left-eye video image information on the basis of the complementary information. The right/left video image separating section 10 may then separate right-eye video image information from left-eye video image information by the above method on the basis of the right-eye video image information and the left-eye video image information generated by the video image information generating section.

The right/left video image separating section 10, after separating right-eye video image information from left-eye video image information, supplies the thus separated right-eye video image information and left-eye video image information to the koma-frame video image dividing section 20.

The koma-frame video image dividing section 20 obtains, from the right/left video image separating section 10, the right-eye video image information and the left-eye video image information separated from each other. The koma-frame video image dividing section 20 then divides each of the right-eye video image information and the left-eye video image information thus obtained into individual koma-frames. A "koma-frame" as used herein can be construed as a minimum unit of a right-eye video image and a left-eye video image for the case in which a three-dimensional display is carried out by displaying a right-eye video image and a left-eye video image respectively for the right eye and the left eye.

The koma-frame video image dividing section 20 then stores, in a memory section 200, the right-eye video image information and the left-eye video image information both as divided into individual koma-frames.

In the case where the information recording medium inserted in the recording and reproduction device 100 stores right-eye video image information and left-eye video image information such that they are (i) separated from each other and (ii) each divided into individual koma-frames, such right-eye video image information and left-eye video image information may be directly stored in the memory section 200 via the right/left video image separating section 10 and the koma-frame video image dividing section 20.

When storing in the memory section 200 the right-eye video image information and the left-eye video image information both as divided into individual koma-frames, the koma-frame video image dividing section 20 may, on the basis of such information as (i) attribute information indicative of the attribute of a right-eye video image or a left-eye video image, (ii) time information indicative of the time at which the right-eye video image or left-eye video image was captured, or (iii) order information indicative of the order in which the individual koma-frames are to be displayed on a display screen, alternatively assign, to each of the individual koma-frames of the right-eye video image information and the left-eye video image information, a unique identifier indicative of, for example, (i) whether the koma-frame is of the right-eye video image information or of the left-eye video image information and/or (ii) the order in which the individual koma-frames are to be displayed on the display screen. This arrangement allows the video image extracting section 30 described below to easily extract, from among a plurality of right-eye video image information items and left-eye video image information items both in the form of individual koma-frames, a pair of a right-eye video image information item and a left-eye video image information item for use in a three-dimensional display.

The memory section 200 stores right-eye video image information and left-eye video image information both as divided into individual koma-frames. The memory section 200 may be either (i) a RAM (random access memory), a ROM (read only memory), a SRAM (static RAM), a flash memory, a cache or the like, or (ii) a combination of any of the above. The memory section 200 is preferably a HDD (hard disc drive) in a case where information with a large data size is to be stored, but is not limited to that. The memory section 200 illustrated in FIG. 1 is provided externally to the recording and reproduction device 100, but may instead be provided inside the recording and reproduction device 100.

The video image extracting section 30 accesses the memory section 200 to extract, from among a plurality of right-eye video image information items and left-eye video image information items both in the form of individual koma-frames, a pair of a right-eye video image information item and a left-eye video image information item for use in a three-dimensional display.

The above "pair of a right-eye video image information item and a left-eye video image information item" refers to a right-eye video image information item and a left-eye video image information item to be displayed successively when a three-dimensional video image is displayed. In other words, a 3D video image is displayed by displaying a right-eye video image and a left-eye video image in a sequence by use of parallax between the right and left eyes. The description herein thus uses the expression "pair of a right-eye video image information item and a left-eye video image information item" to refer to a right-eye video image information item and a left-eye video image information item, which are related respectively to a right-eye video image and a left-eye video image to be displayed in a sequence.

The video image extracting section 30 can extract a pair of a right-eye video image information item and a left-eye video image information item by, for example, the following method: In the case where the right-eye video image information and the left-eye video image information include attribute information that includes such information as (i) time information indicative of the time at which the right-eye video image or left-eye video image was captured or (ii) order information indicative of the order in which the right-eye video image and the left-eye video image are to be displayed on a display screen, the video image extracting section 30 can extract a pair of a right-eye video image information item and a left-eye video image information item on the basis of the attribute information.

Alternatively, in the case where the memory section 200 stores in advance, as a pair, a right-eye video image information item and a left-eye video image information item each as divided into an individual koma-frame, the video image extracting section 30 may extract such a pair of a right-eye video image information item and a left-eye video image information item directly from the memory section 200.

Further alternatively, in the case where the video image extracting section 30 has assigned a unique identifier to each of a right-eye video image information item and a left-eye video image information item, the video image extracting section 30 may extract a pair of a right-eye video image information item and a left-eye video image information item on the basis of such a unique identifier.

The video image extracting section 30, after extracting a pair of a right-eye video image information item and a left-eye video image information item as above, supplies the pair of a right-eye video image information item and a left-eye video image information item to the video image arranging section 40.

The video image arranging section 40 obtains a pair of a right-eye video image information item and a left-eye video image information item from the video image extracting section 30, and regularly arranges the right-eye video image information item and the left-eye video image information item. This regular arrangement refers to arranging a pair of a right-eye video image information item and a left-eye video image information item in one of the orders (a) through (d) exemplified below.

(a) right-eye video image information item, left-eye video image information item, right-eye video image information item (b) left-eye video image information item, right-eye video image information item, left-eye video image information item (c) right-eye video image information item, left-eye video image information item (d) left-eye video image information item, right-eye video image information item The order (a) shows two instances of "right-eye video image information item", which refer to an identical video image. Similarly, the order (b) shows two instances of "left-eye video image information item", which refer to an identical video image.

The orders (c) and (d) each refer to an arrangement selected by the video image arranging section 40 in a case where a right-eye video image and a left-eye video image are so finely divided into individual koma-frames that the difference between video images for respective koma-frames cannot be recognized.

FIG. 2 is a diagram illustrating an arrangement order in which the video image arranging section 40 regularly arranges a pair of a right-eye video image information item and a left-eye video image information item. (a) through (d) of FIG. 2 correspond to the respective arrangements (a) through (d) above. The following describes (a) through (d) of FIG. 2.

(a) of FIG. 2 illustrates the pair of a right-eye video image information item and a left-eye video image information item regularly arranged in the following order: the right-eye video image information item, the left-eye video image information item, and the right-eye video image information item, which make up a single frame. All subsequent frames each similarly consist of a right-eye video image information item, a left-eye video image information item, and the right-eye video image information item regularly arranged in that order.

(b) of FIG. 2 illustrates the pair of a right-eye video image information item and a left-eye video image information item regularly arranged in the following order: the left-eye video image information item, the right-eye video image information item, and the left-eye video image information item, which make up a single frame. All subsequent frames each similarly consist of a left-eye video image information item, a right-eye video image information item, and the left-eye video image information item regularly arranged in that order.

(c) of FIG. 2 illustrates the pair of a right-eye video image information item and a left-eye video image information item regularly arranged in the following order: the right-eye video image information item and the left-eye video image information item, which make up a single frame. All subsequent frames each similarly consist of a right-eye video image information item and a left-eye video image information item regularly arranged in that order.

(d) of FIG. 2 illustrates the pair of a right-eye video image information item and a left-eye video image information item regularly arranged in the following order: the left-eye video image information item and the right-eye video image information item, which make up a single frame. All subsequent frames each similarly consist of a left-eye video image information item and a right-eye video image information item regularly arranged in that order.

The video image arranging section 40 can, in regularly arranging the pair of a right-eye video image information item and a left-eye video image information item, select one of the patterns (a) through (d) as appropriate in correspondence with, for example, the dominant eye of a viewer and/or how finely a video image is divided into individual koma-frames.

The video image arranging section 40 supplies the right-eye video image information item and the left-eye video image information item, arranged in one of the orders (a) through (d), to the switch information generating section 50.

The switch information generating section 50 obtains, from the video image arranging section 40, the right-eye video image information item and the left-eye video image information item regularly arranged by the video image arranging section 40. In other words, the switch information generating section 50 obtains the arrangement order of the right-eye video image information item and the left-eye video image information item arranged by the video image arranging section 40. The switch information generating section 50 further obtains, from an operation section 300, dominant eye information indicative of whether the dominant eye of a viewer is the right eye or the left eye.

The operation section 300 is operated by a viewer to enter, in the switch information generating section 50, dominant eye information indicative of whether the dominant eye of the viewer is the right eye or the left eye. The operation section 300 includes, for example, (i) a remote control for remotely operating the display control device 1, (ii) an operation button attached to the display control device 1, or (iii) a mouse, a keyboard and/or the like connected to the display control device 1. The viewer uses the operation section 300 to input an instruction signal, which is transmitted, via an input-output control section (not show), to each of the functional blocks described above. The viewer can thus enter dominant eye information in the switch information generating section 50.

The switch information generating section 50, on the basis of (i) the arrangement order of the right-eye video image information item and the left-eye video image information item arranged by the video image arranging section 40 and (ii) dominant-eye information indicative of whether the dominant eye of a viewer is the right eye or the left eye, generates switch information for use in switching between display or non-display of a video image by a liquid crystal shutter 500 described below.

The following describes, with reference to FIGS. 3 through 6, examples of switch information generated by the switch information generating section 50.

(a) of FIG. 3 illustrates a case in which a right-eye video image information item and a left-eye video image information item are arranged in the following order: the right-eye video image information item, the left-eye video image information item, and the right-eye video image information item, which make up a single frame. (b) of FIG. 3 illustrates information for instructing an opening/closing operation of a liquid crystal shutter for the case in which the dominant eye of a viewer is the right eye, whereas (c) of FIG. 3 illustrates information for instructing the opening/closing operation of the liquid crystal shutter for the case in which the dominant eye of a viewer is the left eye.

In the case where the video image arranging section 40 arranges a right-eye video image information item and a left-eye video image information item as illustrated in (a) of FIG. 3 in the order of the right-eye video image information item, the left-eye video image information item, and the right-eye video image information item, which are designated as first to third video image information items respectively, the switch information generating section 50, in the case where the dominant eye of a viewer is the right eye, controls the opening/closing operation of the liquid crystal shutter 500 as illustrated in (b) of FIG. 3 on the basis of switch information generated by the switch information generating section 50. Specifically, the switch information generating section 50 controls the opening/closing operation of the liquid crystal shutter 500 such that (i) a right-eye shutter is opened and a left-eye shutter is closed for the first video image information item, (ii) the right-eye shutter is closed and the left-eye shutter is opened for the second video image information item, and (iii) the right-eye and left-eye shutters are both closed for the third video image information item.

The present embodiment uses the term "switch information" to refer to information illustrated in (b) and (c) of FIG. 3 for instructing an opening/closing operation of a liquid crystal shutter. This applies also to FIGS. 4 through 6 described below.

The switch information generating section 50, in the case where the dominant eye of a viewer is the left eye, controls the opening/closing operation of the liquid crystal shutter 500 as illustrated in (c) of FIG. 3 on the basis of switch information generated by the switch information generating section 50. Specifically, the switch information generating section 50 controls the opening/closing operation of the liquid crystal shutter 500 such that (i) the right-eye and left-eye shutters are both closed for the first video image information item, (ii) the right-eye shutter is closed and the left-eye shutter is opened for the second video image information item, and (iii) the right-eye shutter is opened and the left-eye shutter is closed for the third video image information item.

(a) of FIG. 4 illustrates a case in which a right-eye video image information item and a left-eye video image information item are arranged in the following order: the left-eye video image information item, the right-eye video image information item, and the left-eye video image information item, which make up a single frame. (b) of FIG. 4 illustrates information for instructing the opening/closing operation of the liquid crystal shutter for the case in which the dominant eye of a viewer is the right eye, whereas (c) of FIG. 4 illustrates information for instructing the opening/closing operation of the liquid crystal shutter for the case in which the dominant eye of a viewer is the left eye.

In the case where the video image arranging section 40 arranges a right-eye video image information item and a left-eye video image information item as illustrated in (a) of FIG. 4 in the order of the left-eye video image information item, the right-eye video image information item, and the left-eye video image information item, which are designated as first to third video image information items respectively, the switch information generating section 50, in the case where the dominant eye of a viewer is the right eye, controls the opening/closing operation of the liquid crystal shutter 500 as illustrated in (b) of FIG. 4 on the basis of switch information generated by the switch information generating section 50. Specifically, the switch information generating section 50 controls the opening/closing operation of the liquid crystal shutter 500 such that (i) the right-eye and left-eye shutters are both closed for the first video image information item, (ii) the right-eye shutter is opened and the left-eye shutter is closed for the second video image information item, and (iii) the right-eye shutter is closed and the left-eye shutter is opened for the third video image information item.

The switch information generating section 50, in the case where the dominant eye of a viewer is the left eye, controls the opening/closing operation of the liquid crystal shutter 500 as illustrated in (c) of FIG. 4 on the basis of switch information generated by the switch information generating section 50. Specifically, the switch information generating section 50 controls the opening/closing operation of the liquid crystal shutter 500 such that (i) the right-eye shutter is closed and the left-eye shutter is opened for the first video image information item, (ii) the right-eye shutter is opened and the left-eye shutter is closed for the second video image information item, and (iii) the right-eye and left-eye shutters are both closed for the third video image information item.

(a) of FIG. 5 illustrates a case in which a right-eye video image information item and a left-eye video image information item are arranged in the following order: the right-eye video image information item and the left-eye video image information item, which make up a single frame. (b) of FIG. 5 illustrates information for instructing the opening/closing operation of the liquid crystal shutter for the case in which the dominant eye of a viewer is the right eye, whereas (c) of FIG. 5 illustrates information for instructing the opening/closing operation of the liquid crystal shutter for the case in which the dominant eye of a viewer is the left eye.

In the case where the video image arranging section 40 arranges a right-eye video image information item and a left-eye video image information item as illustrated in (a) of FIG. 5 in the order of the right-eye video image information item and the left-eye video image information item, which are designated as first and second video image information items respectively, the switch information generating section 50, in the case where the dominant eye of a viewer is the right eye, controls the opening/closing operation of the liquid crystal shutter 500 as illustrated in (b) of FIG. 5 on the basis of switch information generated by the switch information generating section 50. Specifically, the switch information generating section 50 controls the opening/closing operation of the liquid crystal shutter 500 such that (i) the right-eye shutter is opened and the left-eye shutter is closed for the first video image information item and (ii) the right-eye shutter is closed and the left-eye shutter is opened for the second video image information item.

The switch information generating section 50, in the case where the dominant eye of a viewer is the left eye, controls the opening/closing operation of the liquid crystal shutter 500 as illustrated in (c) of FIG. 5 on the basis of switch information generated by the switch information generating section 50. Specifically, the switch information generating section 50 controls the opening/closing operation of the liquid crystal shutter 500 such that (i) the right-eye and left-eye shutters are both closed for the first video image information item and (ii) the right-eye shutter is closed and the left-eye shutter is opened for the second video image information item, and such that, in the case where a right-eye video image information item and a left-eye video image information item further extracted by the video image arranging section 40 are designated as third and fourth video image information items respectively, (iii) the right-eye shutter is opened and the left-eye shutter is closed for the third video image information item, and (iv) the right-eye shutter is closed and the left-eye shutter is opened for the fourth video image information item.

(a) of FIG. 6 illustrates a case in which a right-eye video image information item and a left-eye video image information item are arranged in the following order: the left-eye video image information item and the right-eye video image information item, which make up a single frame. (b) of FIG. 6 illustrates information for instructing the opening/closing operation of the liquid crystal shutter for the case in which the dominant eye of a viewer is the right eye, whereas (c) of FIG. 6 illustrates information for instructing the opening/closing operation of the liquid crystal shutter for the case in which the dominant eye of a viewer is the left eye.

In the case where the video image arranging section 40 arranges a right-eye video image information item and a left-eye video image information item as illustrated in (a) of FIG. 6 in the order of the left-eye video image information item and the right-eye video image information item, which are designated as first and second video image information items respectively, the switch information generating section 50, in the case where the dominant eye of a viewer is the right eye, controls the opening/closing operation of the liquid crystal shutter 500 as illustrated in (b) of FIG. 6 on the basis of switch information generated by the switch information generating section 50. Specifically, the switch information generating section 50 controls the opening/closing operation of the liquid crystal shutter 500 such that (i) the right-eye and left-eye shutters are both closed for the first video image information item and (ii) the right-eye shutter is opened and the left-eye shutter is closed for the second video image information item, and such that, in the case where a right-eye video image information item and a left-eye video image information item further extracted by the video image arranging section 40 are designated as third and fourth video image information items respectively, (iii) the right-eye shutter is closed and the left-eye shutter is opened for the third video image information item, and (iv) the right-eye shutter is opened and the left-eye shutter is closed for the fourth video image information item.

The switch information generating section 50, in the case where the dominant eye of a viewer is the left eye, controls the opening/closing operation of the liquid crystal shutter 500 as illustrated in (c) of FIG. 6 on the basis of switch information generated by the switch information generating section 50. Specifically, the switch information generating section 50 controls the opening/closing operation of the liquid crystal shutter 500 such that (i) the right-eye shutter is closed and the left-eye shutter is opened for the first video image information item and (ii) the right-eye shutter is opened and the left-eye shutter is closed for the second video image information item.

The switch information generating section 50 described above obtains, from the operation section 300, dominant-eye information indicative of whether the dominant eye of a viewer is the right eye or the left eye. The viewer is, however, not necessarily a single person, but may be two or more persons. Specifically, two or more viewers may enter dominant eye information indicative of their respective dominant eyes.

The switch information generating section 50, after generating switch information, supplies the switch information to a display device 400. The switch information generating section 50 further supplies, to the display device 400, the right-eye video image information item and the left-eye video image information item regularly arranged by the video image arranging section 40. The display device 400 may alternatively obtain the right-eye video image information item and the left-eye video image information item, regularly arranged by the video image arranging section 40, from the video image arranging section 40.

The display device 400 obtains, from either the video image arranging section 40 or the switch information generating section 50, the right-eye video image information item and the left-eye video image information item regularly arranged by the video image arranging section 40. The display device 400 then causes a display section (not shown) to display a right-eye video image and a left-eye video image included respectively in the right-eye video image information item and the left-eye video image information item.

Specifically, the display device 400 includes a display control section (not shown) that converts the right-eye video image information item and the left-eye video image information item, which are regularly arranged by the video image arranging section 40 and obtained from either the video image arranging section 40 or the switch information generating section 50, into respective signals for causing the display section to display a right-eye video image and a left-eye video image in a state that allows a viewer to view the right-eye video image and the left-eye video image. The display control section then causes the display section to display the right-eye video image and the left-eye video image included respectively in the right-eye video image information item and the left-eye video image information item both as converted. The display section is, for example, a TV or a projector.

Further, the display device 400 supplies, to the liquid crystal shutter 500 of a display state switching section (display state switching means) 700, switch information obtained from the switch information generating section 50. The display state switching section 700 may alternatively obtain switch information directly from the switch information generating section 50.

The display state switching section 700 includes at least the liquid crystal shutter 500 and spectacles 600.

The liquid crystal shutter 500 has a three-layer structure including a first polarizing plate, a liquid crystal filter, and a second polarizing plate, and is thus designed to be capable of switching between two transmitted polarized light beams with use of the liquid crystal filter. The liquid crystal shutter 500 is attached to the spectacles 600. The display device 400 is connected to the liquid crystal shutter 500 by a cable 4. The liquid crystal shutter 500 carries out its opening/closing operation on the basis of switch information obtained from the display device 400 (or the switch information generating section 50). The opening/closing operation is described above in detail with reference to FIGS. 3 through 6, and is thus not described here in detail.

The spectacles 600 allow a viewer to view, with use of the liquid crystal shutter 500, right-eye video images and left-eye video images arranged in a predetermined frame order (koma-frame order).

The above arrangement can achieve the advantage described below. Specifically, in the case where (i) two or more viewers enter, in the switch information generating section 50, dominant eye information indicative of their respective dominant eyes and (ii) the viewers share a single display device or the liquid crystal shutter 500 is attached only to such a single display device 400, the display or non-display of right-eye video images and left-eye video images is controlled with use of only the liquid crystal shutter 500 attached to that display device 400. With this arrangement, if the viewers have different dominant eyes out of the right and left eyes, it is impossible to display, in the order in which a main video image precedes an auxiliary video image, a right-eye video image and a left-eye video image to each individual viewer in consideration of the dominant eye of the viewer.

In the present embodiment, the liquid crystal shutter 500 attached to the spectacles 600 allows, even in the case where the viewers have different dominant eyes out of the right and left eyes, switch information to be individually inputted to the liquid crystal shutter 500 attached to spectacles used by each viewer. The display state switching section 700 thus allows a right-eye video image and a left-eye video image to be displayed to each viewer in the order in which a main video image precedes an auxiliary video image. The liquid crystal shutter 500 is preferably attached to the spectacles 600 for such a reason.

The display section of the display device 400 needs to display a right-eye video image and a left-eye video image in synchronization with the opening and closing, based on switch information, of the right-eye and the left-eye shutters of the liquid crystal shutter 500 attached to the spectacles 600. Such synchronization may be carried out by a known method, so the synchronization method is not described here in detail.

The display state switching section 700 illustrated in FIG. 1 includes a liquid crystal shutter. The display state switching section 700 may, however, alternatively be based on any of various time sharing three-dimensional display systems such as an RGB band dividing filter spectacles system.

The display control device 1 described above includes the right/left video image separating section 10, the koma-frame video image dividing section 20, the video image extracting section 30, the video image arranging section 40, and the switch information generating section 50. Alternatively, the right/left video image separating section 10 and/or the koma-frame video image dividing section 20 may be provided externally to the display control device 1.

The display device 400 described above is connected to the liquid crystal shutter 500 via a cable 4. The display device 400 and the liquid crystal shutter 500 may alternatively be arranged such that signals can be transmitted and received wirelessly therebetween.

[Operation Flow for Display Control Device 1 and Recording and Reproduction Device 100]

The following describes a flow of an operation carried out by the display control device 1 and the recording and reproduction device 100 with reference to FIG. 7. FIG. 7 is a flowchart illustrating the operation of the display control device 1 and the recording and reproduction device 100.

First, in S10, an information recording medium is inserted into the recording and reproduction device 100. The information recording medium stores a plurality of right-eye video image information items and left-eye video image information items. The information reproducing section 110 of the recording and reproduction device 100 thus reproduces the right-eye video image information and the left-eye video image information.

In S20, the right/left video image separating section 10 obtains the right-eye video image information and the left-eye video image information reproduced by the information reproducing section 110, and then separates the right-eye video image information from the left-eye video image information. The method for the separation is described above, and is thus not described here in detail.

In S30, the koma-frame video image dividing section 20 obtains, from the right/left video image separating section 10, the right-eye video image information and the left-eye video image information separated from each other as above. The koma-frame video image dividing section 20 then divides each of the right-eye video image information and the left-eye video image information obtained as above into individual koma-frames. A "koma-frame" as used herein can be construed as a minimum unit of a right-eye video image and a left-eye video image for the case in which a three-dimensional display is carried out by displaying a right-eye video image and a left-eye video image respectively for the right eye and the left eye. The koma-frame video image dividing section 20 stores, in the memory section 200, the right-eye video image information and the left-eye video image information both as divided into individual koma-frames.

In S40, the video image extracting section 30 accesses the memory section 200 to extract, from among the right-eye video image information items and the left-eye video image information items both in the form of individual koma-frames, a pair of a right-eye video image information item and a left-eye video image information item for use in a three-dimensional display. The above "pair of a right-eye video image information item and a left-eye video, image information item" refers to a right-eye video image information item and a left-eye video image information item to be displayed successively when a three-dimensional video image is displayed.

In S50, the video image arranging section 40 obtains a pair of a right-eye video image information item and a left-eye video image information item from the video image extracting section 30, and regularly arranges the right-eye video image information item and the left-eye video image information item. The arrangement has an order of, for example, (a) right-eye video image information item, left-eye video image information item, right-eye video image information item; (b) left-eye video image information item, right-eye video image information item, left-eye video image information item; (c) right-eye video image information item, left-eye video image information item; or (d) left-eye video image information item, right-eye video image information item.

In S60, the switch information generating section 50 obtains, from the video image arranging section 40, the right-eye video image information item and the left-eye video image information item regularly arranged by the video image arranging section 40. In other words, the switch information generating section 50 obtains the arrangement order of the right-eye video image information item and the left-eye video image information item arranged by the video image arranging section 40. The switch information generating section 50 further obtains, from the operation section 300, dominant eye information indicative of whether the dominant eye of a viewer is the right eye or the left eye.

Then, the switch information generating section 50, on the basis of (i) the arrangement order of the right-eye video image information item and the left-eye video image information item arranged by the video image arranging section 40 and (ii) dominant-eye information indicative of whether the dominant eye of a viewer is the right eye or the left eye, generates switch information for use in switching between display or non-display of a video image by the liquid crystal shutter 500 described below.

Next, the switch information generating section 50 supplies the switch information to the display device 400. The switch information generating section 50 further supplies, to the display device 400, the right-eye video image information item and the left-eye video image information item regularly arranged by the video image arranging section 40. The display device 400 may alternatively obtain the right-eye video image information item and the left-eye video image information item, regularly arranged by the video image arranging section 40, from the video image arranging section 40.

In S70, the display device 400 obtains; from either the video image arranging section 40 or the switch information generating section 50, the right-eye video image information item and the left-eye video image information item regularly arranged by the video image arranging section 40. The display device 400 then causes the display section (not shown) to display a right-eye video image and a left-eye video image included respectively in the right-eye video image information item and the left-eye video image information item. Further, the display device 400 supplies, to the liquid crystal shutter 500 of the display state switching section 700, the switch information obtained from the switch information generating section 50. The display state switching section 700 may alternatively obtain switch information directly from the switch information generating section 50.

The liquid crystal shutter 500 carries out its opening/closing operation on the basis of the switch information obtained from the display device 400 or the switch information generating section 50.

In S80, the display state switching section 700, on the basis of the switch information and in consideration of (i) the arrangement order of a right-eye video image and a left-eye video image for use in a three-dimensional display and (ii) the dominant eye of a viewer, switches between a displaying state and a non-displaying state for each of the right-eye video image and the left-eye video image. Specifically, in the case where the dominant eye of a viewer is the right eye, the display state switching section 700 can first (i) set the right-eye video image to a displaying state and the left-eye video image to a non-displaying state and then (ii) set the auxiliary video image to a displaying state and the main video image to a non-displaying state. In other words, the display state switching section 700 can, in accordance with the opening/closing operation of the liquid crystal shutter 500 described with reference to FIGS. 3 through 6, display to the viewer a video image on the side of the dominant eye first and a video image on the side of the eye other than the dominant eye next.

[Advantages Achieved by Display Control Device 1]

The following describes advantages achieved by the display control device 1.

According to the above arrangement, the display control device 1 controls the liquid crystal shutter 500 of the display state switching section 700, which is capable of switching between a displaying state and a non-displaying state for each of a right-eye video image and a left-eye video image for use in a three-dimensional display.

The liquid crystal shutter 500 is used to switch each of a right-eye video image and a left-eye video image between a displaying state and a non-displaying state on the basis of switch information generated by the switch information generating section 50. This switch information is generated as follows: The video image extracting section 30 extracts, from among a plurality of right-eye video image information items and left-eye video image information items, a pair of a right-eye video image information item and a left-eye video image information item for use in a three-dimensional display. The video image arranging section 40 then regularly arranges the pair of a right-eye video image information item and a left-eye video image information item thus extracted. On the basis of this arrangement order and dominant-eye information indicative of whether the dominant eye of a viewer is the right eye or the left eye, switch information is generated.

The display state switching section 700 can thus, in consideration of (i) the arrangement order of a right-eye video image and a left-eye video image for use in a three-dimensional display and (ii) the dominant eye of a viewer, switch each of the right-eye video image and the left-eye video image between a displaying state and a non-displaying state. Specifically, in the case where the dominant eye of a viewer is the right eye, the display state switching section 700 can first (i) set the right-eye video image (hereinafter a video image on the side of the dominant eye is also referred to as "main video image") to a displaying state and the left-eye video image (hereinafter a video image on the side of the eye other than the dominant eye is also referred to as "auxiliary video image") to a non-displaying state and then (ii) set the auxiliary video image to a displaying state and the main video image to a non-displaying state.

This arrangement allows the display control device 1 to display a main video image and an auxiliary video image in that order. This in turn advantageously prevents 3D sickness, which is believed to be caused as follows: When an auxiliary video image and a main video image are displayed in that order, the brain (i) senses, as a sickness, a gap between "motion of a scene currently being viewed" and "actual motion of the osseous semicircular canals" and (ii) is confused as a result.

Further, in the case where, for example, the video image extracting section 30 extracts, from among a plurality of right-eye video image information items and left-eye video image information items both stored on an information recording medium, a pair of a right-eye video image information item and a left-eye video image information item for use in a three-dimensional display, the above arrangement eliminates the need to doubly store video image information on the information recording medium, that is, video image information including a right-eye video image information item and a left-eye video image information item with different arrangements corresponding to the dominant eye of each viewer. The above arrangement thus makes it possible to reduce the cost of producing the information recording medium.

The video image arranging section 40 of the display control device 1 preferably arranges the pair of a right-eye video image information item and a left-eye video image information item, both extracted by the video image extracting section 30, in one of the following orders:

(1) right-eye video image information item, left-eye video image information item, right-eye video image information item (2) left-eye video image information item, right-eye video image information item, left-eye video image information item (3) right-eye video image information item, left-eye video image information item (4) left-eye video image information item, right-eye video image information item In the orders (1) and (2) above, the video image arranging section 40 arranges the right-eye video image information item and the left-eye video image information item, both extracted by the video image extracting section 30, regularly as three instances of video image information. This arrangement makes it possible to create, in correspondence with the dominant eye of each viewer, a video image not to be displayed to the viewer.

Thus, the display control device 1, in consideration of whether the dominant eye of a viewer is the right eye or the left eye, allows the brain of the viewer to first recognize a video image that should be recognized first. This arrangement can thus prevent the viewer from suffering from 3D sickness.

In the orders (3) and (4) above, the video image arranging section 40 arranges the right-eye video image information item and the left-eye video image information item, both extracted by the video image extracting section 30, regularly as two instances of video image information. These are arrangement orders applicable in a case where the right-eye video image and the left-eye video image are so finely divided into individual koma-frames that the difference between the video images cannot be recognized.

The display control device 1 is, as described above, arranged such that the video image arranging section 40 can regularly and variously arrange, on the basis of the right-eye video image and the left-eye video image, a pair of a right-eye video image information item and a left-eye video image information item both extracted by the video image extracting section 30. The display control device 1 thus, (i) regardless of the arrangement order and (ii) in consideration of whether the dominant eye of a viewer is the right eye or the left eye, allows the brain of the viewer to first recognize a video image that should be recognized first.

The display control device 1 can thus prevent a viewer from suffering from 3D sickness.

Further, the display control device 1 is preferably arranged such that in the case where the display state switching section 700 includes a liquid crystal shutter 500 having two shutters corresponding respectively to the right eye and the left eye, the switch information generating section 50 controls respective opening/closing operations of the shutters on the basis of switch information generated by the switch information generating section 50.

As indicated by the above arrangement, the display state switching section 700 may include a liquid crystal shutter 500 having two shutters corresponding respectively to the right eye and the left eye.

With the above arrangement, the switch information generating section 50 can, on the basis of switch information generated by the switch information generating section 50, control the respective opening/closing operations of the above two shutters. This in turn allows the display control device 1 to (i) display a main video image and an auxiliary video image in that order and thus to (ii) eliminate a cause of 3D sickness. The above arrangements, regardless of whether the dominant eye of a viewer is the right eye or the left eye, allow a main video image and an auxiliary video image to be displayed in that order to the viewer.

The display control device 1 can thus advantageously prevent 3D sickness, which is believed to be caused as follows: When an auxiliary video image and a main video image are displayed in that order, the brain (i) senses, as a sickness, a gap between "motion of a scene currently being viewed" and "actual motion of the osseous semicircular canals" and (ii) is confused as a result.

Further, the display control device 1 may be arranged such that the switch information generating section 50 can obtain dominant eye information from two or more viewers.

The switch information generating section 50 can thus, on the basis of (i) the arrangement order of the right-eye video image information item and the left-eye video image information item arranged by the video image arranging section 40 and (ii) dominant-eye information indicative of whether the respective dominant eyes of two or more viewers are each the right eye or the left eye, generate switch information for use by the display state switching section 700 to switch each of the right-eye video image and the left-eye video image between a displaying state and a non-displaying state.

The above arrangement allows the switch information generating section 50 to (i) generate switch information for each of such two or more viewers and thus to advantageously (ii) control the display state switching section 700 with use of switch information for each viewer.

Further, the display control device 1 may be arranged such that in the case where two or more viewers each use their own display state switching section 700, the switch information generating section 50 generates switch information for use by each display state switching section 700 to switch each of the right-eye video image and the left-eye video image between a displaying state and a non-displaying state.

The above arrangement, in the case where two or more viewers each use their own display state switching section 700, allows the switch information generating section 50 to, on the basis of (i) the arrangement order of the right-eye video image information item and the left-eye video image information item arranged by the video image arranging section 40 and (ii) dominant-eye information indicative of whether the respective dominant eyes of two or more viewers are each the right eye or the left eye, generate switch information for use by each display state switching section 700 to switch each of the right-eye video image and the left-eye video image between a displaying state and a non-displaying state.

Thus, even in the case where (i) two or more viewers each use their own display state switching section 700 simultaneously and (ii) the viewers have different dominant eyes, the display control device 1 can advantageously prevent all viewers from suffering from 3D sickness.

The display control device 1 may be formed by a computer. In this case, the present invention further encompasses (i) a display control program for causing a computer to operate as the video image extracting section 30, the video image arranging section 40, and the switch information generating section 50 to form the display control device 1 by a computer and (ii) a computer-readable recording medium on which the display control program is stored.

The present invention further encompasses the recording and reproduction device 100 including the display control device 1.

Embodiment 2

Example Involving a BD as an Information Recording Medium

In the above description, the information recording medium to be inserted in the recording and reproduction device 100 can be, for example, (i) a tape such as a magnetic tape and a cassette tape or (ii) a semiconductor memory such as a mask ROM, an EPROM, an EEPROM, and a flash ROM.

The present embodiment, in contrast, may involve a BD (Blu-ray disc) or a DVD (digital versatile disc) as an information recording medium to be inserted in a recording and reproduction device 150 of the present embodiment. The following outlines (i) the display control device 1 and (ii) the recording and reproduction device 150 including the display control device 1 both for the case in which the information recording medium to be inserted in the recording and reproduction device 150 is a BD or a DVD.

Figure 8:
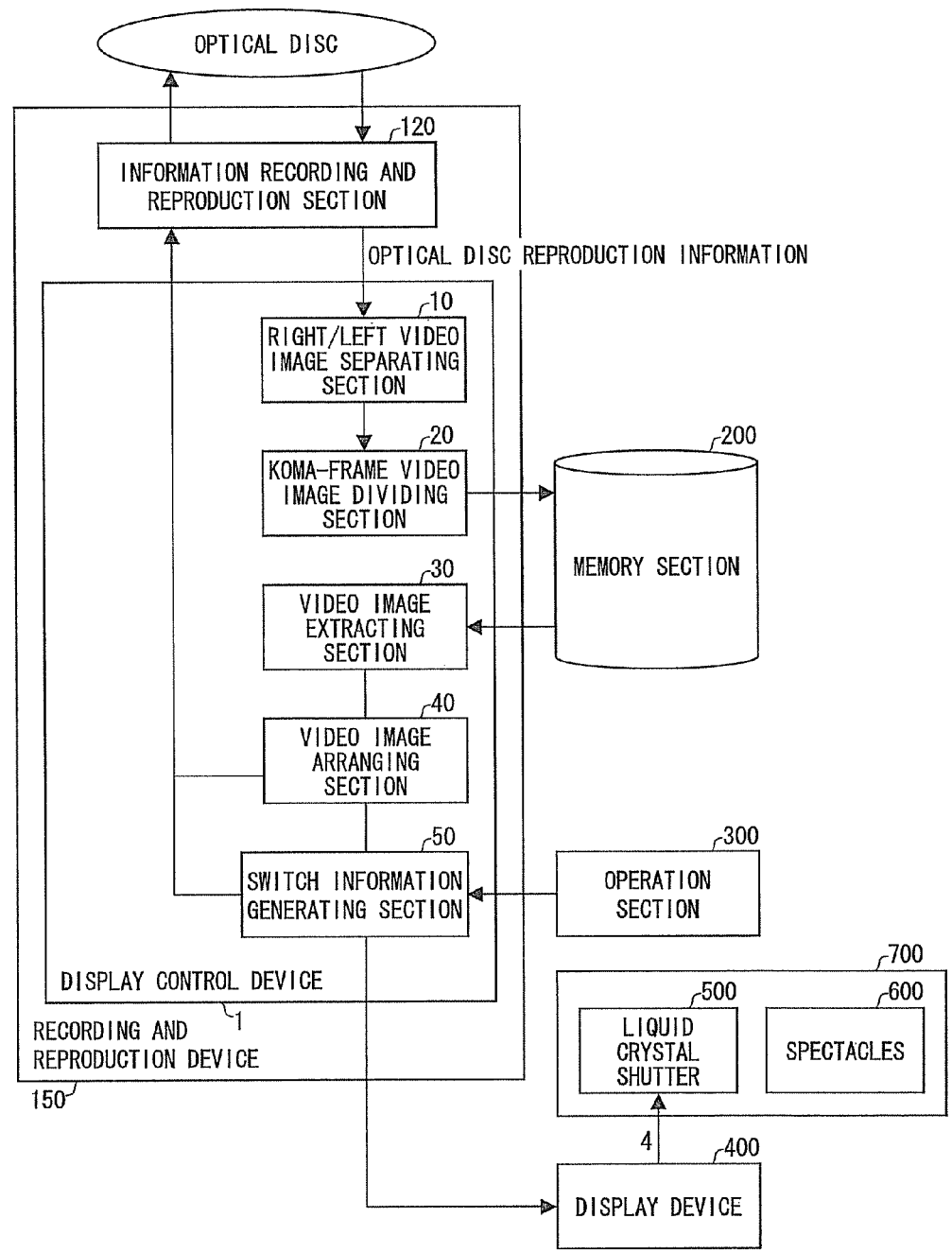
FIG. 8 is a block diagram schematically illustrating the entire configuration of another recording and reproduction device including a display control device of the present invention.

FIG. 8 is a block diagram schematically illustrating a configuration of the entire recording and reproduction device 150 including the display control device 1. The description below does not deal with points that are discussed above with reference to, for example, FIG. 1. Further, the description below assumes that the information recording medium to be inserted in the recording and reproduction device 150 is a BD.

The recording and reproduction device 150 includes at least the display control device 1 and an information recording and reproduction section 120.

The information recording and reproduction section 120 has the function of reproducing information stored on a BD inserted in the recording and reproduction device 150 and the function of recording information onto a BD. More specifically, the information recording and reproduction section 120 (i) reproduces a plurality of right-eye video image information items and left-eye video image information items both stored on a BD, and (ii) records onto a BD information outputted from the video image arranging section 40 and/or the switch information generating section 50.

Figure 9:
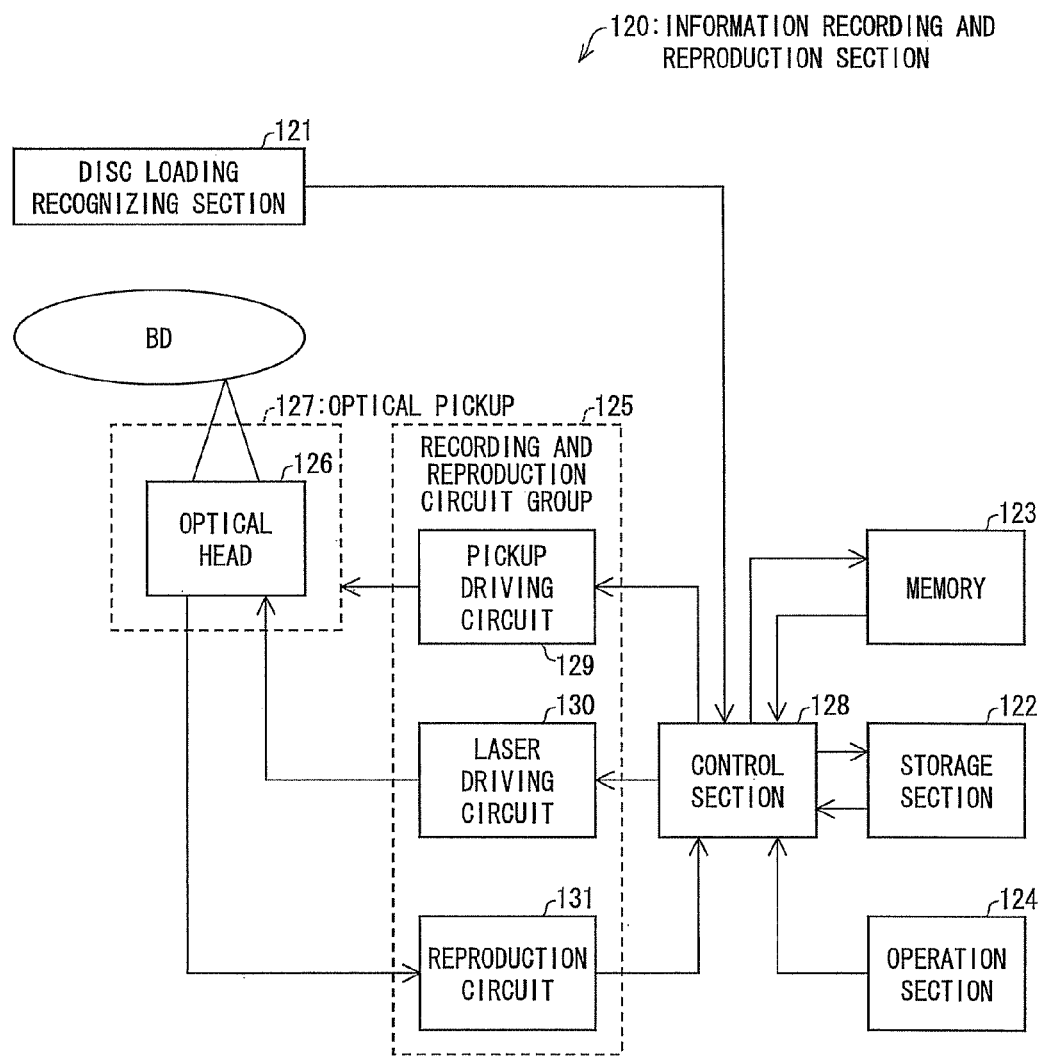
FIG. 9 is a block diagram schematically illustrating the entire configuration of an information recording and reproduction section included in another recording and reproduction device including a display control device of the present invention.

The following describes the information recording and reproduction section 120 in detail with reference to FIG. 9. FIG. 9 is a block diagram schematically illustrating a configuration of the entire information recording and reproduction section 120.

The information recording and reproduction section 120, as illustrated in FIG. 9, primarily includes: a disc loading recognizing section 121; a storage section 122; a memory (primary recording memory) 123; an operation section 124; a recording and reproduction circuit group 125; an optical head 126; an optical pickup 127; and a control section 128.

The recording and reproduction circuit group 125 primarily includes: a pickup driving circuit 129; a laser driving circuit 130; and a reproduction circuit 131.

As illustrated in FIG. 9, the information recording and reproduction section 120 is arranged such that the control section 128 causes the pickup driving circuit 129 to move the optical pickup 127 to a track (not shown) on a rotating BD.

The optical pickup 127 includes the optical head 126. The control section 128 causes the laser driving circuit 130 to set a recording condition so that the optical head 126 emits a laser beam for recording to a recording site on a BD. This operation allows information to be recorded on a track of a BD.

The information recording and reproduction section 120 is further arranged such that the control section 128 causes the pickup driving circuit 129 to move the optical pickup 127 to a recording site on a BD. Then, the control section 128 causes the laser driving circuit 130 to set a reproduction condition so that the optical head 126 emits a laser beam for reproduction to the BD.

The optical head 126 detects reflected light, which is converted by the reproduction circuit 131 into a reproduction signal and then inputted to the control section 128. This arrangement allows the information recording and reproduction section 120 to reproduce information stored on a track (including a plurality of sectors) of a BD.

The information recording and reproduction section 120 further includes the disc loading recognizing section 121, which detects loading of a BD. The disc loading recognizing section 121 is, for example, any of various sensors that can detect loading of a BD. Further, the disc loading recognizing section 121 is arranged to supply a detection result to the control section 128 as a detection signal.

The storage section 122 stores (1) control programs for the individual sections, (2) an OS program, and (3) application programs all of which are executed by the control section 128, and also (4) various data read out when the above programs are executed. The storage section 122 is, for example, a non-volatile memory device such as a ROM (read only memory) flash memory.

The memory 123 may be, for example, a RAM (random access memory), and stores a plurality of right-eye video image information items and left-eye video image information items both read out from a BD.

The operation section 124 is used by a viewer to input various operation instructions to the information recording and reproduction section 120. The operation section 124 is, for example, (i) an operation button and its interface, (ii) a mouse, (iii) a touchpad, or (iv) a remote control. The operation section 124 may further have the function of the operation section 300.

The information recording and reproduction section 120 causes the control section 128 to input reproduction information for a plurality of right-eye video image information items and left-eye video image information items, both read out from a BD, to the right/left video image separating section 10 of the display control device 1. The information recording and reproduction section 120 further causes the control section 128 to record, onto a BD, information outputted from the video image arranging section 40 and/or the switch information generating section 50.

The following describes the video image arranging section 40 and the switch information generating section 50 both included in the display control device 1.

As described above, the video image arranging section 40 obtains a pair of a right-eye video image information item and a left-eye video image information item from the video image extracting section 30, and regularly arranges the right-eye video image information item and the left-eye video image information item. The video image arranging section 40 then supplies the right-eye video image information item and the left-eye video image information item, regularly arranged as above, to the switch information generating section 50 and the information recording and reproduction section 120.

The switch information generating section 50, on the basis of (i) the arrangement order of the right-eye video image information item and the left-eye video image information item arranged by the video image arranging section 40 and (ii) dominant-eye information indicative of whether the dominant eye of a viewer is the right eye or the left eye, generates switch information for use in switching between display or non-display of a video image by the liquid crystal shutter 500. The switch information generating section 50 then supplies the switch information to the display device 400. The switch information generating section 50 further supplies the switch information to the information recording and reproduction section 120 as well.

Next, the information recording and reproduction section 120 (i) obtains, from the video image arranging section 40, the right-eye video image information item and the left-eye video image information item regularly arranged by the video image arranging section 40 and also (ii) obtains the switch information from the switch information generating section 50. The information recording and reproduction section 120 then records the above-obtained various information items onto an R layer or an RE layer of a BD inserted in the recording and reproduction device 150.

The following describes advantages achieved by the display control device 1 and the recording and reproduction device 150 including the display control device 1.

According to the above arrangement, the information recording and reproduction section 120 (i) obtains, from the video image arranging section 40, the right-eye video image information item and the left-eye video image information item regularly arranged by the video image arranging section 40 and also (ii) obtains the switch information from the switch information generating section 50. The information recording and reproduction section 120 then records the above-obtained various information items onto an R layer or an RE layer of a BD inserted in the recording and reproduction device 150.

The above arrangement allows the information recording and reproduction section 120 to, when a BD ejected from the recording and reproduction device 150 is reinserted in the recording and reproduction device 150, read various information items such as the above stored on an R layer or an RE layer of the BD. The control section 128 of the recording and reproduction device 150 can store the various information items directly onto the memory section 200, not via the right/left video image separating section 10 and the koma-frame video image dividing section 20. This arrangement can (i) omit the respective processing operations of the right/left video image separating section 10 and the koma-frame video image dividing section 20 and consequently (ii) reduce the processing time of the display control device 1 and improve usability of the recording and reproduction device 150.

Further, in the case where various information items such as the above are stored on an R layer or an RE layer of a BD, inserting the BD in a recording and reproduction device that is other than the recording and reproduction device 150 and that is equivalent in function to the recording and reproduction device 150 can reduce the processing time of a display control device 1 and consequently improve usability of a recording and reproduction device 150 in such another recording and reproduction device as well.

Embodiment 3

The following describes, with reference to drawings, a display control device 2 of the present embodiment and a display control method used in the display control device 2. In the description below, a component or constituent identical to a component or constituent described above is assigned an identical reference numeral and also shares an identical name and function. The description below thus does not repeatedly deal with such identical components or constituents in detail.

The display control device 2 of the present embodiment is outlined as follows: The display control device 2 controls the operation of a liquid crystal shutter 500 that includes a right-eye shutter and a left-eye shutter and that can switch between a displaying state and a non-displaying state of a video image to be displayed by the display device 400 to a viewer.

The display control device 2 includes a display/non-display video image determining section (display-or-non-display video image determining means) 70 that, on the basis of (i) video image information about a video image to be displayed by the display device 400 and (ii) viewing mode information indicative of a viewer's desired mode of viewing a video image, determines whether the video image to be displayed by the display device 400 is (i) a display video image, which is necessary for the viewing mode and which is thus to be displayed to the viewer or (ii) a non-display video image, which is unnecessary for the viewing mode and which is thus not to be displayed to the viewer. The display control device 2 further includes a shutter operation control section (shutter operation control means) 80 that, when a video image determined by the display/non-display video image determining section 70 as a non-display video image is displayed by the display device 400, closes the right-eye shutter and the left-eye shutter.

With the above arrangement, the display control device 2 advantageously allows each viewer to view a video image in a mode suitable for the viewer.

The following outlines the display control device 2.

[Schematic Configuration of Display Control Device 2]

Figure 10:
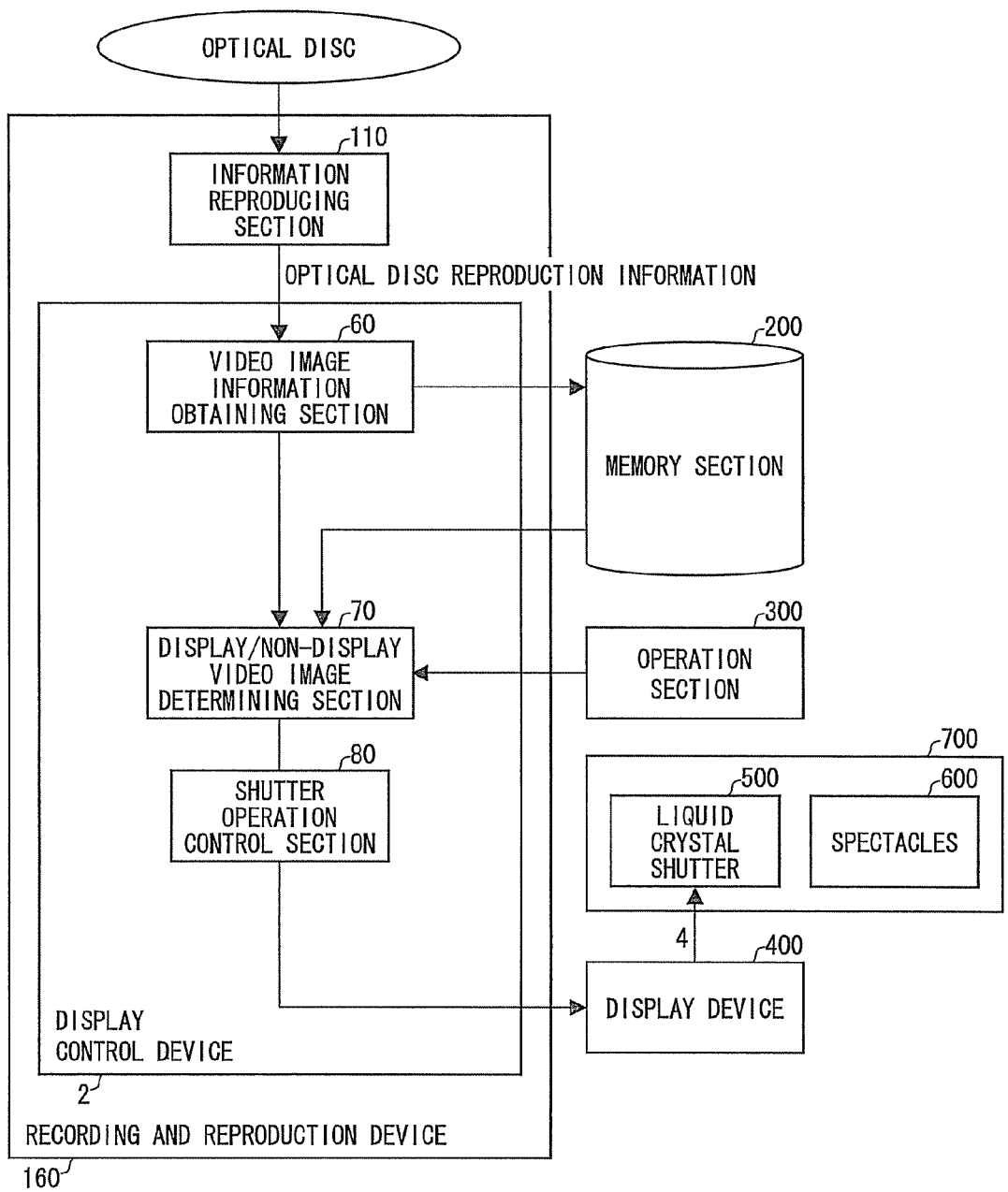
FIG. 10 is a block diagram schematically illustrating a configuration of a recording and reproduction device including another display control device of the present invention.

FIG. 10 is a block diagram schematically illustrating a configuration of a recording and reproduction device 160 including the display control device 2. The recording and reproduction device 160, as illustrated in FIG. 10, includes at least the display control device 2 and an information reproducing section 110.

The recording and reproduction device 160 records and reproduces information onto and from an information recording medium such as an optical disc. The information recording medium stores (i) right-eye video image information, which is information on a plurality of right-eye video images and (ii) left-eye video image information, which is information on a plurality of left-eye video images.

The right-eye video image information and the left-eye video image information include, for example, (i) video image data of right-eye video images and of left-eye video images or (ii) attribute information indicative of the respective attributes of right-eye video images and left-eye video images (for example, information indicative of whether the image is a right-eye image or a left-eye video image, and parallax angle information indicative of a parallax angle between a right-eye video image and a left-eye video image).

The information reproducing section 110 reproduces information stored on an information recording medium inserted in the recording and reproduction device 160. The information reproducing section 110 reproduces a plurality of right-eye video image information items and left-eye video image information items stored on the above information recording medium. The information reproducing section 110 can use an information reproducing method used in a conventional recording and reproduction device, and is thus not described in detail here.

The display control device 2 includes: a video image information obtaining section 60; a display/non-display video image determining section 70; and a shutter operation control section 80.

The video image information obtaining section 60 obtains right-eye video image information and left-eye video image information reproduced by the information reproducing section 110. The video image information obtaining section 60 then stores the above-obtained right-eye video image information and left-eye video image information in the memory section 200. The video image information obtaining section 60 alternatively supplies the above-obtained right-eye video image information and left-eye video image information to the display/non-display video image determining section 70.

The display/non-display video image determining section 70 obtains right-eye video image information and left-eye video image information from either the video image information obtaining section 60 or the memory section 200. The display/non-display video image determining section 70 further obtains, from the operation section 300, viewing mode information indicative of a viewer's desired mode of viewing a video image.

The above viewing mode information is, for example, information that, in the case where a three-dimensional video image is displayed by a display device, indicates that a viewer desires to view the video image through a three-dimensional display (or a two-dimensional display). The viewing mode information is alternatively, for example, information that, in the case where respective video images on Channels A, B, and C are to be displayed by a display device, indicates that a viewer desires to view the video image on channel A. The viewing mode information is further alternatively, for example, information that, in the case where two or more participants play a competition game, indicates that a participant desires to view a video image on a particular game screen.

The above viewing mode information is, as described above, information indicative of a viewer's desired mode of viewing a video image, and can be any of various kinds of viewing mode information exemplified by the above viewing mode information.

The operation section 300 is operated by a viewer to enter viewing mode information in the display/non-display video image determining section 70. The operation section 300 includes, for example, (i) a remote control for remotely operating the display control device 2, (ii) an operation button attached to the display control device 2, or (iii) a mouse, a keyboard and/or the like connected to the display control device 2. The viewer uses the operation section 300 to input an instruction signal, which is transmitted, via an input-output control section (not show), to the display/non-display video image determining section 70. The viewer can thus enter viewing mode information in the display/non-display video image determining section 70.

As described above, the display/non-display video image determining section 70 obtains, from either the video image information obtaining section 60 or the memory section 200, right-eye video image information and left-eye video image information both related to a video image to be displayed by the display device 400. The display/non-display video image determining section 70 further obtains viewing mode information from the operation section 300. The display/non-display video image determining section 70, on the basis of the right-eye video image information, the left-eye video image information, and the viewing mode information, determines whether a video image to be displayed by the display device 400 is (i) a display video image, which is necessary for the viewing mode and which is to be displayed to the viewer or (ii) a non-display video image, which is unnecessary for the viewing mode and which is not to be displayed to the viewer. The display/non-display video image determining section 70 then supplies non-display video image information about a non-display video image to the shutter operation control section 80. The display/non-display video image determining section 70 may also supply display video image information about a display video image to the shutter operation control section 80 along with the non-display video image information.

The shutter operation control section 80 obtains non-display video image information (and display video image information) from the display/non-display video image determining section 70. When a video image determined by the display/non-display video image determining section 70 as a non-display video image is displayed by the display device 400, the shutter operation control section 80 supplies, to the liquid crystal shutter 500, a signal (hereinafter referred to as "closed state operation signal") for closing the right-eye shutter and the left-eye shutter of the liquid crystal shutter 500. The shutter operation control section 80 may alternatively supply a closed state operation signal to the display device 400 so that the closed state operation signal is then supplied to the liquid crystal shutter 500 via a cable connecting the display device 400 with the liquid crystal shutter 500.

In the above description, the recording and reproduction device 160 records and reproduces information onto and from an information recording medium such as an optical disc. FIG. 10 illustrates an example of the recording and reproduction device 160 that obtains right-eye video image information and left-eye video image information from an optical disc.

The recording and reproduction device 160 may alternatively obtain right-eye video image information and left-eye video image information by another method (for example, by radiowaves).

Further, in the above description, the display/non-display video image determining section 70 obtains, from either the video image information obtaining section 60 or the memory section 200, right-eye video image information and left-eye video image information both related to a video image to be displayed by the display device 400.

Video image information obtained by the display/non-display video image determining section 70 is, however, not limited to right-eye video image information and left-eye video image information. In the case where, for example, the recording and reproduction device 160 obtains, by radiowaves, video image information about a video image to be displayed by a display device, the display/non-display video image determining section 70 obtains information about a 2D video image. In the case where a viewer is playing a television game, the display/non-display video image determining section 70 obtains information about a game video image.

As described above, video image information obtained by the display/non-display video image determining section 70 is not limited to right-eye video image information and left-eye video image information, but may be various kinds of video image information.

In the above description, the display/non-display video image determining section 70 obtains viewing mode information from the operation section 300. The display/non-display video image determining section 70 may alternatively obtain, from the memory section 200, viewing mode information stored in the memory section 200 in advance.

[Operation Flow for Display Control Device 2 and Recording and Reproduction Device 160]

Figure 11:
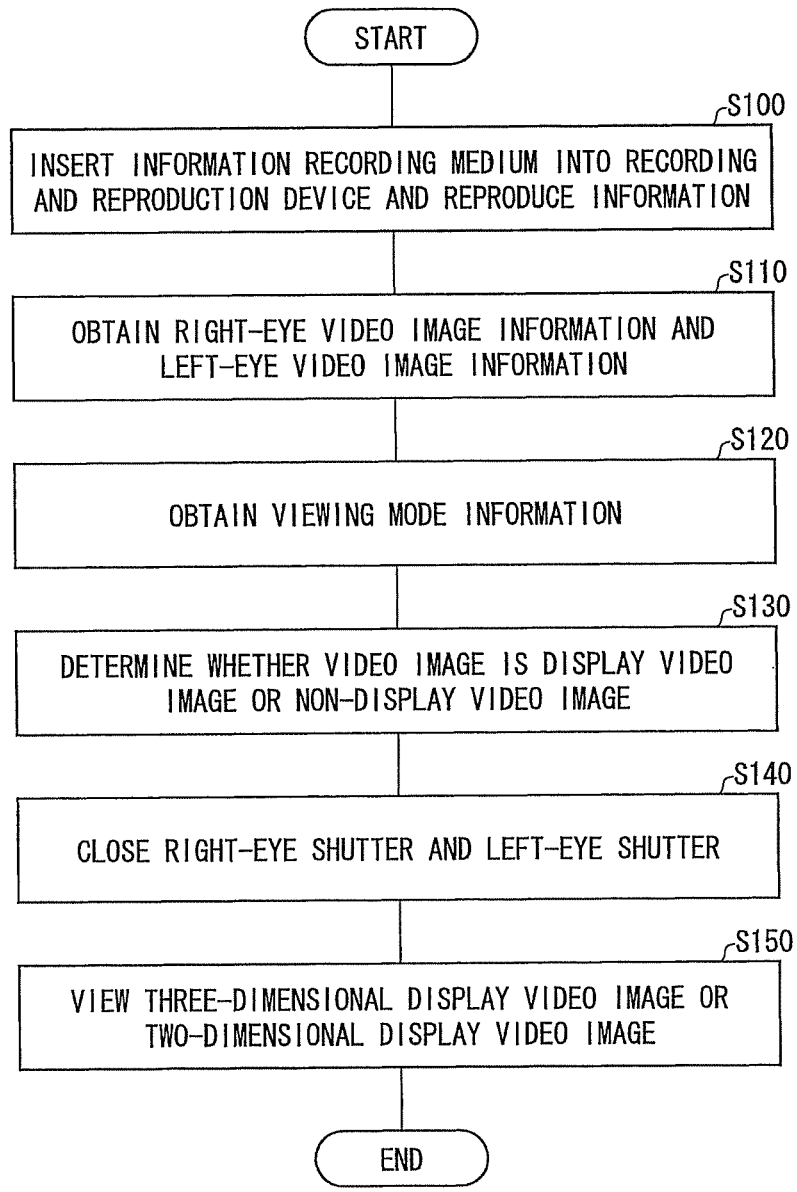
FIG. 11 is a flowchart illustrating an operation of another display control device and another recording and reproduction device both according to the present invention.

The following describes a flow of an operation carried out by the display control device 2 and the recording and reproduction device 160 with reference to FIG. 11. FIG. 11 is a flowchart illustrating the operation of the display control device 2 and the recording and reproduction device 160.

First, in S100, an information recording medium is inserted into the recording and reproduction device 160. The information recording medium stores a plurality of right-eye video image information items and left-eye video image information items. The information reproducing section 110 of the recording and reproduction device 160 thus reproduces the right-eye video image information and the left-eye video image information. The video image information obtaining section 60 then obtains the right-eye video image information and the left-eye video image information reproduced by the information reproducing section 110.

In S110, the video image information obtaining section 60 obtains the right-eye video image information and the left-eye video image information reproduced by the information reproducing section 110, and then supplies the right-eye video image information and the left-eye video image information thus obtained to the display/non-display video image determining section 70. The display/non-display video image determining section 70 consequently obtains the right-eye video image information and the left-eye video image information.

In S120, the display/non-display video image determining section 70 obtains viewing mode information from the operation section 300.

In S130, the display/non-display video image determining section 70, on the basis of (i) the right-eye video image information and the left-eye video image information both related to a video image to be displayed by the display device 400 and (ii) the viewing mode information obtained via the operation section 300, determines whether the video image to be displayed by the display device 400 is (i) a display video image, which is necessary for the viewing mode and which is thus to be displayed to the viewer or (ii) a non-display video image, which is unnecessary for the viewing mode and which is thus not to be displayed to the viewer.

In S140, the shutter operation control section 80 obtains non-display video image information (and display video image information) from the display/non-display video image determining section 70. When a video image determined by the display/non-display video image determining section 70 as a non-display video image is displayed by the display device 400, the shutter operation control section 80 supplies, to the liquid crystal shutter 500, a closed state operation signal for closing the right-eye shutter and the left-eye shutter of the liquid crystal shutter 500. This closes the right-eye shutter and the left-eye shutter.

In S150, the right-eye shutter and the left-eye shutter both in the closed state allows a viewer to view a display video image without viewing a non-display video image, which is unnecessary for the viewing mode. This arrangement consequently allows each viewer to view a display video image in a viewing mode suitable for the viewer.

The display control device 2 and the recording and reproduction device 160 operate as described above.

The following describes Examples 1 to 3, which deal in detail with respective operations of the display/non-display video image determining section 70 and the shutter operation control section 80.

EXAMPLE 1

Spectacles P for Viewing a Three-Dimensional Display and Spectacles Q for Viewing a Two-Dimensional Display First, the description below assumes a case in which (i) there are two viewers: one wearing spectacles P and the other wearing spectacles Q, and (ii) the viewer wearing the spectacles P desires a viewing mode for viewing a three-dimensional display video image, whereas the viewer wearing the spectacles Q desires a viewing mode for viewing a two-dimensional display video image. The following describes the respective operations of the display/non-display video image determining section 70 and the shutter operation control section 80 for the above case with reference to FIG. 12.

FIG. 12 shows diagrams each for explaining the respective operations of the display/non-display video image determining section 70 and the shutter operation control section 80. (a) of FIG. 12 is a diagram illustrating timings at which video images A and B are displayed by the display device 400. (b) of FIG. 12 is a diagram illustrating a shutter control for the spectacles P. (c) of FIG. 12 is a diagram illustrating a shutter control for the spectacles Q.

As illustrated in (a) of FIG. 12, the video images A and B are displayed by the display device 400 alternately. (a) of FIG. 12 shows (i) a circle to indicate that a video image is displayed by the display device 400 and (ii) a cross to indicate that no video image is displayed by the display device 400. The video images A and B in this case are respectively a right-eye video image and a left-eye video image for use in a three-dimensional display. The following describes this case to explain the respective operations of the display/non-display video image determining section 70 and the shutter operation control section 80 with reference to (b) and (c) of FIG. 12.

The description below first deals with the respective operations of the display/non-display video image determining section 70 and the shutter operation control section 80 for the spectacles P with reference to (b) of FIG. 12.

The display/non-display video image determining section 70 obtains (i) right-eye video image information and left-eye video image information and (ii) viewing mode information indicating that the viewer wearing the spectacles P desires to view a video image through a three-dimensional display. The display/non-display video image determining section 70, on the basis of the above information, determines whether each video image to be displayed by the display device 400 is (i) a display video image, which is necessary for the viewing mode and which is thus to be displayed to the viewer or (ii) a non-display video image, which is unnecessary for the viewing mode and which is thus not to be displayed to the viewer.

The viewer wearing the spectacles P in this case desires to view a video image through a three-dimensional display. The right-eye shutter and the left-eye shutter are thus not in the closed state simultaneously. In other words, there is not any non-display video image, which is unnecessary for the viewing mode and which is thus not to be displayed to the viewer.

It is, however, necessary to close (i) the left-eye shutter when the right-eye video image (video image A) is displayed by the display device 400 and (ii) the right-eye shutter when the left-eye video image (video image B) is displayed by the display device 400. The display/non-display video image determining section 70 in this case can simply (i) generate a signal (hereinafter referred to as "open/closed state operation signal") for controlling the respective opening/closing operations of the right-eye shutter and the left-eye shutter to the above effect and (ii) supply the open/closed state operation signal to the shutter operation control section 80. This allows the shutter operation control section 80 to, on the basis of the open/closed state operation signal, close (i) the left-eye shutter when the video image A is displayed by the display device 400 and (ii) the right-eye shutter when the video image B is displayed by the display device 400.

The display/non-display video image determining section 70 and the shutter operation control section 80 operating as above for the spectacles P permits the respective opening/closing operations illustrated in (b) of FIG. 12 of the right-eye shutter and the left-eye shutter.

The description below now deals with the respective operations of the display/non-display video image determining section 70 and the shutter operation control section 80 for the spectacles Q with reference to (c) of FIG. 12.

The display/non-display video image determining section 70 obtains (i) right-eye video image information and left-eye video image information and (ii) viewing mode information indicating that the viewer wearing the spectacles Q desires to view a video image through a two-dimensional display. The display/non-display video image determining section 70, on the basis of the above information, determines whether each video image to be displayed by the display device 400 is (i) a display video image, which is necessary for the viewing mode and which is thus to be displayed to the viewer or (ii) a non-display video image, which is unnecessary for the viewing mode and which is thus not to be displayed to the viewer.

The viewer wearing the spectacles Q in this case desires to view a video image through a three-dimensional display. The display/non-display video image determining section 70 thus determines one of the right-eye video image (video image A) and the left-eye video image (video image B) as a non-display video image, which is unnecessary for the viewing mode and which is thus not to be displayed to the viewer.

The shutter operation control section 80 supplies, to the liquid crystal shutter 500, a closed state operation signal for closing the right-eye shutter and the left-eye shutter of the liquid crystal shutter 500 when a video image determined by the display/non-display video image determining section 70 as a non-display video image (in (c) of FIG. 12, the right-eye video image) is displayed by the display device 400. The liquid crystal shutter 500, on the basis of the closed state operation signal, (i) opens the right-eye shutter and the left-eye shutter when a left-eye video image is displayed by the display device 400 and (ii) closes the right-eye shutter and the left-eye shutter when a right-eye video image is displayed by the display device 400.

In this case, the display/non-display video image determining section 70 supplies, to the liquid crystal shutter 500, a open/closed state operation signal for opening the right-eye shutter and the left-eye shutter of the liquid crystal shutter 500 when a display video image (in (c) of FIG. 12, the left-eye video image) is displayed by the display device 400. With this arrangement, the shutter operation control section 80 (i) closes the right-eye shutter and the left-eye shutter when the video image A is displayed by the display device 400 and (ii) opens the right-eye shutter and the left-eye shutter when the video image B is displayed by the display device 400.

The display/non-display video image determining section 70 and the shutter operation control section 80 operating as above for the spectacles Q permits the respective opening/closing operations illustrated in (c) of FIG. 12 of the right-eye shutter and the left-eye shutter.

The above description deals with the respective operations of the display/non-display video image determining section 70 and the shutter operation control section 80 for each of the spectacles P and the spectacles Q with reference to FIG. 12. The above description indicates that even if the viewing mode for the viewer wearing the spectacles P is different from that of the viewer wearing the spectacles Q, the display control device 2 allows each viewer to view a video image in a mode suitable for the viewer.

EXAMPLE 2

Different 2D Screens are Viewed

Next, the description below assumes a case in which (i) there are two viewers: one wearing spectacles P and the other wearing spectacles Q, and (ii) the viewer wearing the spectacles P desires a viewing mode for viewing a video image A, which is a two-dimensional display video image, whereas the viewer wearing the spectacles Q desires a viewing mode for viewing a video image B, which is a two-dimensional display video image. The following describes the respective operations of the display/non-display video image determining section 70 and the shutter operation control section 80 for the above case with reference to FIG. 13. The description below does not repeat points described above with reference to FIG. 12.

FIG. 13 shows diagrams each for explaining the respective operations of the display/non-display video image determining section 70 and the shutter operation control section 80. (a) of FIG. 13 is a diagram illustrating timings at which video images A and B are displayed by the display device 400. (b) of FIG. 13 is a diagram illustrating a shutter control for the spectacles P. (c) of FIG. 13 is a diagram illustrating a shutter control for the spectacles Q.

As illustrated in (a) of FIG. 13, the video images A and B are displayed by the display device 400 alternately. The following describes, on the basis of this state, the respective operations of the display/non-display video image determining section 70 and the shutter operation control section 80 with reference to (b) and (c) of FIG. 13.

The description below first deals with the respective operations of the display/non-display video image determining section 70 and the shutter operation control section 80 for the spectacles P with reference to (b) of FIG. 13.

The display/non-display video image determining section 70 obtains (i) video image information about video images A and B and (ii) viewing mode information indicating that the viewer wearing the spectacles P desires to view the video image A. The display/non-display video image determining section 70, on the basis of the above information, determines whether each video image to be displayed by the display device 400 is (i) a display video image, which is necessary for the viewing mode and which is thus to be displayed to the viewer or (ii) a non-display video image, which is unnecessary for the viewing mode and which is thus not to be displayed to the viewer.

The viewer wearing the spectacles P in this case desires to view the video image A. The display/non-display video image determining section 70 thus determines the video image B as a non-display video image, which is unnecessary for the viewing mode and which is thus not to be displayed to the viewer.

The shutter operation control section 80 supplies, to the liquid crystal shutter 500, a closed state operation signal for closing the right-eye shutter and the left-eye shutter of the liquid crystal shutter 500 when the video image B determined by the display/non-display video image determining section 70 as a non-display video image is displayed by the display device 400. The liquid crystal shutter 500, on the basis of the closed state operation signal, (i) closes the right-eye shutter and the left-eye shutter when the video image B is displayed by the display device 400 and (ii) opens the right-eye shutter and the left-eye shutter when the video image A is displayed by the display device 400.

The display/non-display video image determining section 70 and the shutter operation control section 80 operating as above for the spectacles P permits the respective opening/closing operations illustrated in (b) of FIG. 13 of the right-eye shutter and the left-eye shutter.

The description below now deals with the respective operations of the display/non-display video image determining section 70 and the shutter operation control section 80 for the spectacles Q with reference to (c) of FIG. 13.

The display/non-display video image determining section 70 obtains (i) video image information about video images A and B and (ii) viewing mode information indicating that the viewer wearing the spectacles Q desires to view the video image B. The display/non-display video image determining section 70, on the basis of the above information, determines whether each video image to be displayed by the display device 400 is (i) a display video image, which is necessary for the viewing mode and which is thus to be displayed to the viewer or (ii) a non-display video image, which is unnecessary for the viewing mode and which is thus not to be displayed to the viewer.

The viewer wearing the spectacles Q in this case desires to view the video image B. The display/non-display video image determining section 70 thus determines the video image A as a non-display video image, which is unnecessary for the viewing mode and which is thus not to be displayed to the viewer.

The shutter operation control section 80 supplies, to the liquid crystal shutter 500, a closed state operation signal for closing the right-eye shutter and the left-eye shutter of the liquid crystal shutter 500 when the video image A determined by the display/non-display video image determining section 70 as a non-display video image is displayed by the display device 400. The liquid crystal shutter 500, on the basis of the closed state operation signal, (i) closes the right-eye shutter and the left-eye shutter when the video image A is displayed by the display device 400 and (ii) opens the right-eye shutter and the left-eye shutter when the video image B is displayed by the display device 400.

The display/non-display video image determining section 70 and the shutter operation control section 80 operating as above for the spectacles Q permits the respective opening/closing operations illustrated in (c) of FIG. 13 of the right-eye shutter and the left-eye shutter.

The above description deals with the respective operations of the display/non-display video image determining section 70 and the shutter operation control section 80 for each of the spectacles P and the spectacles Q with reference to FIG. 13. The above description indicates that even if the viewing mode for the viewer wearing the spectacles P is different from that of the viewer wearing the spectacles Q, the display control device 2 allows each viewer to view a video image in a mode suitable for the viewer.

The video images A and B may be varied in form, for example, (i) respective video images on Channels A and B or (ii) respective video images of games. A and B.

EXAMPLE 3

Spectacles P for Viewing a 3D Video Image and Spectacles Q for Viewing a 2D Video Image to be Viewed with Both Eyes Next, the description below assumes a case in which (i) there are two viewers: one wearing spectacles P and the other wearing spectacles Q, and (ii) the viewer wearing the spectacles P desires a viewing mode for viewing a three-dimensional display video image, whereas the viewer wearing the spectacles Q desires a viewing mode for viewing a two-dimensional display video image to be viewed with both eyes (both-eye two-dimensional display video image). The following describes the respective operations of the display/non-display video image determining section 70 and the shutter operation control section 80 for the above case with reference to FIG. 14. The description below does not repeat points described above with reference to drawings such as FIG. 12.

FIG. 14 shows diagrams each for explaining the respective operations of the display/non-display video image determining section 70 and the shutter operation control section 80. (a) of FIG. 14 is a diagram illustrating timings at which video images A through C are displayed by the display device 400. (b) of FIG. 14 is a diagram illustrating a shutter control for the spectacles P. (c) of FIG. 14 is a diagram illustrating a shutter control for the spectacles Q.

As illustrated in (a) of FIG. 14, the video images A through C are displayed by the display device 400 alternately. The video images A and B are respectively a right-eye video image and a left-eye video image for use in a three-dimensional display. The video image C is a both-eye two-dimensional display video image for use in a two-dimensional display. The following describes, on the basis of this state, the respective operations of the display/non-display video image determining section 70 and the shutter operation control section 80 with reference to (b) and (c) of FIG. 14.

The description below first deals with the respective operations of the display/non-display video image determining section 70 and the shutter operation control section 80 for the spectacles P with reference to (b) of FIG. 14.

The display/non-display video image determining section 70 obtains (i) video image information about video images A through C and (ii) viewing mode information indicating that the viewer wearing the spectacles P desires to view a three-dimensional display video image. The display/non-display video image determining section 70, on the basis of the above information, determines whether each video image to be displayed by the display device 400 is (i) a display video image, which is necessary for the viewing mode and which is thus to be displayed to the viewer or (ii) a non-display video image, which is unnecessary for the viewing mode and which is thus not to be displayed to the viewer.

The viewer wearing the spectacles P in this case desires to view a three-dimensional display video image. The display/non-display video image determining section 70 thus determines the both-eye two-dimensional display video image for use in a two-dimensional display (that is, the video image C) as a non-display video image, which is unnecessary for the viewing mode and which is thus not to be displayed to the viewer.

The shutter operation control section 80 supplies, to the liquid crystal shutter 500, a closed state operation signal for closing the right-eye shutter and the left-eye shutter of the liquid crystal shutter 500 when the video image C determined by the display/non-display video image determining section 70 as a non-display video image is displayed by the display device 400. The liquid crystal shutter 500, on the basis of the closed state operation signal, closes the right-eye shutter and the left-eye shutter when the video image C is displayed by the display device 400.

It is additionally necessary to close (i) the left-eye shutter when the right-eye video image (video image A) is displayed by the display device 400 and (ii) the right-eye shutter when the left-eye video image (video image B) is displayed by the display device 400. The display/non-display video image determining section 70 thus further (i) generates an open/closed state operation signal for controlling the respective opening/closing operations of the right-eye shutter and the left-eye shutter to the above effect and (ii) supplies the open/closed state operation signal to the shutter operation control section 80. This allows the shutter operation control section 80 to, on the basis of the open/closed state operation signal, close (i) the left-eye shutter when the video image A is displayed by the display device 400 and (ii) the right-eye shutter when the video image B is displayed by the display device 400.

The display/non-display video image determining section 70 and the shutter operation control section 80 operating as above for the spectacles P permits the respective opening/closing operations illustrated in (b) of FIG. 14 of the right-eye shutter and the left-eye shutter.

The description below now deals with the respective operations of the display/non-display video image determining section 70 and the shutter operation control section 80 for the spectacles Q with reference to (c) of FIG. 14.

The display/non-display video image determining section 70 obtains (i) video image information about video images A through C and (ii) viewing mode information indicating that the viewer wearing the spectacles Q desires to view a both-eye video image through a two-dimensional display. The display/non-display video image determining section 70, on the basis of the above information, determines whether each video image to be displayed by the display device 400 is (i) a display video image, which is necessary for the viewing mode and which is thus to be displayed to the viewer or (ii) a non-display video image, which is unnecessary for the viewing mode and which is thus not to be displayed to the viewer.

The viewer wearing the spectacles Q in this case desires to view a both-eye video image (video image C) through a two-dimensional display. The display/non-display video image determining section 70 thus determines the right-eye video image (video image A) and the left-eye video image (video image B) each as a non-display video image, which is unnecessary for the viewing mode and which is thus not to be displayed to the viewer.

The shutter operation control section 80 supplies, to the liquid crystal shutter 500, a closed state operation signal for closing the right-eye shutter and the left-eye shutter of the liquid crystal shutter 500 when the video images A and B each determined by the display/non-display video image determining section 70 as a non-display video image are displayed by the display device 400. The liquid crystal shutter 500, on the basis of the closed state operation signal, (i) closes the right-eye shutter and the left-eye shutter when the video images A and B are displayed by the display device 400, and (ii) opens the right-eye shutter and the left-eye shutter when the video image C is displayed by the display device 400.

The display/non-display video image determining section 70 and the shutter operation control section 80 operating as above for the spectacles Q permits the respective opening/closing operations illustrated in (c) of FIG. 14 of the right-eye shutter and the left-eye shutter.

The above description deals with the respective operations of the display/non-display video image determining section 70 and the shutter operation control section 80 for each of the spectacles P and the spectacles Q with reference to FIG. 14. The above description indicates that even if the viewing mode for the viewer wearing the spectacles P is different from that of the viewer wearing the spectacles Q, the display control device 2 allows each viewer to view a video image in a mode suitable for the viewer.

EXAMPLE 4

Spectacles P Through Spectacles R for Viewing 3D Video Images Different from One Another Next, the description below assumes a case in which (i) there are three viewers: one wearing spectacles P; another wearing spectacles Q; and the other wearing spectacles R, and (ii) the viewer wearing the spectacles P desires a viewing mode for viewing a three-dimensional display video image made up of video images A and B; the viewer wearing the spectacles Q desires a viewing mode for viewing a three-dimensional display video image made up of video images C and D; and the viewer wearing the spectacles R desires to view a three-dimensional display video image made up of video images E and F. The following describes the respective operations of the display/non-display video image determining section 70 and the shutter operation control section 80 for the above case with reference to FIG. 15. The description below does not repeat points described above with reference to drawings such as FIG. 12.

FIG. 15 is a diagram illustrating (i) timings at which the video images A through F are displayed by the display device 400 and (ii) respective shutter controls for the spectacles P through the spectacles R. As illustrated in FIG. 15, the video images A through F are displayed by the display device 400 alternately in that order.

The description below first deals with the respective operations of the display/non-display video image determining section 70 and the shutter operation control section 80 for the spectacles P.

The display/non-display video image determining section 70 obtains (i) video image information about video images A through F and (ii) viewing mode information indicating that the viewer wearing the spectacles P desires to view a three-dimensional display video image made up of the video images A and B. The display/non-display video image determining section 70, on the basis of the above information, determines whether each video image to be displayed by the display device 400 is (i) a display video image, which is necessary for the viewing mode and which is thus to be displayed to the viewer or (ii) a non-display video image, which is unnecessary for the viewing mode and which is thus not to be displayed to the viewer.

The viewer wearing the spectacles P in this case desires to view a three-dimensional display video image made up of the video images A and B. The display/non-display video image determining section 70 thus determines the video images C through F each as a non-display video image, which is unnecessary for the viewing mode and which is thus not to be displayed to the viewer.

The shutter operation control section 80 supplies, to the liquid crystal shutter 500, a closed state operation signal for closing the right-eye shutter and the left-eye shutter of the liquid crystal shutter 500 when the video images C through F each determined by the display/non-display video image determining section 70 as a non-display video image are displayed by the display device 400. The liquid crystal shutter 500, on the basis of the closed state operation signal, closes the right-eye shutter and the left-eye shutter when the video images C through F are displayed by the display device 400.

It is additionally necessary to close (i) the left-eye shutter when the right-eye video image (video image A) is displayed by the display device 400 and (ii) the right-eye shutter when the left-eye video image (video image B) is displayed by the display device 400. The display/non-display video image determining section 70 thus further (i) generates an open/closed state operation signal for controlling the respective opening/closing operations of the right-eye shutter and the left-eye shutter to the above effect and (ii) supplies the open/closed state operation signal to the shutter operation control section 80. This allows the shutter operation control section 80 to, on the basis of the open/closed state operation signal, close (i) the left-eye shutter when the video image A is displayed by the display device 400 and (ii) the right-eye shutter when the video image B is displayed by the display device 400.

The display/non-display video image determining section 70 and the shutter operation control section 80 operating as above for the spectacles P permits the respective opening/closing operations illustrated in FIG. 15 of the right-eye shutter and the left-eye shutter for the spectacles P.

The description below now deals with the respective operations of the display/non-display video image determining section 70 and the shutter operation control section 80 for the spectacles Q.

The display/non-display video image determining section 70 obtains (i) video image information about video images A through F and (ii) viewing mode information indicating that the viewer wearing the spectacles Q desires to view a three-dimensional display video image made up of the video images C and D. The display/non-display video image determining section 70, on the basis of the above information, determines whether each video image to be displayed by the display device 400 is (i) a display video image, which is necessary for the viewing mode and which is thus to be displayed to the viewer or (ii) a non-display video image, which is unnecessary for the viewing mode and which is thus not to be displayed to the viewer.

The viewer wearing the spectacles Q in this case desires to view a three-dimensional display video image made up of the video images C and D. The display/non-display video image determining section 70 thus determines the video images A, B, E and F each as a non-display video image, which is unnecessary for the viewing mode and which is thus not to be displayed to the viewer.

The shutter operation control section 80 supplies, to the liquid crystal shutter 500, a closed state operation signal for closing the right-eye shutter and the left-eye shutter of the liquid crystal shutter 500 when the video images A, B, E, and F each determined by the display/non-display video image determining section 70 as a non-display video image are displayed by the display device 400. The liquid crystal shutter 500, on the basis of the closed state operation signal, closes the right-eye shutter and the left-eye shutter when the video images A, B, E, and F are displayed by the display device 400.

It is additionally necessary to close (i) the left-eye shutter when the right-eye video image (video image C) is displayed by the display device 400 and (ii) the right-eye shutter when the left-eye video image (video image D) is displayed by the display device 400. The display/non-display video image determining section 70 thus further (i) generates an open/closed state operation signal for controlling the respective opening/closing operations of the right-eye shutter and the left-eye shutter to the above effect and (ii) supplies the open/closed state operation signal to the shutter operation control section 80. This allows the shutter operation control section 80 to, on the basis of the open/closed state operation signal, close (i) the left-eye shutter when the video image C is displayed by the display device 400 and (ii) the right-eye shutter when the video image D is displayed by the display device 400.

The display/non-display video image determining section 70 and the shutter operation control section 80 operating as above for the spectacles Q permits the respective opening/closing operations illustrated in FIG. 15 of the right-eye shutter and the left-eye shutter for the spectacles Q.

The description below now deals with the respective operations of the display/non-display video image determining section 70 and the shutter operation control section 80 for the spectacles R.

The display/non-display video image determining section 70 obtains (i) video image information about video images A through F and (ii) viewing mode information indicating that the viewer wearing the spectacles R desires to view a three-dimensional display video image made up of the video images E and F. The display/non-display video image determining section 70, on the basis of the above information, determines whether each video image to be displayed by the display device 400 is (i) a display video image, which is necessary for the viewing mode and which is thus to be displayed to the viewer or (ii) a non-display video image, which is unnecessary for the viewing mode and which is thus not to be displayed to the viewer.

The viewer wearing the spectacles R in this case desires to view a three-dimensional display video image made up of the video images E and F. The display/non-display video image determining section 70 thus determines the video images A through D each as a non-display video image, which is unnecessary for the viewing mode and which is thus not to be displayed to the viewer.

The shutter operation control section 80 supplies, to the liquid crystal shutter 500, a closed state operation signal for closing the right-eye shutter and the left-eye shutter of the liquid crystal shutter 500 when the video images A through D each determined by the display/non-display video image determining section 70 as a non-display video image are displayed by the display device 400. The liquid crystal shutter 500, on the basis of the closed state operation signal, closes the right-eye shutter and the left-eye shutter when the video images A through D are displayed by the display device 400.

It is additionally necessary to close (i) the left-eye shutter when the right-eye video image (video image E) is displayed by the display device 400 and (ii) the right-eye shutter when the left-eye video image (video image F) is displayed by the display device 400. The display/non-display video image determining section 70 thus further (i) generates an open/closed state operation signal for controlling the respective opening/closing operations of the right-eye shutter and the left-eye shutter to the above effect and (ii) supplies the open/closed state operation signal to the shutter operation control section 80. This allows the shutter operation control section 80 to, on the basis of the open/closed state operation signal, close (i) the left-eye shutter when the video image E is displayed by the display device 400 and (ii) the right-eye shutter when the video image F is displayed by the display device 400.

The display/non-display video image determining section 70 and the shutter operation control section 80 operating as above for the spectacles R permits the respective opening/ closing operations illustrated in FIG. 15 of the right-eye shutter and the left-eye shutter for the spectacles R.

The above description deals with the respective operations of the display/non-display video image determining section 70 and the shutter operation control section 80 for each of the spectacles P through the spectacles R with reference to FIG. 15. The above description indicates that even if (i) the viewing mode for the viewer wearing the spectacles P, (ii) that of the viewer wearing the spectacles Q, and (iii) that of the viewer wearing the spectacles R are different from one another, the display control device 2 allows each viewer to view a video image in a mode suitable for the viewer.

Other Examples

Examples 1 through 4 above each show that even in the case where two or more viewers have different viewing modes, the display control device 2 allows each viewer to view a video image in a mode suitable for the viewer.

Similarly, the display control device 2 allows each viewer to view a video image in a mode suitable for the viewer, even in the case where, for example, (i) the video image information includes video image provider information indicative of a video image provider of a video image to be displayed by the display device 400, (ii) the viewing mode information includes specific provider viewing information indicating that a viewer desires a mode of viewing a video image provided by a specific video image provider, and (iii) the display device 400 displays a plurality of video images respectively provided by different video image providers.

Specifically, the display/non-display video image determining section 70 can simply, on the basis of the video image provider information and the specific provider viewing information, determine (i) as a display video image, a video image provided by the specific video image provider and (ii) as a non-display video image, a video image provided by a video image provider other than the specific video image provider. With this arrangement, even in the case where two or more viewers have different viewing modes, the display control device 2 allows each viewer to view a video image in a mode suitable for the viewer.

Another embodiment can also be implemented: The display control device 2 allows each viewer to view a video image in a mode suitable for the viewer, even in the case where, for example, (i) the video image information includes video image attribute information indicative of an attribute of a video image to be displayed by the display device 400, (ii) the viewing mode information includes specific attribute information indicating that a viewer desires a mode of viewing a video image having a specific attribute, and (iii) the display device 400 displays a plurality of video images respectively having different attributes.

With the above arrangement, the display/non-display video image determining section 70 can simply, on the basis of the video image attribute information and the specific attribute information, determine (i) as a display video image, a video image having the specific attribute and (ii) as a non-display video image, a video image having an attribute other than the specific attribute. With this arrangement, even in the case where two or more viewers have different viewing modes, the display control device 2 allows each viewer to view a video image in a mode suitable for the viewer.

[Advantages Achieved by Display Control Device 2]

The display control device 2 (display control method) is arranged as follows: The display/non-display video image determining section 70 (display/non-display video image determining step) determines whether a video image displayed by the display device 400 is a display video image or a non-display video image. The display/non-display video image determining section 70 makes the above determination of a display video image or a non-display video image on the basis of (i) video image information related to the video image to be displayed by the display device 400 and (ii) viewing mode information indicative of a viewer's desired mode of viewing a video image. The shutter operation control section 80 (shutter operation control step) then closes the right-eye shutter and the left-eye shutter of the liquid crystal shutter 500 when the display device 400 displays a video image determined as a non-display video image, which is unnecessary for the viewing mode and which is thus not to be displayed to the viewer.

The display control device 2 (display control method) thus closes the right-eye shutter and the left-eye shutter of the liquid crystal shutter 500 when a non-display video image is displayed by the display device 400. This arrangement prevents the viewer from viewing a non-display video image, which is unnecessary for the viewing mode.

The display control device 2 (display control method) thus allows each viewer to view a video image in a mode suitable for the viewer.

The display control device 2 may preferably be further arranged such that that the video image information includes (i) a right-eye video image information item indicative of a right-eye video image itself usable in a three-dimensional display and (ii) a left-eye video image information item indicative of a left-eye video image itself usable in a three-dimensional display; and in a case where the viewing mode information includes two-dimensional viewing information indicating that the viewing mode desired by the viewer is for viewing a two-dimensional display video image, the display/non-display video image determining section 70 determines, on the basis of (i) the right-eye video image information item and the left-eye video image information item and (ii) the two-dimensional viewing information, that a first one of the right-eye video image and the left-eye video image as a display video image and a second one of the right-eye video image and the left-eye video image as a non-display video image.

The above arrangement determines (i) a first one of the right-eye video image and the left-eye video image as a display video image and (ii) a second one of the right-eye video image and the left-eye video image as a non-display video image.

Thus, in the case where, for example, the display control device 2 determines (i) a right-eye video image as a display video image and (ii) a left-eye video image as a non-display video image, it closes the right-eye shutter and the left-eye shutter of the liquid crystal shutter 500 when the left-eye video image, that is, a non-display video image, is displayed by the display device 400. The display control device 2 consequently prevents the left-eye video image, unnecessary for the viewing mode, from being viewed by the viewer.

In other words, the viewer can view only the right-eye video image, that is, a display video image. The display control device 2 can thus achieve the viewer's desired mode for viewing a video image (that is, for viewing a two-dimensional display video image).

The display control device 2 may preferably be further arranged such that the video image information includes video image provider information about a video image provider of the video image displayed by the display device 400; the viewing mode information includes specific provider viewing information indicating that the viewing mode desired by the viewer is for viewing a video image provided by a specific video image provider; and in the case where the video image displayed by the display device 400 includes a plurality of video images provided by respective video image providers, the display/non-display video image determining section 70, on the basis of the video image provider information and the specific provider viewing information, determines (i) as a display video image, a video image provide by the specific video image provider and determines (ii) as a non-display video image, a video image provided by a video image provider other than the specific video image provider.

The above arrangement determines (i) as a display video image, a video image provided by a specific video image provider and (ii) as a non-display video image, a video image provided by a video image provider other than the specific video image provider.

The display control device 2 thus closes the right-eye shutter and the left-eye shutter of the liquid crystal shutter 500 when a video image provided by a video image provider other than the specific video image provider is displayed by the display device 400. The display control device 2 consequently prevents such a video image, provided by a video image provider other than the specific video image provider and thus unnecessary for the viewing mode, from being viewed by the viewer.

In other words, the viewer can view only a display video image, that is, a video image provided by a specific video image provider. The display control device 2 can thus achieve the viewer's desired mode for viewing a video image (that is, for viewing a video image provided by a specific video image provider).

The display control device 2 may preferably be further arranged such that the video image information includes video image attribute information indicative of an attribute of the video image displayed by the display device 400; the viewing mode information includes specific attribute information indicating that the viewing mode desired by the viewer is for viewing a video image having a specific attribute; and in the case where the video image displayed by the display device 400 includes a plurality of video images having respective attributes, the display/non-display video image determining section 70, on the basis of the video image attribute information and the specific attribute information, determines (i) as a display video image, a video image having the specific attribute and (ii) as a non-display video image, a video image having an attribute other than the specific attribute.

The above arrangement determines (i) as a display video image, a video image having a specific attribute and (ii) as a non-display video image, a video image having an attribute other than the specific attribute.

The display control device 2 thus closes the right-eye shutter and the left-eye shutter of the liquid crystal shutter 500 when a video image having an attribute other than the specific attribute is displayed by the display device 400. The display control device 2 consequently prevents such a video image, having an attribute other than the specific attribute and thus unnecessary for the viewing mode, from being viewed by the viewer.

In other words, the viewer can view only a display video image, that is, a video image having a specific attribute. The display control device 2 can thus achieve the viewer's desired mode for viewing a video image (that is, for viewing a video image having a specific attribute).

The display control device 2 may preferably be further arranged such that the video image information includes (i) a right-eye video image information item indicative of a right-eye video image itself usable in a three-dimensional display, (ii) a left-eye video image information item indicative of a left-eye video image usable in a three-dimensional display, and (iii) a both-eye video image information item indicative of a both-eye video image itself for use in a two-dimensional display; and in the case where the viewing mode information includes display mode information indicating that a video image display mode desired by the viewer is a three-dimensional display or a two-dimensional display, the display/non-display video image determining section 70, (i) in the case where the video image display mode desired by the viewer is a three-dimensional display, determines, as a non-display video image, the video image indicated by the both-eye video image information item, and (ii) in the case where the video image display mode desired by the viewer is a two-dimensional display, determines, as a non-display video image, each of respective video images indicated by the right-eye video image information item and the left-eye video image information item.

In the case where the video image information includes a right-eye video image information item, a left-eye video image information item, and a both-eye video image information item, a three-dimensional display is carried out with use of the right-eye video image information item and the both-eye video image information item, whereas a two-dimensional display is carried out with use of the both-eye video image information item.

Thus, in the case where the video image display mode desired by the viewer is a three-dimensional display, a video image indicated by the both-eye video image information item is determined as a non-display video image. This arrangement closes the right-eye shutter and the left-eye shutter of the liquid crystal shutter 500 when the non-display video image, that is, the video image indicated by the both-eye video image information item, is displayed by the display device 400. The display control device 2 thus (i) prevents a both-eye video image, unnecessary for the viewing mode, from being viewed by the viewer and (ii) allows the viewer to view respective video images indicated by the right-eye video image information item and the left-eye video image information item. This makes it possible to carry out a three-dimensional display.

Similarly, in the case where the video image display mode desired by the viewer is a two-dimensional display, respective video images indicated by the right-eye video image information item and the left-eye video image information item are each determined as a non-display video image. This arrangement closes the right-eye shutter and the left-eye shutter of the liquid crystal shutter 500 when the non-display video image, that is, each of the respective video images indicated by the right-eye video image information item and the left-eye video image information item, is displayed by the display device 400. The display control device 2 thus prevents such video images, indicated by the right-eye video image information item and the left-eye video image information item and thus unnecessary for the viewing mode, from being viewed by the viewer. The display control device 2 thus (i) prevents such video images, indicated by the right-eye video image information item and the left-eye video image information item and thus unnecessary for the viewing mode, from being viewed by the viewer, and (ii) allows the viewer to view a video image indicated by the both-eye video image information item. This makes it possible to carry out a two-dimensional display.

The display control device 2 can thus achieve the viewer's desired mode for viewing a video image (that is, for viewing a two-dimensional display video image or a three-dimensional display video image).

The display control device 2 (or the display control device 3) may preferably be further arranged such that in the case where (i) there are two or more viewers and (ii) the viewing mode information corresponds to each of such two or more viewers individually, the shutter operation control section 80 closes the right-eye shutter and the left-eye shutter of the liquid crystal shutter 500 used by each of the two or more viewers.

The above arrangement, even in the case where there are two or more viewers, allows the shutter operation control section 80 to, on the basis of viewing mode information corresponding to each of such two or more viewers, close the right-eye shutter and the left-eye shutter of the liquid crystal shutter 500 used by each of the two or more viewers.

The display control device 2 (or the display control device 3) thus, even in the case where there are two or more viewers, advantageously allows each viewer to view a video image in a mode suitable for the viewer.

The display control device 2 may be formed by a computer. In this case, the present invention further encompasses (i) a display control program for causing a computer to operate as each of the means to form the display control device by a computer and (ii) a computer-readable recording medium on which the display control program is stored.

Embodiment 4

Figure 16:
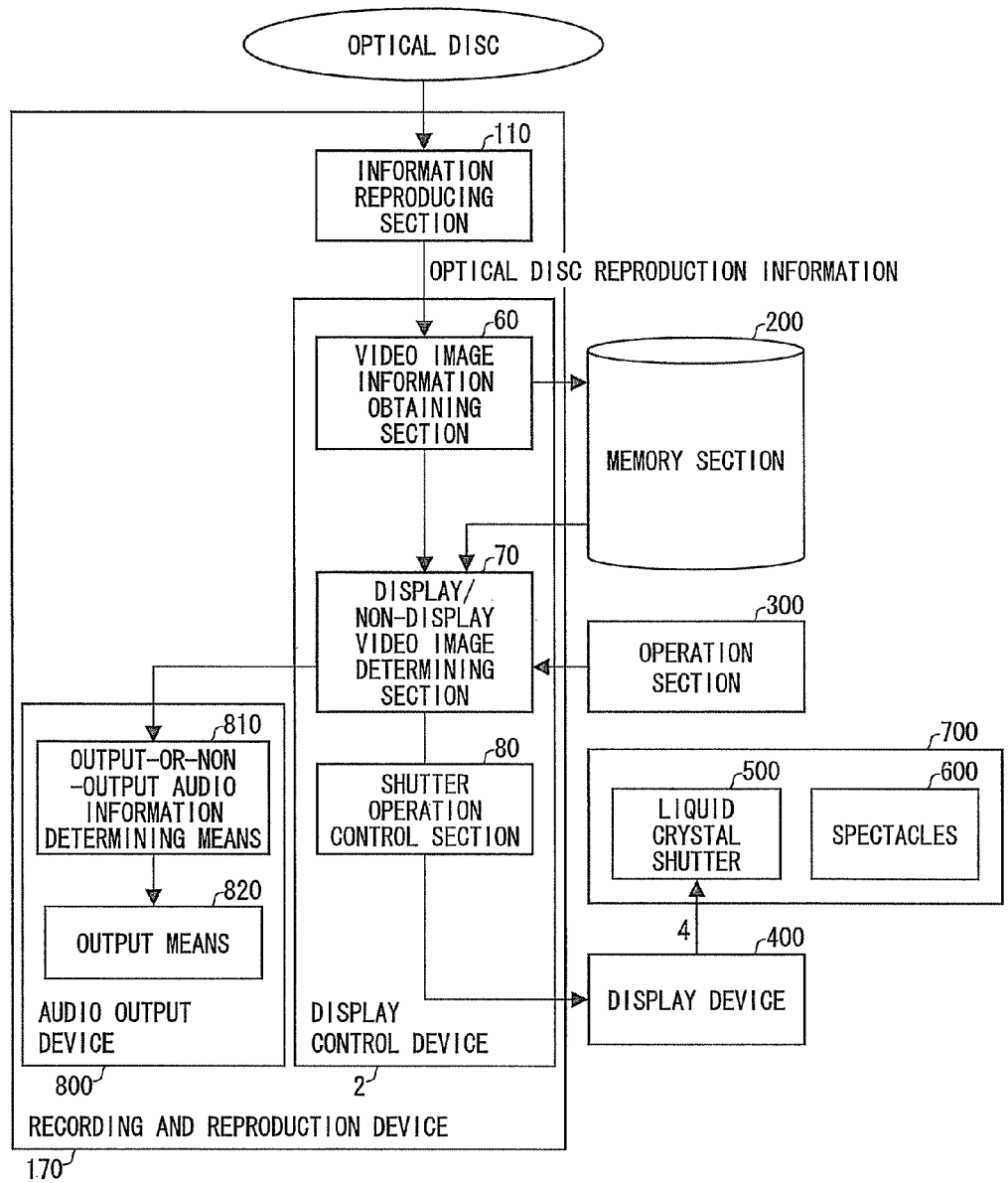
FIG. 16 is a block diagram illustrating an audio output device of the present invention.

The following describes an audio output device 800 of the present invention with reference to FIG. 16. FIG. 16 is a block diagram illustrating the audio output device 800. The description below does not repeat points described above with reference to drawings such as FIG. 1.

The audio output device 800 is used when a video image displayed by the display device 400 is accompanied by an audio indicated by audio information. The audio output device 800 includes: an output/non-output audio information determining section (output-or-non-output audio information determining means) 810; and an output section (output means) 820.

The output/non-output audio information determining section 810 obtains, from the display control device (more specifically, the display/non-display video image determining section 70) of the present invention, (i) display video image information indicative of a display video image itself and (ii) non-display video image information indicative of a non-display video image itself. The output/non-output audio information determining section 810 determines (i) as output audio information to be outputted to the outside, audio information accompanying the display video image and (ii) as non-output audio information not to be outputted to the outside, audio information associated with the non-display video image. The output/non-output audio information determining section 810 supplies determination results, that is, the output audio information and the non-output audio information, to the output section 820.

When a display video image associated with output audio information is displayed by the display device 400, the output section 820 supplies, to a loud speaker (not shown), an audio indicated by audio information determined by the output/non-output audio information determining section 810 as output audio information.

The audio output device 800 in FIG. 16 is built in a recording and reproduction device 170. The audio output device 800 may alternatively be provided externally to the recording and reproduction device 170 instead of inside the recording and reproduction device 170.

[Advantages Achieved by Audio Output Device 800]

With the above arrangement, when a display video image is displayed by the display device 400, an audio indicated by output audio information associated with the display video image is also outputted. Conversely speaking, when a non-display video image is displayed by the display device 400, an audio indicated by audio information associated with the non-display video image is not outputted.

With the above arrangement, the audio output device 800 allows a viewer to simultaneously view a display video image and listen to an audio associated with the display video image. In the case where (i) there are two or more viewers, and (ii) there are a display video image and an audio associated with the display video image for each of such two or more viewers, the audio output device 800, which has the above arrangement, allows each viewer to simultaneously view the display video image and listen to the audio associated with it.

In the case where an audio is outputted to each of two or more viewers, (i) each viewer uses audio output means such as headphones, and (ii) an audio associated with the display video image is outputted to the individual audio output means. This can prevent various audios from mixing with one another.

Embodiment 5

Figure 17:
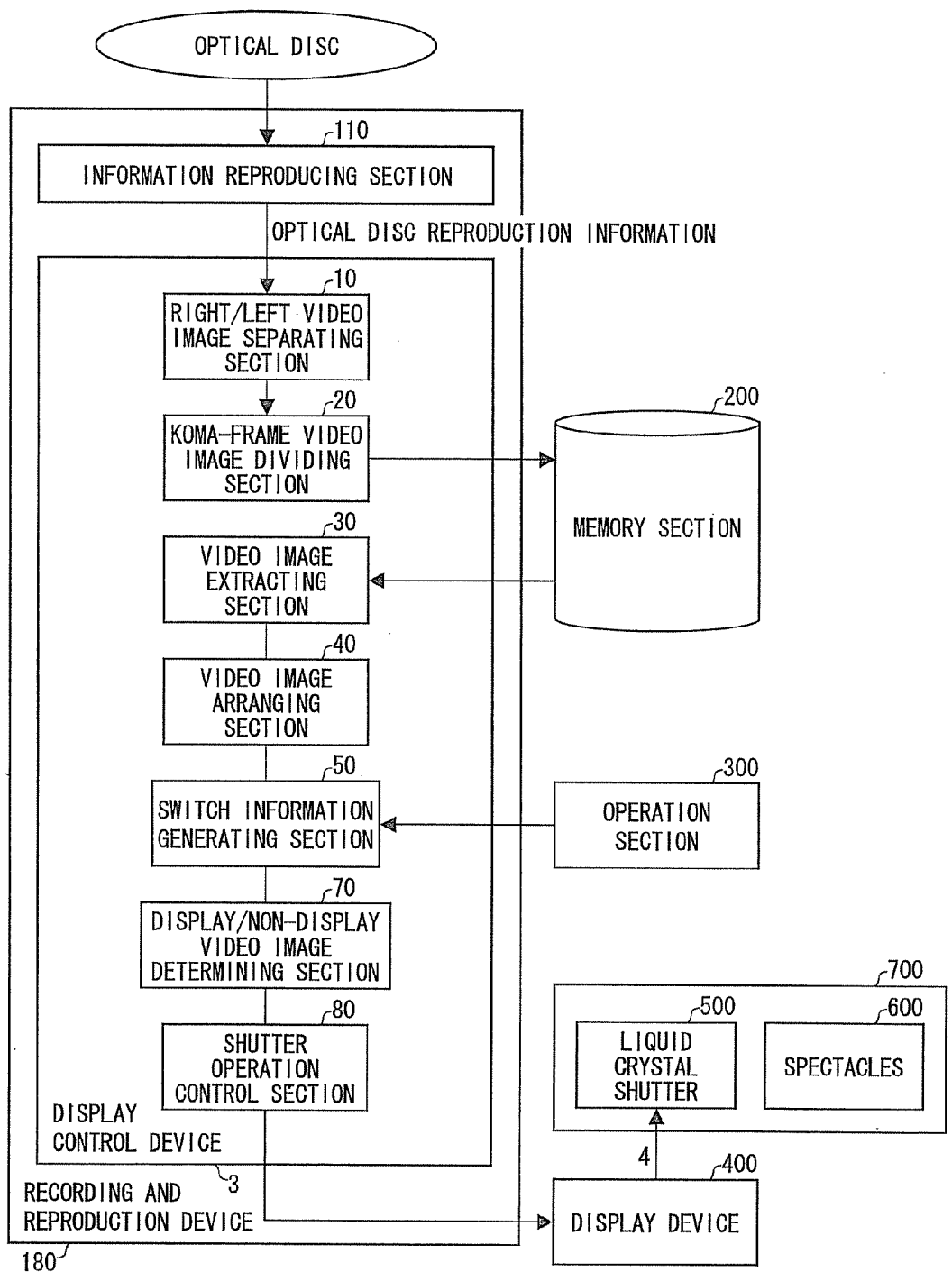
FIG. 17 is a block diagram schematically illustrating a configuration of a recording and reproduction device including still another display control device of the present invention.

The following describes, with reference to FIG. 17, a display control device 3, which is a variation of the display control device 1 described above with reference to FIG. 1. FIG. 17 is a block diagram schematically illustrating a configuration of a recording and reproduction device 180 including the display control device 3. The description below does not repeat points described above with reference to drawings such as FIG. 1.

The recording and reproduction device 180, as illustrated in FIG. 17, includes at least the display control device 3 and an information reproducing section 110.

The display control device 3 allows each viewer to view a video image in a mode suitable for the viewer. The display control device 3, as illustrated in FIG. 17, includes: a right/left video image separating section 10; a koma-frame video image dividing section 20; a video image extracting section 30; a video image arranging section 40; and a switch information generating section 50. The display control device 3 further includes: a display/non-display video image determining section 70; and a shutter operation control section 80.

The description below assumes that video image information includes (i) right-eye video image information indicative of a right-eye video image itself usable in a three-dimensional display and (ii) left-eye video image information indicative of a left-eye video image itself usable in a three-dimensional display, and that viewing mode information includes dominant-eye information indicative of whether the dominant eye of a viewer is the right eye or the left eye.

The video image extracting section 30 extracts, from among a plurality of right-eye video image information items and left-eye video image information items, a pair of a right-eye video image information item and a left-eye video image information item for use in a three-dimensional display.

The video image arranging section 40 regularly arranges the right-eye video image information item and the left-eye video image information item both extracted by the video image extracting section 30.

The switch information generating section 50, on the basis of (i) the arrangement order of the right-eye video image information item and the left-eye video image information item arranged by the video image arranging section 40 and (ii)

the dominant-eye information, generates switch information for use by the liquid crystal shutter 500 in switching between a displaying state and a non-displaying state of the right-eye video image and the left-eye video image.

The display/non-display video image determining section 70 then, on the basis of the switch information generated by the switch information generating section 50, determines whether the video image is a display video image or a non-display video image.

Further, the shutter operation control section 80 controls the respective opening/closing operations of the right-eye shutter and the left-eye shutter on the basis of the switch information.

[Advantages Achieved by Display Control Device 3]

According to the above arrangement, the respective opening/closing operations of the right-eye shutter and the left-eye shutter are carried out as controlled by the shutter operation control section 80 on the basis of switch information. This switch information is generated as follows: The video image extracting section 30 extracts, from among a plurality of right-eye video image information items and left-eye video image information items, a pair of a right-eye video image information item and a left-eye video image information item for use in a three-dimensional display. The video image arranging section 40 then regularly arranges the pair of a right-eye video image information item and a left-eye video image information item thus extracted. On the basis of this arrangement order and dominant-eye information indicative of whether the dominant eye of a viewer is the right eye or the left eye, switch information is generated.

The right-eye shutter and the left-eye shutter of the liquid crystal shutter 500 can thus, on the basis of (i) the arrangement order of a right-eye video image and a left-eye video image for use in a three-dimensional display and (ii) the dominant eye of a viewer, be switched between a displaying state and a non-displaying state for each of the right-eye video image and the left-eye video image. Specifically, in the case where the dominant eye of a viewer is the right eye, the liquid crystal shutter 500 can first (i) set the right-eye video image (hereinafter a video image on the side of the dominant eye is also referred to as "main video image") to a displaying state and the left-eye video image (hereinafter a video image on the side of the eye other than the dominant eye is also referred to as "auxiliary video image") to a non-displaying state and then (ii) set the auxiliary video image to a displaying state and the main video image to a non-displaying state. In addition, the liquid crystal shutter 500 can also set both the right-eye video image and the left-eye video image to a non-display state for a non-display video image.

This arrangement allows the display control device 3 to display a main video image and an auxiliary video image in that order. This in turn advantageously prevents 3D sickness, which is believed to be caused as follows: When an auxiliary video image and a main video image are displayed in that order, the brain (i) senses, as a sickness, a gap between "motion of a scene currently being viewed" and "actual motion of the osseous semicircular canals" and (ii) is confused as a result. The above arrangement, in other words, advantageously allows each viewer to view a video image in a mode suitable for the viewer.

Further, in the case where, for example, the video image extracting section 30 of the display control device 3 extracts, from among a plurality of right-eye video image information items and left-eye video image information items both stored on an information recording medium, a pair of a right-eye video image information item and a left-eye video image information item for use in a three-dimensional display, the above arrangement eliminates the need to doubly store video image information on the information recording medium, that is, video image information including a right-eye video image information item and a left-eye video image information item with different arrangements corresponding to the dominant eye of each viewer. The above arrangement thus makes it possible to reduce the cost of producing the information recording medium.

The display control device 3, which has the above arrangement, naturally achieves other advantages achieved by the display control device 1 described above.

The video image arranging section 40 of the display control device 3 arranges the pair of a right-eye video image information item and a left-eye video image information item, both extracted by the video image extracting section 30, in one of the following orders:

(1) right-eye video image information item, left-eye video image information item, right-eye video image information item (2) left-eye video image information item, right-eye video image information item, left-eye video image information item (3) right-eye video image information item, left-eye video image information item (4) left-eye video image information item, right-eye video image information item In the orders (1) and (2) above, the video image arranging section 40 arranges the right-eye video image information item and the left-eye video image information item, both extracted by the video image extracting section 30, regularly as three instances of video image information. This arrangement makes it possible to create, on the basis of the dominant eye of each viewer, a video image not to be displayed to the viewer.

Thus, the display control device 3, in consideration of whether the dominant eye of a viewer is the right eye or the left eye, allows the brain of the viewer to first recognize a video image that should be recognized first. This arrangement can thus prevent the viewer from suffering from 3D sickness. The above arrangement, in other words, allows each viewer to view a video image in a mode suitable for the viewer.

In the orders (3) and (4) above, the video image arranging section 40 arranges the right-eye video image information item and the left-eye video image information item, both extracted by the video image extracting section 30, regularly as two instances of video image information. This arrangement makes it possible to create, on the basis of the dominant eye of each viewer, a video image not to be displayed to the viewer. The orders (3) and (4) are arrangement orders applicable in a case where the right-eye video image and the left-eye video image are so finely divided into individual koma-frames that the difference between the video images cannot be recognized.

The display control device 3 is, as described above, arranged such that the video image arranging section 40 can regularly and variously arrange, on the basis of the right-eye video image and the left-eye video image, a pair of a right-eye video image information item and a left-eye video image information item both extracted by the video image extracting section 30. The display control device 3 thus, (i) regardless of the arrangement order and (ii) in consideration of whether the dominant eye of a viewer is the right eye or the left eye, allows the brain of the viewer to first recognize a video image that should be recognized first.

The display control device 3 thus allows each viewer to view a video image in a mode suitable for the viewer.

The display control device 3 is further arranged such that in the case where the video image arranging section 40 arranges the right-eye video image information item and the left-eye video image information item in the successive order of the right-eye video image information item, the left-eye video image information item, and the right-eye video image information item, which are designated by first, second, and third video image information items respectively, the switch information generated by the switch information generating section 50 is, (I) in the case where the dominant eye of the viewer is the right eye, for (i) opening the right-eye shutter and closing the left-eye shutter for the first video image information item, (ii) closing the right-eye shutter and opening the left-eye shutter for the second video image information item, and (iii) closing both the right-eye shutter and the left-eye shutter for the third video image information item, and (II) in the case where the dominant eye of the viewer is the left eye, for (i) closing both the right-eye shutter and the left-eye shutter for the first video image information item, (ii) closing the right-eye shutter and opening the left-eye shutter for the second video image information item, and (iii) opening the right-eye shutter and closing the left-eye shutter for the third video image information item; and the display/non-display video image determining section 70, (i) in the case where the dominant eye of the viewer is the right eye, determines, as the non-display video image, a video image indicated by the third video image information item, and (ii) in the case where the dominant eye of the viewer is the left eye, determines, as the non-display video image, a video image indicated by the first video image information item.

The display control device 3 is further arranged such that in the case where the video image arranging section 40 arranges the right-eye video image information item and the left-eye video image information item in the successive order of the left-eye video image information item, the right-eye video image information item, and the left-eye video image information item, which are designated by first, second, and third video image information items respectively, the switch information generated by the switch information generating section 50 is, (I) in the case where the dominant eye of the viewer is the right eye, for (i) closing both the right-eye shutter and the left-eye shutter for the first video image information item, (ii) opening the right-eye shutter and closing the left-eye shutter for the second video image information item, and (iii) closing the right-eye shutter and opening the left-eye shutter for the third video image information item, and (II) in the case where the dominant eye of the viewer is the left eye, for (i) closing the right-eye shutter and opening the left-eye shutter for the first video image information item, (ii) opening the right-eye shutter and closing the left-eye shutter for the second video image information item, and (iii) closing both the right-eye shutter and the left-eye shutter for the third video image information item; and the display/non-display video image determining section 70, (i) in the case where the dominant eye of the viewer is the right eye, determines, as the non-display video image, a video image indicated by the first video image information item, and (ii) in the case where the dominant eye of the viewer is the left eye, determines, as the non-display video image, a video image indicated by the third video image information item.

The display control device 3 is further arranged such that in the case where the video image arranging section 40 arranges the right-eye video image information item and the left-eye video image information item in the successive order of the right-eye video image information item and the left-eye video image information item, which are designated by first and second video image information items respectively, the switch information generated by the switch information generating section 50 is, in the case where the dominant eye of the viewer is the left eye, for (i) closing both the right-eye shutter and the left-eye shutter for the first video image information item and (ii) closing the right-eye shutter and opening the left-eye shutter for the second video image information item, and in a case where a right-eye video image information item and a left-eye video image information item both subsequently extracted by the video image extracting section 30 are designated by third and fourth video image information items respectively, (iii) opening the right-eye shutter and closing the left-eye shutter for the third video image information item and (iv) closing the right-eye shutter and opening the left-eye shutter for the fourth video image information item; and the display/non-display video image determining section 70 determines, as the non-display video image, a video image indicated by the first video image information item.

The display control device 3 is further arranged such that in the case where the video image arranging section 40 arranges the right-eye video image information item and the left-eye video image information item in the successive order of the left-eye video image information item and the right-eye video image information item, which are designated by first and second video image information items respectively, the switch information generated by the switch information generating section 50 is, in the case where the dominant eye of the viewer is the right eye, for (i) closing both the right-eye shutter and the left-eye shutter for the first video image information item and (ii) opening the right-eye shutter and closing the left-eye shutter for the second video age information item, and in the case where a right-eye video image information item and a left-eye video image information item both subsequently extracted by the video image extracting section 30 are designated by third and fourth video image information items respectively, (iii) closing the right-eye shutter and opening the left-eye shutter for the third video image information item and (iv) opening the right-eye shutter and closing the left-eye shutter for the fourth video image information item; and the display/non-display video image determining section 70 determines, as the non-display video image, a video image indicated by the first video image information item.

With the above arrangements, the display control device 3, regardless of whether the dominant eye of a viewer is the right eye or the left eye, allows a main video image and an auxiliary video image to be displayed to the viewer in that order. The display control device 3 thus prevents 3D sickness, which is believed to be caused as follows: When an auxiliary video image and a main video image are displayed in that order, the brain (i) senses, as a sickness, a gap between "motion of a scene currently being viewed" and "actual motion of the osseous semicircular canals" and (ii) is confused as a result.

Consequently, The display control device 3, regardless of whether the dominant eye of a viewer is the right eye or the left eye, advantageously allows each viewer to view a video image in a mode suitable for the viewer.

[Supplemental Notes]

Finally, (i) the blocks of the display control devices 1 through 3, particularly the right/left video image separating section 10, the koma-frame video image dividing section 20, the video image extracting section 30, the video image arranging section 40, the switch information generating section 50, the display/non-display video image determining section 70, and the shutter operation control section 80 of the display control devices 1 through 3, and (ii) the blocks of the audio output device 800, particularly the output/non-output audio information determining section 810 and the output section 820, may be implemented by hardware or software executed by a CPU as below.

The display control devices 1 through 3 and the audio output device 800 each include a CPU (central processing unit) and memory devices (memory media). The CPU (central processing unit) executes instructions in control programs realizing the functions. The memory devices include a ROM (read only memory) which contains programs, a RAM (random access memory) to which the programs are loaded, and a memory containing the programs and various data. The objective of the present invention can also be achieved by mounting to the display control devices 1 through 3 and the audio output device 800 a computer-readable storage medium containing control program code (executable program, intermediate code program, or source program) for the display control devices 1 through 3, which is a software realizing the aforementioned functions, in order for the computer (or CPU, MPU) to retrieve and execute the program code contained in the storage medium.

The storage medium may be, for example, (i) a tape such as a magnetic tape and a cassette tape, (ii) a disc such as a magnetic disc (for example, a Floppy[®] disc or a hard disc) and an optical disc (for example, a CD-ROM, an MO, an MD, a DVD, or a CD-R), or (iii) a card such as an IC card (memory card) and an optical card, or (iv) a semiconductor memory such as a mask ROM, an EPROM, an EEPROM, and a flash ROM.

The display control devices 1 through 3 and the audio output device 800 may be arranged connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power line, cable TV line, telephone line, or ADSL line; or wireless, such as infrared radiation (IrDA, remote control), Bluetooth(®), 802.11 wireless, HDR, mobile telephone network, satellite line, or terrestrial digital network. The present invention encompasses a mode of a computer data signal in which a carrier wave is embedded, the computer data signal in which the program code is embodied electronically.

The present invention is not limited to the description of the embodiment above, but may be altered in various ways by a skilled person within the scope of the claims. Any embodiment based on a combination of technical means properly altered within the scope of the claims is also encompassed in the technical scope of the present invention.

In order to solve the above problem, a display control device of the present invention is a display control device for controlling display state switching means capable of switching, between a displaying state and a non-displaying state, each of a right-eye video image and a left-eye video image for use in a three-dimensional display, the display control device including: in a case where the right-eye video image and the left-eye video image are indicated by a right-eye video image information item and a left-eye video image information item respectively, extracting means for extracting, from among, a plurality of right-eye video image information items and left-eye video image information items, a pair of a right-eye video image information item and a left-eye video image information item for use in a three-dimensional display; arranging means for regularly arranging the right-eye video image information item and the left-eye video image information item both extracted by the extracting means; and switch information generating means for generating, on a basis of (i) an arrangement order of the right-eye video image information item and the left-eye video image information item arranged by the arranging means and (ii) dominant-eye information indicative of whether a dominant eye of a user is a right eye or a left eye, switch information for use by the display state switching means in switching each of the right-eye video image and the left-eye video image between the displaying state and the non-displaying state.

In order to solve the above problem, a display control method of the present invention is a display control method for controlling display state switching means capable of switching, between a displaying state and a non-displaying state, each of a right-eye video image and a left-eye video image for use in a three-dimensional display, the display control method including the steps of: in a case where the right-eye video image and the left-eye video image are indicated by a right-eye video image information item and a left-eye video image information item respectively, an extracting step for extracting, from among a plurality of right-eye video image information items and left-eye video image information items, a pair of a right-eye video image information item and a left-eye video image information item for use in a three-dimensional display; an arranging step for regularly arranging the right-eye video image information item and the left-eye video image information item both extracted in the extracting step; and a switch information generating step for generating, on a basis of (i) an arrangement order of the right-eye video image information item and the left-eye video image information item arranged in the arranging step and (ii) dominant-eye information indicative of whether a dominant eye of a user is a right eye or a left eye, switch information for use by the display state switching means in switching each of the right-eye video image and the left-eye video image between the displaying state and the non-displaying state.

The display control device of the present invention is a display control device for controlling display state switching means capable of switching, between a displaying state and a non-displaying state, each of a right-eye video image and a left-eye video image for use in a three-dimensional display.

According to the above arrangement, the display state switching means is used to switch each of a right-eye video image and a left-eye video image between a displaying state and a non-displaying state on the basis of switch information generated by the switch information generating means. This switch information is generated as follows: The extracting means extracts, from among a plurality of right-eye video image information items and left-eye video image information items, a pair of a right-eye video image information item and a left-eye video image information item for use in a three-dimensional display. The arranging means then regularly arranges the pair of a right-eye video image information item and a left-eye video image information item thus extracted. On the basis of this arrangement order and dominant-eye information indicative of whether the dominant eye of a user is the right eye or the left eye, switch information is generated.

The display state switching means can thus, in consideration of (i) the arrangement order of a right-eye video image and a left-eye video image for use in a three-dimensional display and (ii) the dominant eye of a user, switch each of the right-eye video image and the left-eye video image between a displaying state and a non-displaying state. Specifically, in the case where the dominant eye of a user is the right eye, the display state switching means can first (i) set the right-eye video image (hereinafter a video image on the side of the dominant eye is also referred to as "main video image") to a displaying state and the left-eye video image (hereinafter a video image on the side of the eye other than the dominant eye is also referred to as "auxiliary video image") to a non-displaying state and then (ii) set the auxiliary video image to a displaying state and the main video image to a non-displaying state.

This arrangement allows the display control device of the present invention to display a main video image and an auxiliary video image in that order. This in turn advantageously prevents 3D sickness, which is believed to be caused as follows: When an auxiliary video image and a main video image are displayed in that order, the brain (i) senses, as a sickness, a gap between "motion of a scene currently being viewed" and "actual motion of the osseous semicircular canals" and (ii) is confused as a result.

Further, the display control device of the present invention is arranged such that in the case where, for example, the extracting means extracts, from among a plurality of right-eye video image information items and left-eye video image information items both stored on an information recording medium, a pair of a right-eye video image information item and a left-eye video image information item for use in a three-dimensional display, the above arrangement eliminates the need to doubly store video image information on the information recording medium, that is, video image information including a right-eye video image information item and a left-eye video image information item with different arrangements corresponding to the dominant eye of each user. The above arrangement thus makes it possible to reduce the cost of producing the information recording medium.

The display control device of the present invention may preferably be arranged such that the arranging means arranges the right-eye video image information item and the left-eye video image information item, both extracted by the extracting means, in a successive order of (1) the right-eye video image information item, the left-eye video image information item, and the right-eye video image information item, (2) the left-eye video image information item, the right-eye video image information item, and the left-eye video image information item, (3) the right-eye video image information item and the left-eye video image information item, or (4) the left-eye video image information item and the right-eye video image information item.

In the orders (1) and (2) above, the arranging means arranges the right-eye video image information item and the left-eye video image information item, both extracted by the extracting means, regularly as three instances of video image information. This arrangement makes it possible to create, in correspondence with the dominant eye of each user, a video image not to be displayed to the user.

Thus, the display control device of the present invention, in consideration of whether the dominant eye of a user is the right eye or the left eye, allows the brain of the user to first recognize a video image that should be recognized first. This arrangement can thus prevent the user from suffering from 3D sickness.

In the orders (3) and (4) above, the arranging means arranges the right-eye video image information item and the left-eye video image information item, both extracted by the extracting means, regularly as two instances of video image information. This arrangement makes it possible to create, on the basis of the dominant eye of each user, a video image not to be displayed to the user. The orders (3) and (4) are arrangement orders applicable in a case where the right-eye video image and the left-eye video image are so finely divided into individual koma-frames that the difference between the video images cannot be recognized.

The display control device of the present invention is, as described above, arranged such that the arranging means can regularly and variously arrange, on the basis of the right-eye video image and the left-eye video image, a pair of a right-eye video image information item and a left-eye video image information item both extracted by the extracting means. The display control device of the present invention thus, (i) regardless of the arrangement order and (ii) in consideration of whether the dominant eye of a user is the right eye or the left eye, allows the brain of the user to first recognize a video image that should be recognized first.

The display control device of the present invention can thus prevent a user from suffering from 3D sickness.

The display control device of the present invention may preferably be further arranged such that in a case where the display state switching means includes two shutters corresponding respectively to the right eye and the left eye, the switch information generating means controls respective opening/closing operations of the two shutters on the basis of the switch information generated by the switch information generating means.

As indicated by the above arrangement, the display state switching means may include a liquid crystal shutter having two shutters corresponding respectively to the right eye and the left eye.

With the above arrangement, the switch information generating means can, on the basis of switch information generated by the switch information generating means, control the respective opening/closing operations of the above two shutters. This in turn allows the display control device of the present invention to (i) display a main video image and an auxiliary video image in that order and thus to (ii) eliminate a cause of 3D sickness.

The display control device of the present invention may preferably be further arranged such that in a case where the arranging means arranges the right-eye video image information item and the left-eye video image information item in the successive order of the right-eye video image information item, the left-eye video image information item, and the right-eye video image information item, which are designated by first, second, and third video image information items respectively, the switch information generating means, to control the liquid crystal shutter on a basis of the switch information generated, (I) in a case where the dominant eye of the user is the right eye, (i) opens the right-eye-side shutter and closes the left-eye-side shutter for the first video image information item, (ii) closes the right-eye-side shutter and opens the left-eye-side shutter for the second video image information item, and (iii) closes both the right-eye-side shutter and the left-eye-side shutter for the third video image information item, and (II) in a case where the dominant eye of the user is the left eye, (i) closes both the right-eye-side shutter and the left-eye-side shutter for the first video image information item, (ii) closes the right-eye-side shutter and opens the left-eye-side shutter for the second video image information item, and (iii) opens the right-eye-side shutter and closes the left-eye-side shutter for the third video image information item.

The display control device of the present invention may preferably be further arranged such that in a case where the arranging means arranges the right-eye video image information item and the left-eye video image information item in the successive order of the left-eye video image information item, the right-eye video image information item, and the left-eye video image information item, which are designated by first, second, and third video image information items respectively, the switch information generating means, to control the liquid crystal shutter on a basis of the switch information generated, (I) in a case where the dominant eye of the user is the right eye, (i) closes both the right-eye-side shutter and the left-eye-side shutter for the first video image information item, (ii) opens the right-eye-side shutter and closes the left-eye-side shutter for the second video image information item, and (iii) closes the right-eye-side shutter and opens the left-eye-side shutter for the third video image information item, and (II) in a case where the dominant eye of the user is the left eye, (i) closes the right-eye-side shutter and opens the left-eye-side shutter for the first video image information item, (ii) opens the right-eye-side shutter and closes the left-eye-side shutter for the second video image information item, and (iii) closes both the right-eye-side shutter and the left-eye-side shutter for the third video image information item.

The display control device of the present invention may preferably be further arranged such that in a case where the arranging means arranges the right-eye video image information item and the left-eye video image information item in the successive order of the right-eye video image information item and the left-eye video image information item, which are designated by first and second video image information items respectively, the switch information generating means, to control the liquid crystal shutter on a basis of the switch information generated, (I) in a case where the dominant eye of the user is the right eye, (i) opens the right-eye-side shutter and closes the left-eye-side shutter for the first video image information item and (ii) closes the right-eye-side shutter and opens the left-eye-side shutter for the second video image information item, and (II) in a case where the dominant eye of the user is the left eye, (i) closes both the right-eye-side shutter and the left-eye-side shutter for the first video image information item and (ii) closes the right-eye-side shutter and opens the left-eye-side shutter for the second video image information item, and in a case where a right-eye video image information item and a left-eye video image information item both subsequently extracted by the extracting means are designated by third and fourth video image information items respectively, (iii) opens the right-eye-side shutter and closes the left-eye-side shutter for the third video image information item and (iv) closes the right-eye-side shutter and opens the left-eye-side shutter for the fourth video image information item.

The display control device of the present invention may preferably be further arranged such that in a case where the arranging means arranges the right-eye video image information item and the left-eye video image information item in the successive order of the left-eye video image information item and the right-eye video image information item, which are designated by first and second video image information items respectively, the switch information generating means, to control the liquid crystal shutter on a basis of the switch information generated, (I) in a case where the dominant eye of the user is the right eye, (i) closes both the right-eye-side shutter and the left-eye-side shutter for the first video image information item and (ii) opens the right-eye-side shutter and closes the left-eye-side shutter for the second video image information item, and in a case where a right-eye video image information item and a left-eye video image information item both subsequently extracted by the extracting means are designated by third and fourth video image information items respectively, (iii) closes the right-eye-side shutter and opens the left-eye-side shutter for the third video image information item and (iv) opens the right-eye-side shutter and closes the left-eye-side shutter for the fourth video image information item, and (II) in a case where the dominant eye of the user is the left eye, (i) closes the right-eye-side shutter and opens the left-eye-side shutter for the first video image information item and (ii) opens the right-eye-side shutter and closes the left-eye-side shutter for the second video image information item.

The above arrangements, regardless of whether the dominant eye of a user is the right eye or the left eye, allow a main video image and an auxiliary video image to be displayed in that order to the user.

The display control device of the present invention can thus advantageously prevent 3D sickness, which is believed to be caused as follows: When an auxiliary video image and a main video image are displayed in that order, the brain (i) senses, as a sickness, a gap between "motion of a scene currently being viewed" and "actual motion of the osseous semicircular canals" and (ii) is confused as a result.

The display control device of the present invention may preferably be further arranged such that the switch information generating means can obtain dominant eye information from two or more users.

The switch information generating means can thus, on the basis of (i) the arrangement order of the right-eye video image information item and the left-eye video image information item arranged by the arranging means and (ii) dominant-eye information indicative of whether the respective dominant eyes of two or more users are each the right eye or the left eye, generate switch information for use by the display state switching means to switch each of the right-eye video image and the left-eye video image between a displaying state and a non-displaying state.

The above arrangement allows the switch information generating means to (i) generate switch information for each of such two or more users and thus to advantageously (ii) control the display state switching means with use of switch information for each user.

The display control device of the present invention may preferably be further arranged such that in the case where two or more users each use their own display state switching means, the switch information generating means generates switch information for use by each display state switching means to switch each of the right-eye video image and the left-eye video image between a displaying state and a non-displaying state.

The above arrangement, in the case where two or more users each use their own display state switching means, allows the switch information generating means to, on the basis of (i) the arrangement order of the right-eye video image information item and the left-eye video image information item arranged by the arranging means and (ii) dominant-eye information indicative of whether the respective dominant eyes of two or more users are each the right eye or the left eye, generate switch information for use by each display state switching means to switch each of the right-eye video image and the left-eye video image between a displaying state and a non-displaying state.

Thus, even in the case where (i) two or more users each use their own display state switching means simultaneously and (ii) the users have different dominant eyes, the display control device of the present invention can advantageously prevent all users from suffering from 3D sickness.

The display control device may be formed by a computer. In this case, the present invention further encompasses (i) a display control program for causing a computer to operate as the extracting means, the arranging means, and the switch information generating means to form the display control device by a computer and (ii) a computer-readable recording medium on which the display control program is stored.

The present invention further encompasses a recording and reproduction device including the display control device.

The display control device of the present invention may preferably be arranged such that the video image information includes (i) a right-eye video image information item indicative of a right-eye video image itself usable in a three-dimensional display and (ii) a left-eye video image information item indicative of a left-eye video image itself usable in a three-dimensional display; and in a case where the viewing mode information includes two-dimensional viewing information indicating that the viewing mode desired by the viewer is for viewing a two-dimensional display video image, the display-or-non-display video image determining means determines, on a basis of (i) the right-eye video image information item and the left-eye video image information item and (ii) the two-dimensional viewing information, a first one of the right-eye video image and the left-eye video image as the display video image and a second one of the right-eye video image and the left-eye video image as the non-display video image.

The above arrangement determines (i) a first one of the right-eye video image and the left-eye video image as a display video image and (ii) a second one of the right-eye video image and the left-eye video image as a non-display video image.

Thus, in the case where, for example, the display control device of the present invention determines (i) a right-eye video image as a display video image and (ii) a left-eye video image as a non-display video image, it closes the right-eye shutter and the left-eye shutter of the display state switching means when the left-eye video image, that is, a non-display video image, is displayed by the display device. The display control device of the present invention consequently prevents the left-eye video image, unnecessary for the viewing mode, from being viewed by the viewer.

In other words, the viewer can view only the right-eye video image, that is, a display video image. The display control device of the present invention can consequently achieve the viewer's desired mode for viewing a video image (that is, for viewing a two-dimensional display video image).

The display control device of the present invention may preferably be arranged such that the video image information includes video image provider information about a video image provider of the video image displayed by the display device; the viewing mode information includes specific provider viewing information indicating that the viewing mode desired by the viewer is for viewing a video image provided by a specific video image provider; and in a case where the video image displayed by the display device includes a plurality of video images provided by respective video image providers, the display-or-non-display video image determining means, on a basis of the video image provider information and the specific provider viewing information, determines (i) as the display video image, the video image provided by the specific video image provider and (ii) as the non-display video image, a video image provided by a video image provider other than the specific video image provider.

The above arrangement determines (i) as a display video image, a video image provided by a specific video image provider and (ii) as a non-display video image, a video image provided by a video image provider other than the specific video image provider.

The display control device of the present invention thus closes the right-eye shutter and the left-eye shutter of the display state switching means when a video image provided by a video image provider other than the specific video image provider is displayed by the display device. The display control device of the present invention consequently prevents such a video image, provided by a video image provider other than the specific video image provider and thus unnecessary for the viewing mode, from being viewed by the viewer.

In other words, the viewer can view only a display video image, that is, a video image provided by a specific video image provider. The display control device of the present invention can consequently achieve the viewer's desired mode for viewing a video image (that is, for viewing a video image provided by a specific video image provider).

The display control device of the present invention may preferably be arranged such that the video image information includes video image attribute information indicative of an attribute of the video image displayed by the display device; the viewing mode information includes specific attribute information indicating that the viewing mode desired by the viewer is for viewing a video image having a specific attribute; and in a case where the video image displayed by the display device includes a plurality of video images having respective attributes, the display-or-non-display video image determining means, on a basis of the video image attribute information and the specific attribute information, determines (i) as the display video image, the video image having the specific attribute and (ii) as the non-display video image, a video image having an attribute other than the specific attribute.

The above arrangement determines (i) as a display video image, a video image having a specific attribute and (ii) as a non-display video image, a video image having an attribute other than the specific attribute.

The display control device of the present invention thus closes the right-eye shutter and the left-eye shutter of the display state switching means when a video image having an attribute other than the specific attribute is displayed by the display device. The display control device of the present invention consequently prevents such a video image, having an attribute other than the specific attribute and thus unnecessary for the viewing mode, from being viewed by the viewer.

In other words, the viewer can view only a display video image, that is, a video image having a specific attribute. The display control device of the present invention can consequently achieve the viewer's desired mode for viewing a video image (that is, for viewing a video image having a specific attribute).

The display control device of the present invention may preferably be arranged such that the video image information includes (i) a right-eye video image information item indicative of a right-eye video image itself usable in a three-dimensional display and (ii) a left-eye video image information item indicative of a left-eye video image itself usable in a three-dimensional display; the viewing mode information includes dominant eye information indicative of whether a dominant eye of the viewer is a right eye or a left eye; the display control device further includes: extracting means for extracting, from among a plurality of right-eye video image information items and left-eye video image information items, a pair of a right-eye video image information item and a left-eye video image information item for use in a three-dimensional display; arranging means for regularly arranging the right-eye video image information item and the left-eye video image information item both extracted by the extracting means; and switch information generating means for generating, on a basis of (i) an arrangement order of the right-eye video image information item and the left-eye video image information item arranged by the arranging means and (ii) the dominant-eye information, switch information for use by the display state switching means in switching each of the right-eye video image and the left-eye video image between the displaying state and the non-displaying state; the display-or-non-display video image determining means determines, on a basis of the switch information generated by the switch information generating means, whether the video image displayed by the display device is the display video image or the non-display video image; and the shutter operation control means controls respective opening-or-closing operations of the right-eye shutter and the left-eye shutter on a basis of the switch information.

According to the above arrangement, the respective opening/closing operations of the right-eye shutter and the left-eye shutter are carried out as controlled by the shutter operation control means on the basis of switch information. This switch information is generated as follows: The extracting means extracts, from among a plurality of right-eye video image information items and left-eye video image information items, a pair of a right-eye video image information item and a left-eye video image information item for use in a three-dimensional display. The arranging means then regularly arranges the pair of a right-eye video image information item and a left-eye video image information item thus extracted. On the basis of this arrangement order and dominant-eye information indicative of whether the dominant eye of a viewer is the right eye or the left eye, switch information is generated.

The right-eye shutter and the left-eye shutter of the display state switching means can thus, on the basis of (i) the arrangement order of a right-eye video image and a left-eye video image for use in a three-dimensional display and (ii) the dominant eye of a viewer, be switched between a displaying state and a non-displaying state for each of the right-eye video image and the left-eye video image. Specifically, in the case where the dominant eye of a viewer is the right eye, the display state switching means can first (i) set the right-eye video image (hereinafter a video image on the side of the dominant eye is also referred to as "main video image") to a displaying state and the left-eye video image (hereinafter a video image on the side of the eye other than the dominant eye is also referred to as "auxiliary video image") to a non-displaying state and then (ii) set the auxiliary video image to a displaying state and the main video image to a non-displaying state. In addition, the display state switching means can also set both the right-eye video image and the left-eye video image to a non-display state for a non-display video image.

This arrangement allows the display control device of the present invention to display a main video image and an auxiliary video image, in that order. This in turn advantageously prevents 3D sickness, which is believed to be caused as follows: When an auxiliary video image and a main video image are displayed in that order, the brain (i) senses, as a sickness, a gap between "motion of a scene currently being viewed" and "actual motion of the osseous semicircular canals" and (ii) is confused as a result. The above arrangement, in other words, advantageously allows each viewer to view a video image in a mode suitable for the viewer.

Further, in the case where, for example, the extracting means of the display control device of the present invention extracts, from among a plurality of right-eye video image information items and left-eye video image information items both stored on an information recording medium, a pair of a right-eye video image information item and a left-eye video image information item for use in a three-dimensional display, the above arrangement eliminates the need to doubly store video image information on the information recording medium, that is, video image information including a right-eye video image information item and a left-eye video image information item with different arrangements corresponding to the dominant eye of each viewer. The above arrangement thus makes it possible to reduce the cost of producing the information recording medium.

The display control device of the present invention may preferably be arranged such that the arranging means arranges the right-eye video image information item and the left-eye video image information item, both extracted by the extracting means, in a successive order of (1) the right-eye video image information item, the left-eye video image information item, and the right-eye video image information item, (2) the left-eye video image information item, the right-eye video image information item, and the left-eye video image information item, (3) the right-eye video image information item and the left-eye video image information item, or (4) the left-eye video image information item and the right-eye video image information item.

In the orders (1) and (2) above, the arranging means arranges the right-eye video image information item and the left-eye video image information item, both extracted by the extracting means, regularly as three instances of video image information. This arrangement makes it possible to create, on the basis of the dominant eye of each viewer, a video image not to be displayed to the viewer.

Thus, the display control device of the present invention, in consideration of whether the dominant eye of a viewer is the right eye or the left eye, allows the brain of the viewer to first recognize a video image that should be recognized first. This arrangement can thus prevent the viewer from suffering from 3D sickness. The above arrangement, in other words, allows each viewer to view a video image in a mode suitable for the viewer.

In the orders (3) and (4) above, the arranging means arranges the right-eye video image information item and the left-eye video image information item, both extracted by the extracting means, regularly as two instances of video image information. This arrangement makes it possible to create, on the basis of the dominant eye of each viewer, a video image not to be displayed to the viewer. The orders (3) and (4) are arrangement orders applicable in a case where the right-eye video image and the left-eye video image are so finely divided into individual koma-frames that the difference between the video images cannot be recognized.

The display control device of the present invention is, as described above, arranged such that the arranging means can regularly and variously arrange, on the basis of the right-eye video image and the left-eye video image, a pair of a right-eye video image information item and a left-eye video image information item both extracted by the extracting means. The display control device of the present invention thus, (i) regardless of the arrangement order and (ii) in consideration of whether the dominant eye of a viewer is the right eye or the left eye, allows the brain of the viewer to first recognize a video image that should be recognized first.

The display control device of the present invention thus allows each viewer to view a video image in a mode suitable for the viewer.

The display control device of the present invention may preferably be arranged such that in a case where the arranging means arranges the right-eye video image information item and the left-eye video image information item in the successive order of the right-eye video image information item, the left-eye video image information item, and the right-eye video image information item, which are designated by first, second, and third video image information items respectively, the switch information generated by the switch information generating means is, (I) in a case where the dominant eye of the viewer is the right eye, for (i) opening the right-eye shutter and closing the left-eye shutter for the first video image information item, (ii) closing the right-eye shutter and opening the left-eye shutter for the second video image information item, and (iii) closing both the right-eye shutter and the left-eye shutter for the third video image information item, and (II) in a case where the dominant eye of the viewer is the left eye, for (i) closing both the right-eye shutter and the left-eye shutter for the first video image information item, (ii) closing the right-eye shutter and opening the left-eye shutter for the second video image information item, and (iii) opening the right-eye shutter and closing the left-eye shutter for the third video image information item; and the display-or-non-display video image determining means, (i) in the case where the dominant eye of the viewer is the right eye, determines, as the non-display video image, a video image indicated by the third video image information item, and (ii) in the case where the dominant eye of the viewer is the left eye, determines, as the non-display video image, a video image indicated by the first video image information item.

The display control device of the present invention may preferably be arranged such that in a case where the arranging means arranges the right-eye video image information item and the left-eye video image information item in the successive order of the left-eye video image information item, the right-eye video image information item, and the left-eye video image information item, which are designated by first, second, and third video image information items respectively, the switch information generated by the switch information generating means is, (I) in a case where the dominant eye of the viewer is the right eye, for (i) closing both the right-eye shutter and the left-eye shutter for the first video image information item, (ii) opening the right-eye shutter and closing the left-eye shutter for the second video image information item, and (iii) closing the right-eye shutter and opening the left-eye shutter for the third video image information item, and (II) in a case where the dominant eye of the viewer is the left eye, for (i) closing the right-eye shutter and opening the left-eye shutter for the first video image information item, (ii) opening the right-eye shutter and closing the left-eye shutter for the second video image information item, and (iii) closing both the right-eye shutter and the left-eye shutter for the third video image information item; and the display-or-non-display video image determining means, (i) in the case where the dominant eye of the viewer is the right eye, determines, as the non-display video image, a video image indicated by the first video image information item, and (ii) in the case where the dominant eye of the viewer is the left eye, determines, as the non-display video image, a video image indicated by the third video image information item.

The display control device of the present invention may preferably be arranged such that in a case where the arranging means arranges the right-eye video image information item and the left-eye video image information item in the successive order of the right-eye video image information item and the left-eye video image information item, which are designated by first and second video image information items respectively, the switch information generated by the switch information generating means is, in a case where the dominant eye of the viewer is the left eye, for (i) closing both the right-eye shutter and the left-eye shutter for the first video image information item and (ii) closing the right-eye shutter and opening the left-eye shutter for the second video image information item, and in a case where a right-eye video image information item and a left-eye video image information item both subsequently extracted by the extracting means are designated by third and fourth video image information items respectively, (iii) opening the right-eye shutter and closing the left-eye shutter for the third video image information item and (iv) closing the right-eye shutter and opening the left-eye shutter for the fourth video image information item; and the display-or-non-display video image determining means determines a video image indicated by the first video image information item as the non-display video image.

The display control device of the present invention may preferably be arranged such that in a case where the arranging means arranges the right-eye video image information item and the left-eye video image information item in the successive order of the left-eye video image information item and the right-eye video image information item, which are designated by first and second video image information items respectively, the switch information generated by the switch information generating means is, in a case where the dominant eye of the viewer is the right eye, for (i) closing both the right-eye shutter and the left-eye shutter for the first video image information item and (ii) opening the right-eye shutter and closing the left-eye shutter for the second video image information item, and in a case where a right-eye video image information item and a left-eye video image information item both subsequently extracted by the extracting means are designated by third and fourth video image information items respectively, (iii) closing the right-eye shutter and opening the left-eye shutter for the third video image information item and (iv) opening the right-eye shutter and closing the left-eye shutter for the fourth video image information item; and the display-or-non-display video image determining means determines a video image indicated by the first video image information item as the non-display video image.

With the above arrangements, the display control device of the present invention, regardless of whether the dominant eye of a viewer is the right eye or the left eye, allows a main video image and an auxiliary video image to be displayed to the viewer in that order. The display control device of the present invention thus prevents 3D sickness, which is believed to be caused as follows: When an auxiliary video image and a main video image are displayed in that order, the brain (i) senses, as a sickness, a gap between "motion of a scene currently being viewed" and "actual motion of the osseous semicircular canals" and (ii) is confused as a result.

Consequently, the display control device of the present invention, regardless of whether the dominant eye of a viewer is the right eye or the left eye, advantageously allows each viewer to view a video image in a mode suitable for the viewer.

The display control device of the present invention may preferably be arranged such that the video image information includes (i) a right-eye video image information item indicative of a right-eye video image itself usable in a three-dimensional display, (ii) a left-eye video image information item indicative of a left-eye video image itself usable in a three-dimensional display, and (iii) a both-eye video image information item indicative of a both-eye video image itself for use in a two-dimensional display; and in a case where the viewing mode information includes display mode information indicating that a video image display mode desired by the viewer is a three-dimensional display or a two-dimensional display, the display-or-non-display video image determining means, (i) in a case where the video image display mode desired by the viewer is a three-dimensional display, determines, as the non-display video image, the video image indicated by the both-eye video image information item, and (ii) in a case where the video image display mode desired by the viewer is a two-dimensional display, determines, as the non-display video image, each of respective video images indicated by the right-eye video image information item and the left-eye video image information item.

In the case where the video image information includes a right-eye video image information item, a left-eye video image information item, and a both-eye video image information item, a three-dimensional display is carried out with use of the right-eye video image information item and the both-eye video image information item, whereas a two-dimensional display is carried out with use of the both-eye video image information item.

Thus, in the case where the video image display mode desired by the viewer is a three-dimensional display, a video image indicated by the both-eye video image information item is determined as a non-display video image. This arrangement closes the right-eye shutter and the left-eye shutter of the display state switching means when the non-display video image, that is, the video image indicated by the both-eye video image information item, is displayed by the display device. The display control device of the present invention thus (i) prevents a both-eye video image, unnecessary for the viewing mode, from being viewed by the viewer and (ii) allows the viewer to view respective video images indicated by the right-eye video image information item and the left-eye video image information item. This makes it possible to carry out a three-dimensional display.

Similarly, in the case where the video image display mode desired by the viewer is a two-dimensional display, respective video images indicated by the right-eye video image information item and the left-eye video image information item are each determined as a non-display video image. This arrangement closes the right-eye shutter and the left-eye shutter of the display state switching means when the non-display video image, that is, each of the respective video images indicated by the right-eye video image information item and the left-eye video image information item, is displayed by the display device. The display control device of the present invention thus prevents such video images, indicated by the right-eye video image information item and the left-eye video image information item and thus unnecessary for the viewing mode, from being viewed by the viewer. The display control device of the present invention thus (i) prevents such video images, indicated by the right-eye video image information item and the left-eye video image information item and thus unnecessary for the viewing mode, from being viewed by the viewer, and (ii) allows the viewer to view a video image indicated by the both-eye video image information item. This makes it possible to carry out a two-dimensional display.

The display control device of the present invention can consequently achieve the viewer's desired mode for viewing a video image (that is, for viewing a two-dimensional display video image or a three-dimensional display video image).

The display control device of the present invention may preferably be arranged such that in a case where (i) the viewer includes a plurality of viewers and (ii) the viewing mode information corresponds to each of the plurality of viewers individually, the shutter operation control means closes the right-eye shutter and the left-eye shutter of the display state switching means used by the each of the plurality of viewers.

The above arrangement, even in the case where there are two or more viewers, allows the shutter operation control means to, on the basis of viewing mode information corresponding to each of such two or more viewers, close the right-eye shutter and the left-eye shutter of the display state switching means used by each of the two or more viewers.

The display control device of the present invention thus, even in the case where there are two or more viewers, advantageously allows each viewer to view a video image in a mode suitable for the viewer.

An audio output device of the present invention includes: output-or-non-output audio information determining means for (I) obtaining, from the display control device according to any one of claims 1 to 12, (i) display video image information indicative of the display video image itself and (ii) non-display video image information indicative of the non-display video image itself, and (II), in a case where audio information is information indicative of an audio accompanying the video image displayed by the display device, determining, (i) as output audio information to be outputted to outside, audio information accompanying the display video image and (ii) as non-output audio information not to be outputted to the outside, audio information associated with the non-display video image; and output means for outputting, when the display video image associated with the output audio information is displayed by the display device, an audio indicated by the audio information determined by the output-or-non-output audio information determining means as the output audio information.

With the above arrangement, when a display video image is displayed by the display device, an audio indicated by output audio information associated with the display video image is also outputted. Conversely speaking, when a non-display video image is displayed by the display device, an audio indicated by audio information associated with the non-display video image is not outputted.

With the above arrangement, the audio output device of the present invention allows a viewer to simultaneously view a display video image and listen to an audio associated with the display video image. In the case where (i) there are two or more viewers, and (ii) there are a display video image and an audio associated with the display video image for each of such two or more viewers, the audio output device of the present invention, which has the above arrangement, allows each viewer to simultaneously view the display video image and listen to the audio associated with it.

The display control device may be formed by a computer. In this case, the present invention further encompasses (i) a display control program for causing a computer to operate as each of the means to form the display control device by a computer and (ii) a computer-readable recording medium on which the display control program is stored.

The present invention further encompasses (i) a recording and reproduction device including the display control device and (ii) a recording and reproduction device includes the audio output device.

INDUSTRIAL APPLICABILITY

The present invention relates to, for example, a display control device that allows each viewer to view a video image in a mode suitable for the viewer and that is thus highly convenient for a user. The present invention is applicable to, in particular, a recording and reproduction device including the display control device.

REFERENCE SIGNS LIST 1, 2, 3 display control device
4 cable
10 right/left video image separating section
20 koma-frame video image dividing section
30 video image extracting section (extracting means)

40 video image arranging section (arranging means)
50 switch information generating section (switch information generating means)
70 display/non-display video image determining section (display-or-non-display video image determining means)
80 shutter operation control section (shutter operation control means)
100, 150, 160, 170, 180 recording and reproduction device
110 information reproducing section
120 information recording and reproduction section
121 disc loading recognizing section
122 storage section
123 memory
124 operation section
125 recording and reproduction circuit group
126 optical head
127 optical pickup
128 control section
129 pickup driving circuit
130 laser driving circuit
131 reproduction circuit
200 memory section
300 operation section
400 display device
500 liquid crystal shutter (display state switching means)
600 spectacles (display state switching means)
700 display state switching section (display state switching means)
800 audio output device
810 output/non-output audio information determining section (output-or-non-output audio information determining means)
820 output section (output means)

The invention claimed is:

1. A display control device for controlling an operation of display state switching means including a right-eye shutter and a left-eye shutter each capable of being switched between
  (i) a displaying state in which a video image displayed by a display device is displayed to a viewer and
  (ii) a non-displaying state in which the video image displayed by the display device is not displayed to the viewer,
  the display control device comprising:
  display-or-non-display video image determining means for determining, on a basis of
  (i) video image information about the video image displayed by the display device and
  (ii) viewing mode information indicative of a viewing mode desired by the viewer for viewing the video image displayed by the display device, whether the video image displayed by the display device is
    (i) a display video image, which is necessary for the viewing mode and which is displayed to the viewer or
    (ii) a non-display video image, which is unnecessary for the viewing mode and which is not displayed to the viewer; and shutter operation control means for closing the right-eye shutter and the left-eye shutter when a video image determined by the display-or-non-display video image determining means as the non-display video image is displayed by the display device,
  wherein
  the video image information includes video image provider information about a video image provider of the video image displayed by the display device;
  the viewing mode information includes specific provider viewing information indicating that the viewing mode desired by the viewer is for viewing a video image provided by a specific video image provider; and
  in a case where the video image displayed by the display device includes a plurality of video images provided by respective video image providers, the display-or-non-display video image determining means, on a basis of the video image provider information and the specific provider viewing information, determines
    (i) as the display video image, the video image provided by the specific video image provider and
    (ii) as the non-display video image, a video image provided by a video image provider other than the specific video image provider.

2. The display control device according to claim 1, wherein:
  the video image information includes
    (i) a right-eye video image information item indicative of a right-eye video image itself usable in a three-dimensional display and
    (ii) a left-eye video image information item indicative of a left-eye video image itself usable in a three-dimensional display; and
  in a case where the viewing mode information includes two-dimensional viewing information indicating that the viewing mode desired by the viewer is for viewing a two-dimensional display video image, the display-or-non-display video image determining means determines, on a basis of (i) the right-eye video image information item and the left-eye video image information item and (ii) the two-dimensional viewing information, a first one of the right-eye video image and the left-eye video image as the display video image and a second one of the right-eye video image and the left-eye video image as the non-display video image.

3. The display control device according to claim 1, wherein:
  the video image information includes
    (i) a right-eye video image information item indicative of a right-eye video image itself usable in a three-dimensional display,
    (ii) a left-eye video image information item indicative of a left-eye video image itself usable in a three-dimensional display, and
    (iii) a both-eye video image information item indicative of a both-eye video image itself for use in a two-dimensional display; and
  in a case where the viewing mode information includes display mode information indicating that a video image display mode desired by the viewer is a three-dimensional display or a two-dimensional display, the display-or-non-display video image determining means,
    (i) in a case where the video image display mode desired by the viewer is a three-dimensional display, determines, as the non-display video image, the video image indicated by the both-eye video image information item, and
    (ii) in a case where the video image display mode desired by the viewer is a two-dimensional display, determines, as the non-display video image, each of respective video images indicated by the right-eye video image information item and the left-eye video image information item.

4. The display control device according to claim 1, wherein:
  in a case where (i) the viewer includes a plurality of viewers and (ii) the viewing mode information corresponds to each of the plurality of viewers individually, the shutter operation control means closes the right-eye shutter and the left-eye shutter of the display state switching means used by said each of the plurality of viewers.

5. An audio output device comprising:
output-or-non-output audio information determining means for
(I) obtaining, from the display control device according to claim 1,
  (i) display video image information indicative of the display video image itself and
  (ii) non-display video image information indicative of the non-display video image itself, and
(II), in a case where audio information is information indicative of an audio accompanying the video image displayed by the display device, determining,
(i) as output audio information to be outputted to outside, audio information accompanying the display video image and
(ii) as non-output audio information not to be outputted to the outside, audio information associated with the non-display video image; and
output means for outputting, when the display video image associated with the output audio information is displayed by the display device, an audio indicated by the audio information determined by the output-or-non-output audio information determining means as the output audio information.

6. A recording and reproduction device comprising:
the audio output device according to claim 5.

7. A recording and reproduction device comprising: the display control device according to claim 1.

8. A display control device for controlling an operation of display state switching means including a right-eye shutter and a left-eve shutter each capable of being switched between
  (i) a displaying state in which a video image displayed by a display device is displayed to a viewer and
  (ii) a non-displaying state in which the video image displayed by the display device is not displayed to the viewer,
the display control device comprising:
display-or-non-display video image determining means for determining, on a basis of
(i) video image information about the video image displayed by the display device and
(ii) viewing mode information indicative of a viewing mode desired by the viewer for viewing the video image displayed by the display device, whether the video image displayed by the display device is
  (i) a display video image, which is necessary for the viewing mode and which is displayed to the viewer or
  (ii) a non-display video image, which is unnecessary for the viewing mode and which is not displayed to the viewer; and
shutter operation control means for closing the right-eye shutter and the left-eye shutter when a video image determined by the display-or-non-display video image determining means as the non-display video image is displayed by the display device,
wherein the video image information includes video image attribute information indicative of an attribute of the video image displayed by the display device;
  the viewing, mode information includes specific attribute information indicating that the viewing mode desired by the viewer is for viewing a video image having a specific attribute; and
in a case where the video image displayed by the display device includes a plurality of video images having respective attributes, the display-or-non-display video image determining means, on a basis of the video image attribute information and the specific attribute information, determines
(i) as the display video image, the video image having the specific attribute and
(ii) as the non-display video image, a video image having an attribute other than the specific attribute.

9. The display control device according to claim 8, wherein:
the video image information includes
(i) a right-eye video image information item indicative of a right-eye video image itself usable in a three-dimensional display and
(ii) a left-eye video image information item indicative of a left-eye video image itself usable in a three-dimensional display; and
in a case where the viewing mode information includes two-dimensional viewing information indicating that the viewing mode desired by the viewer is for viewing a two-dimensional display video image, the display-or-non-display video image determining means determines, on a basis of (i) the right-eye video image information item and the left-eye video image information item and (ii) the two-dimensional viewing information, a first one of the right-eye video image and the left-eye video image as the display video image and a second one of the right-eye video image and the left-eye video image as the non-display video image.

10. A display control method for controlling an operation of display state switching means including a right-eye shutter and a left-eye shutter each capable of being switched between
  (i) a displaying state in which a video image displayed by a display device is displayed to a viewer and
  (ii) a non-displaying state in which the video image displayed by the display device is not displayed to the viewer,
the display control method comprising the steps of:
a display-or-non-display video image determining step for determining, on a basis of
(i) video image information about the video image displayed by the display device and
(ii) viewing mode information indicative of a viewing mode desired by the viewer for viewing the video image displayed by the display device, whether the video image displayed by the display device is
  (i) a display video image, which is necessary for the viewing mode and which is displayed to the viewer or
  (ii) a non-display video image, which is unnecessary for the viewing mode and which is not displayed to the viewer; and
a shutter operation control step for closing the right-eye shutter and the left-eye shutter when a video image determined in the display-or-non-display video image determining step as the non-display video image is displayed by the display device, wherein
the video image information includes video image provider information about a video image provider of the video image displayed by the display device;
the viewing mode information includes specific provider viewing information indicating that the viewing mode desired by the viewer is for viewing a video image provided by a specific video image provider; and
in a case where the video image displayed by the display device includes a plurality of video images provided by respective video image providers, determining, by the display-or-non-display video image determining means, on a basis of the video image provider information and the specific provider viewing information,
- (i) as the display video image, the video image provided by the specific video image provider and
- (ii) as the non-display video image, a video image provided by a video image provider other than the specific video image provider.

11. A non-transitory computer-readable recording medium on which a display control program for causing a computer to execute each of the steps set forth in claim 10 is stored.

12. A method for controlling an operation of display state of a display control device switching means including a right-eye shutter and a left-eye shutter each capable of being switched between (i) a displaying state in which a video image displayed by a display device is displayed to a viewer and (ii) a non-displaying state in which the video image displayed by the display device is not displayed to the viewer, the method comprising:

determining by a display-or-non-display video image determining means, on a basis of
- (i) video image information about the video image displayed by the display device and
- (ii) viewing mode information indicative of a viewing mode desired by the viewer for viewing the video image displayed by the display device, whether the video image displayed by the display device is
  - (i) a display video image, which is necessary for the viewing mode and which is displayed to the viewer or
  - (ii) a non-display video image, which is unnecessary for the viewing mode and which is not displayed to the viewer; and closing, by a shutter operation control means, the right-eye shutter and the left-eye shutter when a video image determined by the display-or-non-display video image determining means as the non-display video image is displayed by the display device, wherein the video image information includes video image attribute information indicative of an attribute of the video image displayed by the display device;

the viewing, mode information includes specific attribute information indicating that the viewing mode desired by the viewer is for viewing a video image having a specific attribute; and in a case where the video image displayed by the display device includes a plurality of video images having respective attributes, the display-or-non-display video image, determining, by a determining means, on a basis of the video image attribute information and the specific attribute information,
- (i) as the display video image, the video image having the specific attribute and
- (ii) as the non-display video image, a video image having an attribute other than the specific attribute.

* * * * *